United States Patent
Blauvelt et al.

(10) Patent No.: US 7,853,103 B2
(45) Date of Patent: Dec. 14, 2010

(54) OPTICAL JUNCTION APPARATUS AND METHODS EMPLOYING OPTICAL POWER TRANSVERSE-TRANSFER

(75) Inventors: Henry A. Blauvelt, San Marino, CA (US); Kerry J. Vahala, San Gabriel, CA (US); David W. Vernooy, Sierra Madre, CA (US); Joel S. Paslaski, Alhambra, CA (US)

(73) Assignee: HOYA Corporation USA, San Jose, CA (US)

( * ) Notice: Subject to any disclaimer, the term of this patent is extended or adjusted under 35 U.S.C. 154(b) by 0 days.

(21) Appl. No.: 12/510,273

(22) Filed: Jul. 28, 2009

(65) Prior Publication Data

US 2010/0024192 A1    Feb. 4, 2010

Related U.S. Application Data

(63) Continuation of application No. 12/126,883, filed on May 25, 2008, now Pat. No. 7,577,327, which is a continuation of application No. 11/623,688, filed on Jan. 16, 2007, now Pat. No. 7,379,638, which is a continuation of application No. 11/327,920, filed on Jan. 9, 2006, now Pat. No. 7,164,825, which is a continuation of application No. 10/187,030, filed on Jun. 28, 2002, now Pat. No. 6,987,913.

(60) Provisional application No. 60/334,705, filed on Oct. 30, 2001, provisional application No. 60/360,261, filed on Feb. 27, 2002.

(51) Int. Cl.
*G02B 6/26* (2006.01)
*G02B 6/12* (2006.01)
*G02B 6/30* (2006.01)
*G02B 6/10* (2006.01)
*G02F 1/13* (2006.01)
*H01L 21/00* (2006.01)

(52) U.S. Cl. .............................. 385/39; 385/14; 385/27; 385/28; 385/30; 385/31; 385/40; 385/41; 385/42; 385/43; 385/48; 385/49; 385/50; 385/129; 385/130; 385/131; 385/132; 349/187; 438/30

(58) Field of Classification Search ................... 385/14, 385/27, 28, 30, 31, 39–43, 48–50, 129–132; 349/187; 438/30
See application file for complete search history.

(56) References Cited

U.S. PATENT DOCUMENTS

| | | |
|---|---|---|
| 3,912,363 A | 10/1975 | Hammer |
| 4,097,117 A | 6/1978 | Neil et al. |
| 4,097,118 A | 6/1978 | Hammer |
| 4,142,775 A | 3/1979 | Ramaswamy et al. |
| 4,669,814 A | 6/1987 | Dyott |
| 4,750,799 A | 6/1988 | Kawachi et al. |
| 4,753,497 A | 6/1988 | Fujii et al. |
| 4,779,945 A | 10/1988 | Hill et al. |
| 4,811,352 A | 3/1989 | Suzuki et al. |
| 4,969,712 A | 11/1990 | Westwood et al. |
| 4,998,793 A | 3/1991 | Henry et al. |
| 5,032,219 A | 7/1991 | Buchmann et al. |
| 5,039,192 A | 8/1991 | Basu |
| 5,103,493 A | 4/1992 | Buchmann et al. |
| 5,123,070 A | 6/1992 | Bradley |
| 5,138,676 A | 8/1992 | Stowe et al. |
| 5,159,699 A | 10/1992 | de Monts |
| 5,177,031 A | 1/1993 | Buchmann et al. |
| 5,199,092 A | 3/1993 | Stegmueller |
| 5,259,049 A | 11/1993 | Bona et al. |
| 5,265,177 A | 11/1993 | Cho et al. |
| 5,402,511 A | 3/1995 | Malone et al. |
| 5,446,579 A | 8/1995 | Lomashevitch |
| 5,475,704 A | 12/1995 | Lomashevitch |
| 5,488,678 A | 1/1996 | Taneya et al. |
| 5,502,783 A | 3/1996 | Wu |
| 5,515,461 A | 5/1996 | Deri et al. |
| 5,568,579 A | 10/1996 | Okaniwa |
| 5,703,989 A | 12/1997 | Khan et al. |
| 5,926,496 A | 7/1999 | Ho et al. |
| 6,009,115 A | 12/1999 | Ho |
| 6,031,945 A | 2/2000 | You et al. |

| | | |
|---|---|---|
| 6,040,246 A | 3/2000 | Goldstein et al. |
| 6,052,495 A | 4/2000 | Little et al. |
| 6,064,783 A | 5/2000 | Congdon et al. |
| 6,065,881 A | 5/2000 | Okada et al. |
| 6,108,478 A | 8/2000 | Harpin et al. |
| 6,157,760 A | 12/2000 | Fujita et al. |
| 6,163,631 A | 12/2000 | Kawanishi et al. |
| 6,212,320 B1 | 4/2001 | Rickman et al. |
| 6,222,964 B1 | 4/2001 | Sadot et al. |
| 6,243,517 B1 | 6/2001 | Deacon |
| 6,266,468 B1 | 7/2001 | Rickman et al. |
| 6,282,219 B1 | 8/2001 | Butler et al. |
| 6,282,345 B1 | 8/2001 | Schimpe |
| 6,293,688 B1 | 9/2001 | Deacon |
| 6,310,995 B1 | 10/2001 | Saini et al. |
| 6,321,011 B2 | 11/2001 | Deacon |
| 6,324,204 B1 | 11/2001 | Deacon |
| 6,330,378 B1 | 12/2001 | Forrest et al. |
| 6,339,607 B1 | 1/2002 | Jiang et al. |
| 6,341,189 B1 | 1/2002 | Deacon |
| 6,356,694 B1 | 3/2002 | Weber |
| 6,360,038 B1 | 3/2002 | Grubsky |
| 6,373,872 B2 | 4/2002 | Deacon |
| 6,385,376 B1 | 5/2002 | Bowers et al. |
| 6,393,185 B1 | 5/2002 | Deacon |
| 6,393,186 B1 | 5/2002 | Deacon |
| 6,400,856 B1 | 6/2002 | Chin |
| 6,424,669 B1 | 7/2002 | Jiang et al. |
| 6,445,724 B2 | 9/2002 | Abeles |
| 6,483,968 B2 | 11/2002 | Fuse et al. |
| 6,507,684 B2 | 1/2003 | Tapalian et al. |
| 6,542,663 B1 | 4/2003 | Zhao et al. |
| 6,560,259 B1 | 5/2003 | Hwang |
| 6,839,491 B2 | 1/2005 | Painter et al. |
| 6,917,636 B2 | 7/2005 | Blauvelt et al. |
| 6,959,123 B2 | 10/2005 | Painter et al. |
| 6,975,798 B2 | 12/2005 | Blauvelt et al. |
| 6,985,646 B2 | 1/2006 | Blauvelt et al. |
| 6,987,913 B2 | 1/2006 | Blauvelt et al. |
| 6,999,671 B2 | 2/2006 | Painter et al. |
| 7,031,577 B2 | 4/2006 | Painter et al. |
| 7,050,681 B2 | 5/2006 | Blauvelt et al. |
| 7,130,509 B2 | 10/2006 | Painter et al. |
| 7,136,564 B2 | 11/2006 | Blauvelt et al. |
| 7,158,702 B2 | 1/2007 | Blauvelt et al. |
| 7,164,825 B2 | 1/2007 | Blauvelt et al. |
| 7,164,838 B2 | 1/2007 | Blauvelt et al. |
| 7,184,643 B2 | 2/2007 | Blauvelt et al. |
| 7,227,880 B2 | 6/2007 | Blauvelt et al. |
| 7,233,713 B2 | 6/2007 | Blauvelt et al. |
| 7,373,067 B2 | 5/2008 | Blauvelt et al. |
| 7,379,638 B2 | 5/2008 | Blauvelt et al. |
| 7,394,954 B2 | 7/2008 | Blauvelt et al. |
| 7,397,995 B2 | 7/2008 | Blauvelt et al. |
| 2001/0031122 A1 | 10/2001 | Lackritz et al. |
| 2002/0064345 A1 | 5/2002 | Kikuchi et al. |
| 2002/0081055 A1 | 6/2002 | Painter et al. |
| 2002/0122615 A1 | 9/2002 | Painter et al. |
| 2002/0197013 A1 | 12/2002 | Liu et al. |
| 2003/0081903 A1 | 5/2003 | Vahala et al. |
| 2003/0128907 A1 | 7/2003 | Kikuchi et al. |
| 2003/0235369 A1 | 12/2003 | Grosjean et al. |
| 2004/0037342 A1 | 2/2004 | Blauvelt et al. |
| 2004/0052467 A1 | 3/2004 | Blauvelt et al. |
| 2004/0052480 A1 | 3/2004 | Benzoni et al. |
| 2004/0165812 A1 | 8/2004 | Blauvelt et al. |
| 2007/0081781 A1 | 4/2007 | Blauvelt et al. |
| 2007/0211989 A1 | 9/2007 | Blauvelt et al. |
| 2007/0242917 A1 | 10/2007 | Blauvelt et al. |
| 2008/0232756 A1 | 9/2008 | Blauvelt et al. |

FOREIGN PATENT DOCUMENTS

| | | |
|---|---|---|
| JP | H2-275402 | 11/1990 |
| JP | H5-508937 | 12/1993 |
| JP | 07-110415 | 4/1995 |
| JP | H9-159865 | 6/1997 |
| JP | 2001-091794 | 6/2001 |
| JP | 2002-048949 | 2/2002 |
| JP | 2002-122750 | 4/2002 |
| JP | 2002-169042 | 6/2002 |
| WO | WO 92/00550 | 1/1992 |
| WO | WO 01/06279 | 1/2001 |

OTHER PUBLICATIONS

Office Action dated Mar. 5, 2010 for counterpart Japanese application 2003-540709.

Notice of Allowance dated May 12, 2010 in co-owned U.S. Appl. No. 11/618,643.

Y.P. Li and C.H. Henry, Silicon Optical Bench Waveguide Technology, in Optical Fiber Telecommunications, IIIb, I.P. Kaminow and T.L. Koch eds., Academic Press, 1997.

T. Ramadan R. Scarmozzino, and R Osgood "Adiabatic Couplers: Design Rules and Optimization"IEEE J. Lightwave Tech., v16, No. 2, pp. 277-283,(1998).

D. G. Dalgoutte, R. B. Smith, G. Achutaramayya, and J. H. Harris, "Externally mounted fibers for integrated optics interconnections", Appl. Optics vol. 14, No. 8. pp. 1860-1865 (1975).

Y. Shani, C. H. Henry, R. C. Kistler, R. F. Kazarinov, and K. J. Orlowsky, "Integrated optic adiabatic devices on silicon", IEEE J. Quant Elec., vol, 27, No. 3, pp. 556-566 (1991).

Z. J. Wang, S.-J. Chua, F. Zhou, W. Wang, and R. H. Wu, "Buried heterostructures InGaAsP/InP strain-compensated multiple quantum well laser with a native-oxidized InAlAs current blocking layer", Appl. Phys. Lett. vol. 73(26) 3803 (1998).

H. P. Xin and C. W. Tu, "GaInNAs/GaAs multiple quantum wells grown by gas-source molecular beam epitaxy", Appl. Phys Lett. vol. 72(19) 2442 (1998).

E. Yabionovitch, T. Sands, D. M. Hwang, I. Schnitzer, T. J. Gmitter, S. K. Shastry, D. S. Hill, and J. C C. Fan, "Van der Waals bonding of GaAs on Pd leads to a permanent, solid-phase-topotaxial, metallurgical bond", Applied Physics Letters 59 3159 (1991).

Poch Yeh, Amnon Yariv, and Chi-Shain Hong, "Electromagnetic propagation in periodic stratified media. I. General theory", J. Optical Soc. Am., vol. 67(4) 423 (1977).

Z.-F. Xiao, G.-Y Wu, D. Zhang, G. Zhang, Z.-H. Li, Y.-L. Hao, and Y.-Y. Wang. "Silicon/glass wafer-to-wafer bonding with Ti/Ni intermediate bonding", Sensors and Actuators A—Physical 71 123 (1998).

F. Agahi, B. Pezeshki, J. A. Kash, and D. W. Kisker, "Asymmetric Fabry-Perot modulator with a waveguide geometry", Electron, Lett. vol. 32(3) 210 (1996).

Carl Arft, Diego R. Yankelovich, Andre Knoesen, Erji Mao, and James S. Harris Jr., "In-line fiber evanescent field electrooptic modulators", Journal of Nonlinear Optical Physics and Materials vol. 9(1) 79 (2000).

C. I. H. Ashby, M. M. Bridges, A. A. Allerman, B. E. Hammons, "Origin of the time dependence of wet oxidation of AlGaAs", Appl, Phys. Lett. vol. 75(1) 73 (1999).

W. G. Bi and C, W. Tu, "Bowing parameter of the band-gap energy of $GaN_xAs_{1-x}$", Appl, Phys, Lett. vol. 70(12) 1608 (1997).

P. Chavarkar, L. Zhao, S. Keller, A. Fisher, C. Zheng, J. S. Speck, and U. K. Mishra, "Strain relaxation of $In_xGa_{1-x}As$ during lateral Oxidation of underlying AlAs layers", Appl. Phys. Lett. vol. 75(15) 2253 (1999).

E. I. Chen, N. Holonyak, Jr., and M. J. Ries, "Planar disorder- and native-oxide-defined photopumped AlAs-GaAs superlattice minidisk lasers", J. Appl. Phys. vol. 79(11) 8204 (1996).

K. D. Choquette; K. M. Geib, C. I. H. Ashby, R D. Twesten, O. Blum, H. O. Hou, D. M. Follstaedt, B. E. Hammons, D. Mathes, and R. Hull, "Advances in selective wet oxidation of AlGaAs alloys", IEEE Journal of Selected Topics in Quantum Electronics vol. 3(3) 916 (1997).

R. H. Horng, D. S. Wuu, S.C. Wei, M. F. Huang, K.H. Chang, P.H, Liu, and K. C. Lin, "AlGaInP/AuBe/glass light emitting diodes fabricated by wafer-bonding technology", Appl. Phys. Letts. vol. 75(2)154 (1999).

D.L. Huffaker, H. Deng, Q. Deng, and D.G. Deppe, "Ring and stripe oxide-confined vertical-cavity surface-emitting lasers", Appl. Phys. Lett., vol. 69(23), 3477 (1996).

B. Koley, F. G. Johnson, O. King, S. S. Saini, and M. Dagenais, "A method of highly efficient hydrolization oxidation of III-V semiconductor lattice matched to indium phosphide", Appl. Phys. Lett. vol. 75(9) 1264 (1999).

M. Kondow, T. Kitatani, S. Nakatsuka, M. C. Larson, K. Nakahara, Y. Yazawa, M. Okai and K. Uomi, "GaInNAs: A novel material for long-wavelength semiconductor lasers", IEEE Journal of Selected Topics in Quantum Electronics, vol. 3(3), 719 (1997).

B.A. Little, S.T. Chu, H. A. Haus, J. Foresi, and J.-P. Laine, "Microring channel dropping filters", J. Lightwave Technology vol. 15 998 (1997).

Y. Luo, D. C, Hall. L. Kou, L. Steingart, J. H. Jackson, O. Blum, and H. Hou, "Oxidized AlxGa1-xAs heterostructures planar waveguides", Appl. Phys. Lett. vol. 75(20) 3078 (1999).

M. H. MacDougal P. D. Dapkus, A. E. Bond, C.-K. Lin, and J. Geske, "Design and fabrication of VCSEL's with AlxOy-GaAs DBR's", IEEE Journal of Selected Topics in Quantum Electronics vol. 3(3) 905 (1997).

M. H. MacDougal, P. D. Dapkus, "Wavelength shift of selectively oxidized AlxOy-AlGaAs-GaAs distributed Bragg reflectors", IEEE Photonics Tech. Lett. vol. 9(7) 884 (1997).

R. L. Naone and L. A. Coldren, "Surface energy model for the thickness, dependence of the lateral oxidation of AlAs", J. Appl. Phys. vol. 32(5) 2277 (1997).

N. Ohnoki, F. Koyama, and K. Iga; "Superlattice AlAs/AlInAs-oxide current aperture for long wavelength InP-based vertical-cavity surface-emitting laser structure", Appl. Phys. Lett. vol. 73(22) 3262 (1998).

N. Ohnoki, F. Koyama, and K. Iga; "Super-lattice AlAs/AlInAs for lateral-oxide current confinement in InP-based lasers", J. Crystal Growth vol. 195 603 (1998).

R. D. Pechstedt, P. St. J. Russell, T. A. Birks, and F. D Lloyd-Lucas, "Selective coupling of fiber modes with use of surface-guided Bloch modes supported by dielctric multilayer stacks", J. Opt. Soc. Am. A vol. 12(12) 2655 (1995).

R. D. Pechstedt, P. St. J. Russell, "Narrow-band in-line fiber filter using surface-guided Bloch modes supported dielectric multilayer stacks", J. Lightwave Tech. vol. 14(6) 1541 (1996).

B. Pezeshki, J. A. Kash, D. W. Kisker, and F. Tong, "Multiple wavelength light source using an asymmetric waveguide coupler", Appl. Phys. Lett. vol. 65(2) 138 (1994).

B. Pezeshki, J. A. Kash, D. W. Walker, and F. Tong, "Wavelength sensitive tapered coupler with anti-resonant waveguides", IEEE Phot. Tech. Lett. vol. 6(10) 1225 (1994).

B. Pezeshki, F. F. Tong; J. A. Kash, and D. W. Kisker, "Vertical cavity devices as wavelength selective waveguides", J. Lightwave Tech. vol. 12(10) 1791 (1994).

B. Pezeshki, J. A. Kash, and F. Agahi, "Waveguide version of an asymmetric Fabry-Perot modulator", Appl. Phys. Lett. vol. 67(12) 1662 (1995).

H. Saito, T. Makimoto, and N. Kobayashi, "MOVPE growth of strained InGaAsN/GaAs quantum wells", J. Crystal Growth, vol. 195 416 (1996).

I.-H, Tan, C. Reaves, A. L. Holmes Jr., E. L. Hu, J. E. Bowers, and S. DenBaars, "Low-temperature bonding of III-V semiconductors", Electronics Letter 31 588 (1995).

H. Wada and T. Kamijoh, "Effects of heat treatment on bonding properties in InP-to-Si direct water bonding", Japanese Journal of Applied Physics Part 1 33 4878 (1994).

H. Wada, T. Kamijoh, and Y. Ogawa, "Direct bonding of InP to different materials for optical devices", Proceedings of the 3rd International Symposium on Semiconductor Wafer Bonding Science, Technology, and Applications, 95-97 579, The Electrochemical Society (Pennington NJ, 1995).

H. Wada and T. Kamijoh, "Room-temperature cw operation of InGaAsP lasers on Si fabricated by wafer bonding", IEEE Photonics Technology Letters 8 173 (1996).

H. Wada and T. Kamijoh, "Wafer bonding of InP to Si and its application to optical devices", Japanese Journal of Applied Physics Part 1 37 1383 (1998).

Adar et al, Adiabatic 3-dB Couplers, Filters, and Multiplexers Made with Silica Waveguides on Silicon, Journal of Lightwave Technology, Jan. 1992, pp. 46-50, vol. 10, No. 1.

Ahn et al, Uniform and High Coupling Efficiency Between InGaAsP-InP Buried Heterostructure Optical Amplifier and Monolithically . . . , IEEE Photonics Tehnology Letters, Feb. 1996, pp. 200-202, vol. 8, No. 2.

Bissessur et al, Ridge Laser with Spot-Size Converter in a Single Epitaxial Step for High Coupling Efficiency to Single-Mode Fibers, IEEE Photonics Technology Letters, Sep. 1998, pp. 1235-1237, vol. 10, No. 9.

Bona et al, Beam Properties of AlGaAs Power Lasers with High-Quality Etched Mirrors, IEEE Photonics Technology Letters, May 1991, pp. 412-414, vol. 3, No. 5.

Bouadma et al, Integration of a laser Diode With a Polymer-Based Waveguide for Photonic Integrated Circuits, IEEE Photonics Technology Letters, Oct. 1994, pp. 1188-1190, vol. 6, No. 10.

T. Brenner and H. Melchior, Integrated Optical Modeshape Adapters in InGaAsP/InP for Efficient Fiber-to-Waveguide Coupling, IEEE Photonics Technology Letters, Sep. 1993, pp. 1053-1056, vol. 5, No. 9.

Dautartas et al, Hybrid Optical Packaging, Challenes and Opportunities, IEEE 2002 Electronics Components and Technology Conference, 2002.

Louay Eldada and Lawrence W. Shacklette, Advances in Polymer Integrated Optics, IEEE Journal of Selected Topics in Quantum Electronics, Jan. 2000, pp. 54-68, vol. 6, No. 1.

Fang et al, 1.55-um InGaAsP-InP Spot-Size-Converted(SSC) Laser with Simple Technological Process, IEEEPhotonics Technology Letters, Jun. 1998, pp. 775-777, vol. 10, No. 6.

Friedrich et al, Hybrid Integration of Semiconductor Lasers with Si-Based Single-Mode Ridge Waveguides, Journal of Lightwave Technology, Mar. 1992, pp. 336-340, vol. 10, No. 3.

Goodwill et al, Polymer Tapered Waveguides and Flip-Chip Solder Bonding as Compatible Technologies for Efficient OEIC Coupling, 1997 Electronics Components and Technology Conference, 1997, pp. 788-796, Publisher: IEEE.

Hashimoto et al, Hybrid Integration of Spot-Size Converted Laser Diode on Planar Lightwave Circuit Platform by Passive Alignment Techniqu, IEEE Photonics Technology Letters, Nov. 1996, pp. 1504-1506, vol. 8, No. 11.

Hashimoto et al, Multichip Optical Hybrid Integration Technique with Planar Lightwave Circuit Platform, Journal of Lightwave Technology, Jul. 1998, pp. 1249-1258, vol. 16, No. 7.

Henry et al, Glass Waveguides on Silicon for Hybrid Optical Packaging, Journal of Lightwave Technology, Oct. 1989, pp. 1530-1539, vol. 7, No. 10.

Ido et al, High-Speed MQW Electroabsorption Optical Modulators Integrated with Low-Loss Waveguides, IEEEPhotonics Technology Letters, Feb. 1995, pp. 170-172, vol. 7, No. 2.

Ido et al, Ultra-High-Speed Multiple-Quantum-Well Electro-Absorption optical Modulators with Integrated Waveguides, Journal of Lightwave Technology, Sep. 1996, pp. 2026-2034, vol. 14, No. 9.

Itaya et al, Spot-Size Converter Integrated Laser Dioded (SS-LDs), IEEE Journal of Selected Topics in Quantum Electronics, Jun. 1997, pp. 968-974, vol. 3, No. 3.

Itoh et al, Large reduction of singlemode-fibre coupling loss in 1.5%-delta planar lightwave circuits using spot-size converters, Electronics Letters, Jan. 17, 2002, pp. 72-74, vol. 38, No. 2.

C. A. Jones and K. Cooper, Hybrid integration onto silicon motherboards with planar silica waveguides, IEE Proc. Optoelectron., Oct. 1996, pp. 316-321, vol. 143, No. 5.

Ronald Kaiser and Helmut Heidrich, Optoelectronic/Photonic Integrated Circuits on InP between Technological Feasibility and Commercial Success , IEICE Trans. Electron., Apr. 2002, pp. 970-981, vol. E85, No. 4.

Kasaya et al, A Simple Laterally Tapered Waveguide for Low-Loss Coupling to Single-Mode Fibers, IEEE Photonics Technology Letters, Mar. 1993, pp. 345-347, vol. 5, No. 3.

Kuniharu Kato and Yuichi Tohmori, PLC Hybrid Integration Technology and Its Application to Photonic Components, IEEE Journal of Selected Topics in Quantum Electronics, Jan. 2000, pp. 4-13, vol. 6, No. 1.

Kawano et al, Coupling and Conversion Characteristics of Spot-Size-Converter Integrated Laser Diodes, IEEE Journal of Selected Topics in Quantum Electronics, Dec. 1997, pp. 1351-1360, vol. 3, No. 6.

M. Kawachi, Recent progress in silica-based planar lightwave circuits on silicon, IEE Proc.-Optoelectron., Oct. 1996, pp. 257-262, vol. 143, No. 5.

Hyoun Soo Kim and Ramu V. Ramaswamy, Tapered, Both in Dimension and in Index, Velocity Coupler: Theory and Experiment, IEEE Journal of Quantum Electronics, Apr. 1993, pp. 1158-1167, vol. 29, No. 4.

Kitagawa et al, Hybrid Integration Technologies Using Planar Lightwave Circuits and Developed Components, IEICE Trans. Electron., Apr. 2002, pp. 1009-1017, vol. E8, No. 4.

Koh et al, On-Wafer Process for Mass Production of Hybridly Integrated Optical Components Using Passive Alignment on Silicon . . . , IEEE 1999 Electronic Components and Technology Conference, 1999.

Kurata et al, A Surface Mount Single-Mode Laser Module Using Passive Alignment, IEEE Transactions on Components, Packaging, and Manufacturing Technology-Part B, Aug. 1996, pp. 524-531, vol. 19, No. 3.

Kazuhiki Kurata, Mass Production Techniques for Optical Modules, IEEE 1998 Electronic Components and Technology Conference, 1998, pp. 572-580.

Y. P. Li and C. H. Henry, Silica-based optical integrated circuits, IEE Proc.-Optoelectron., Oct. 1996, pp. 263-280, vol. 143, No. 5.

Love et al, Tapered single-mode fibres and devices, IEE Proceedings J., Oct. 1991, pp. 343-354, vol. 138, No. 5.

Mitomi et al, Optical Spot-Size Converters for Low-Loss Coupling Between Fibers and Optoelectronic Semiconductor Devices, Journal of Lightwave Technology, Jul. 1996, pp. 1714-1720, vol. 14, No. 7.

Mitomi et al, Design of a Single-Mode Tapered Waveguide for Low-Loss Chip-to-Fiber Coupling, IEEE Journal of Quantum Electronics, Aug. 1994, pp. 1787-1793, vol. 30, No. 8.

Moerman et al, A Review of Fabrication Technologies for the Monolithic Integration of Tapers with III-V Semiconductor Devices, IEEE Journal of Selected Topics in Quantum Electronics, Dec. 1997, pp. 1308-1320, vol. 3, No. 6.

Nakagawa et al, High Power and High Sensitivity Planar Lightwave Circuit Module Incorporating a Novel Passive Alignment Procedure, Journal of Lightwave Technology, Jan. 1998, pp. 66-72, vol. 16, No. 1.

Oohashi et al, Reliability of 1300-nm Spot-Size Converter Integrated Laser Diodes for Low-Cost Optical Modules in Access Networks, Journal of Lightwave Technology, Jul. 1998, pp. 1302-1307, vol. 16, No. 7.

Rahman et al, Improved Laser-Fiber Coupling by Using Spot-Size Transformer, IEEE Photonics Technology Letters, Apr. 1996, pp. 557-559, vol. 8, No. 4.

Ribot et al, Improved Design for the Monolithic Integration of a Laser and an Optical Waveguide Coupled by an Evanescent Field, IEEE Journal of Quantum Electronics, Nov. 1990, pp. 1930-1941, vol. 26, No. 11.

Shani et al, Efficient coupling of a semiconductor laser to an otpical fiber by means of a tapered waveguide on silicon, Applied Physics Letters, Dec. 4, 1998, pp. 2389-2391, vol. 55, No. 23.

Robert B. Smith, Analytic solutions for lineraly tapered directional couplers, Journal of the Optical Society of America, Sep. 1976, pp. 882-892, vol. 66, No. 9.

Studenkov et al, Efficient Coupling in Integrated Twin-Waveguide Lasers Using Waveguide Tapers, IEEE Photonics Technology Letters, Sep. 1999, pp. 1096-1099, vol. 11, No. 9.

Studenkov et al, Asymmetric Twin-Waveguide 1.55-um Wavelength laser with a Distributed Bragg Reflector, IEEE Photonics Technology Letters, May 2000, pp. 468-470, vol. 12, No. 5.

Takagi et al, Silica-Based Waveguide-Type Wavelength-Insensitive Couplers (WINCs) with Series-Tapered Coupling Structure, Journal of Lightwave Technology, Dec. 1992, pp. 1814-1824, vol. 10, No. 12.

Trinh et al, Integrated optical directional couplers in silicon-on-insulator, Electronics Letters, Nov. 23, 1995, pp. 2097-2098, vol. 31, No. 24.

Vettiger et al, Full-Wafer Technology—A New Approach to Large-Scale Laser Fabrication and Integration, IEEE Journal of Quantum Electronics, Jun. 1991, pp. 1319-1331, vol. 27, No. 6.

Vusirikala et al, Compact Mode Expanders Using Resonant Coupling Between a Tapered Active Region and an Underlying Coupling Waveguide, IEEE Photonics Technology Letters, Feb. 1998, pp. 203-205, vol. 10, No. 2.

Wada et al, Fabrication & coupling-to-fiber characteristics of laser diode integrated with spot-size converter having lateral taper, IEE Proc. Optoelectron., Apr. 1997, pp. 104-108, vol. 144, No. 2.

Wongcharoen et al, Spot-Size Conversion Using Uniform Waveguide Sections for Efficient Laser-Fiber Coupling, Journal of Lightwave Technology, May 2001, pp. 708-716, vol. 19, No. 5.

Yokoyama et al, Design and Fabrication of High-Coupling-Efficiency Spot-Size Converter Integrated Laser Diodes Using 3D BMP Program, journal of Lightwave Technology, Aug. 1998, pp. 1456-1463, vol. 16, No. 8.

K. Kato and Y. Tohmori, PLC Hybrid Integration technology and its application to photonic coomponents, IEEE Jounrnal of Selected Topics in Quantum Electronics, Jan. 2000, pp. 4-13, vol. 6.

L. A. Coldren and S. W. Corzine, Diode Lasers and Photonic Integrated Circuits, Wiley (New York, 1995) pp. 262-301.

Shani et al, Integrated optic adiabatic devices on silicon, IEEE Journal of Quantum Electronics, Mar. 1991, pp. 556-566, vol. 27.

Park et al, A novel method for fabrication of a PLC platform for hybrid integration of an optical module by passive alignment, IEEE Photonics Technology Letters, Apr. 2002, pp. 486-488, vol. 14.

Office Action dated Apr. 27, 2004 pertaining to U.S. Appl No. 10/037,966 (5 pages).

Office Action dated Aug. 19, 2004 pertaining to U.S. Appl. No. 10/630,319 (9 pages).

International Search Report for counterpart App. No. PCT/US02/20668 (three pages).

International Preliminary Examination Report for counterpart App. No. PCT/US02/20668 (four pages).

Office Action received for co-owned U.S. Appl. No. 10/630,319 (five pages; corresponds to cited Pat. Pub. No. US2004-0037342 A1).

Response submitted for co-owned U.S. Appl. No. 10/630,319 (nine pages total; corresponds to cited Pat. Pub. No. US2004-0037342 A1).

Office Action (restriction requirement) dated Feb. 3, 2003 in co-owned U.S. Appl. No. 10/037,966 (now Pat No. 6,839,491).

Office Action dated Jul. 9, 2003 in co-owned U.S. Appl. No. 10/037,966 (now Pat No. 6,839,491).

Office Action (ex parte Quayle) dated Jun. 21, 2004 in co-owned U.S. Appl. No. 10/037,966 (now Pat No. 6,839,491).

Notice of Allowance dated Sep. 21, 2004 in co-owned U.S. Appl. No. 10/037,966 (now Pat No. 6,839,491).

Notice of Allowance dated May 27, 2005 in co-owned U.S. Appl. No. 10/988,975 (now Pat No. 6,959,123).

Office Action dated Mar. 16, 2006 in co-owned U.S. Appl. No. 10/991,138 (now Pat No. 7,130,509).

Notice of Allowance dated Jun. 26, 2006 in co-owned U.S. Appl. No. 10/991,138 (now Pat No. 7,130,509).

Notice of Allowance dated Dec. 27, 2005 in co-owned U.S. Appl. No. 10/990,950 (now Pat. No. 7,031,577).

Office Action dated May 27, 2005 in co-owned U.S. Appl. No. 10/991,341 (now Pat No. 6,999,671).

Notice of Allowance dated Oct. 20, 2005 in co-owned U.S. Appl. No. 10/991,341 (now Pat No. 6,999,671).

Office Action (restriction requirement) dated Sep. 13, 2004 in co-owned U.S. Appl. No. 10/187,030 (now Pat No. 6,987,913).

Office Action dated Jan. 21, 2005 in co-owned U.S. Appl. No. 10/187,030 (now Pat No. 6,987,913).

Notice of Allowance dated Mar. 31, 2005 in co-owned U.S. Appl. No. 10/187,030 (now Pat No. 6,987,913).

Office Action dated Apr. 27, 2006 in co-owned U.S. Appl. No. 11/327,920 (now Pat No. 7,164,825).

Notice of Allowance dated Aug. 15, 2006 in co-owned U.S. Appl. No. 11/327,920 (now Pat No. 7,164,825).
Office Action dated Jun. 15, 2007 in co-owned U.S. Appl. No. 11/623,688 (now Pat No. 7,379,638).
Notice of Allowance dated Feb. 11, 2008 in co-owned U.S. Appl. No. 11/623,688 (now Pat No. 7,379,638).
Suzuki et al, Integrated optic ring resonators with two stacked layers of silica waveguide on Si, IEEE Photonics Technology Letters, vol. 4, No. 11, p. 1256 (Nov. 1, 1992).
Liu et al, A wavelength multiplexer using cascaded three-dimensional vertical couplers, Applied Physics Letters, vol. 76, No. 3, p. 282 (Jan. 17, 2000).
Sekimoto et al, Vertical antiresonant reflecting optical waveguide coupler for . . . , Applied Optics, vol. 39, No. 3, p. 426 (Jan. 20, 2000).
Office Action dated Aug. 5, 2005 in co-owned U.S. Appl. No. 11/138,841 (now Pat. No. 7,050,681).
Notice of Allowance dated Nov. 18, 2005 in co-owned U.S. Appl. No. 11/138,841 (now Pat. No. 7,050,681).
Office Action dated Apr. 27, 2006 in co-owned U.S. Appl. No. 11/333,933 (now Pat No. 7,158,702).
Notice of Allowance dated Aug. 15, 2006 in co-owned U.S. Appl. No. 11/333,933 (now Pat No. 7,158,702).
Office Action (restriction requirement) dated Oct. 19, 2007 in co-owned U.S. Appl. No. 11/618,643 (Pub No. 2007/0211989).
Office Action dated Mar. 28, 2008 in co-owned U.S. Appl. No. 11/618,643 (Pub No. 2007/0211989).
Office Action (final) dated Feb. 6, 2009 in co-owned U.S. Appl. No. 11/618,643 (Pub No. 2007/0211989).
Search report dated Dec. 6, 2005 for counterpart EPO App No. EP 02 75 6342.
Examination report dated Feb. 14, 2008 for counterpart EPO App No. EP 02 75 6342.
Translation of Office Action dated Apr. 28, 2008 for counterpart Japanese application 2003-540709.
Notice of Allowance dated Mar. 1, 2005 in co-owned U.S. Appl. No. 10/630,319 (now Pat No. 6,917,636).
Office Action dated Nov. 8, 2005 in co-owned U.S. Appl. No. 11/140,022 (now Pat No. 7,227,880).
Office Action dated Jun. 21, 2006 in co-owned U.S. Appl. No. 11/140,022 (now Pat No. 7,227,880).
Office Action (final) dated Nov. 28, 2006 in co-owned U.S. Appl. No. 11/140,022 (now Pat No. 7,227,880).
Notice of Allowance dated Mar. 30, 2007 in co-owned U.S. Appl. No. 11/140,022 (now Pat No. 7,227,880).
Office Action dated Aug. 6, 2008 in co-owned U.S. Appl. No. 12/126,883 (now Pat No. 7,577,327).
Notice of Allowance dated Dec. 31, 2008 in co-owned U.S. Appl. No. 12/126,883 (now Pat No. 7,577,327).
Notice of Allowance dated May 5, 2009 in co-owned U.S. Appl. No. 12/126,883 (now Pat No. 7,577,327).
Examination Report dated Sep. 15, 2010 in counterpart European App No. 02 756 342.8.
Notice of Allowance dated Sep. 28, 2010 in related U.S. Appl. No. 12/860,307.

*Primary Examiner* — Brian M. Healy
*Assistant Examiner* — Hung Lam
(74) *Attorney, Agent, or Firm* — David S. Alavi

(57) ABSTRACT

A method comprises: forming an optical device on a device substrate; forming a first optical waveguide on the device or device substrate; forming a second, structurally discrete optical waveguide on a structurally discrete waveguide substrate; and assembling the optical device, first waveguide, or device substrate with the second waveguide or waveguide substrate. The device and first waveguide are arranged for transferring an optical signal between the device and the first waveguide. Upon assembly the first and second waveguides are positioned between the device and waveguide substrates and are relatively positioned for transferring the optical signal therebetween via optical transverse coupling. The first or second optical waveguide is arranged for transferring the optical signal therebetween via substantially adiabatic optical transverse coupling with the first and second waveguides so positioned.

40 Claims, 54 Drawing Sheets

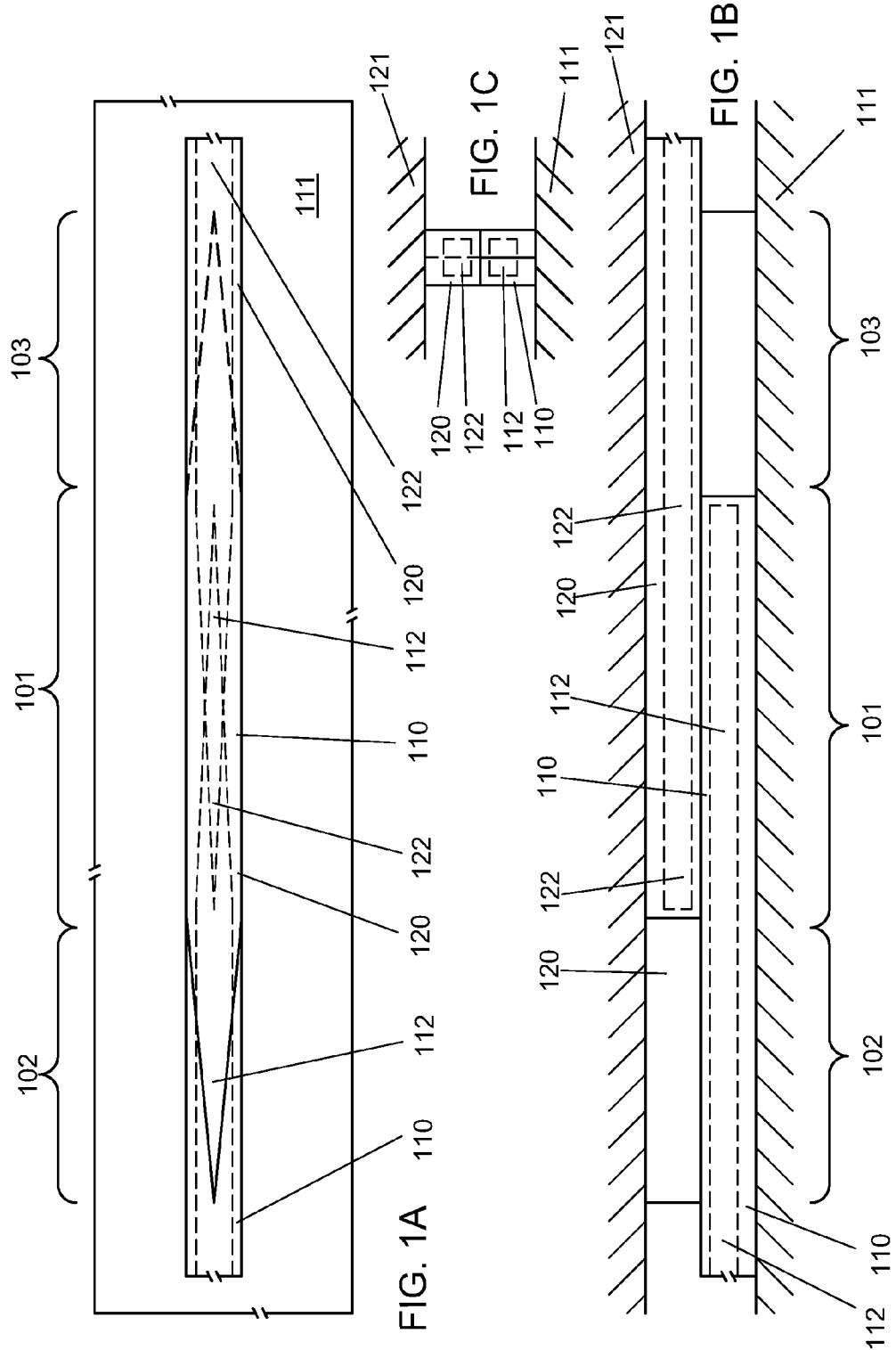

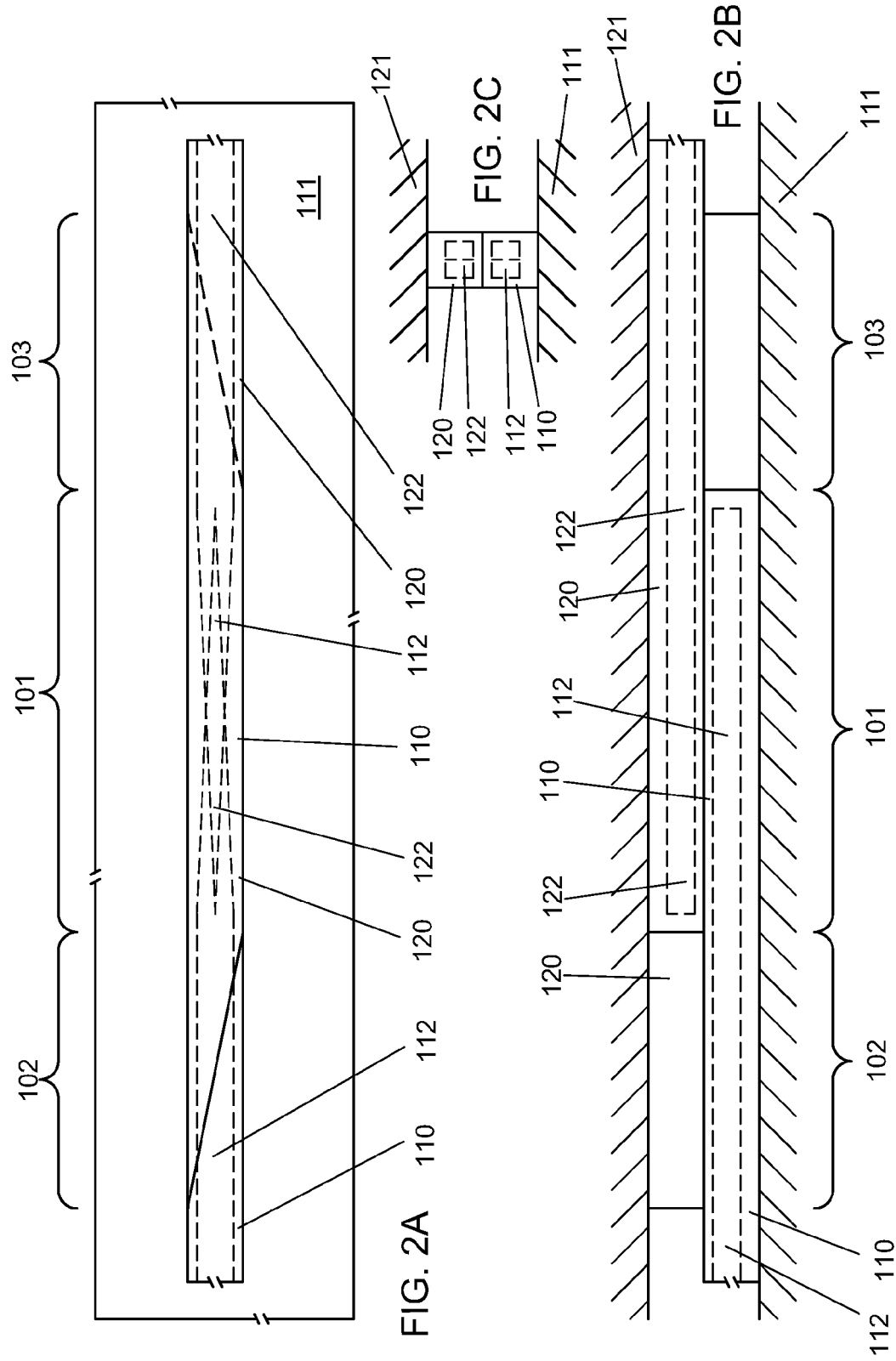

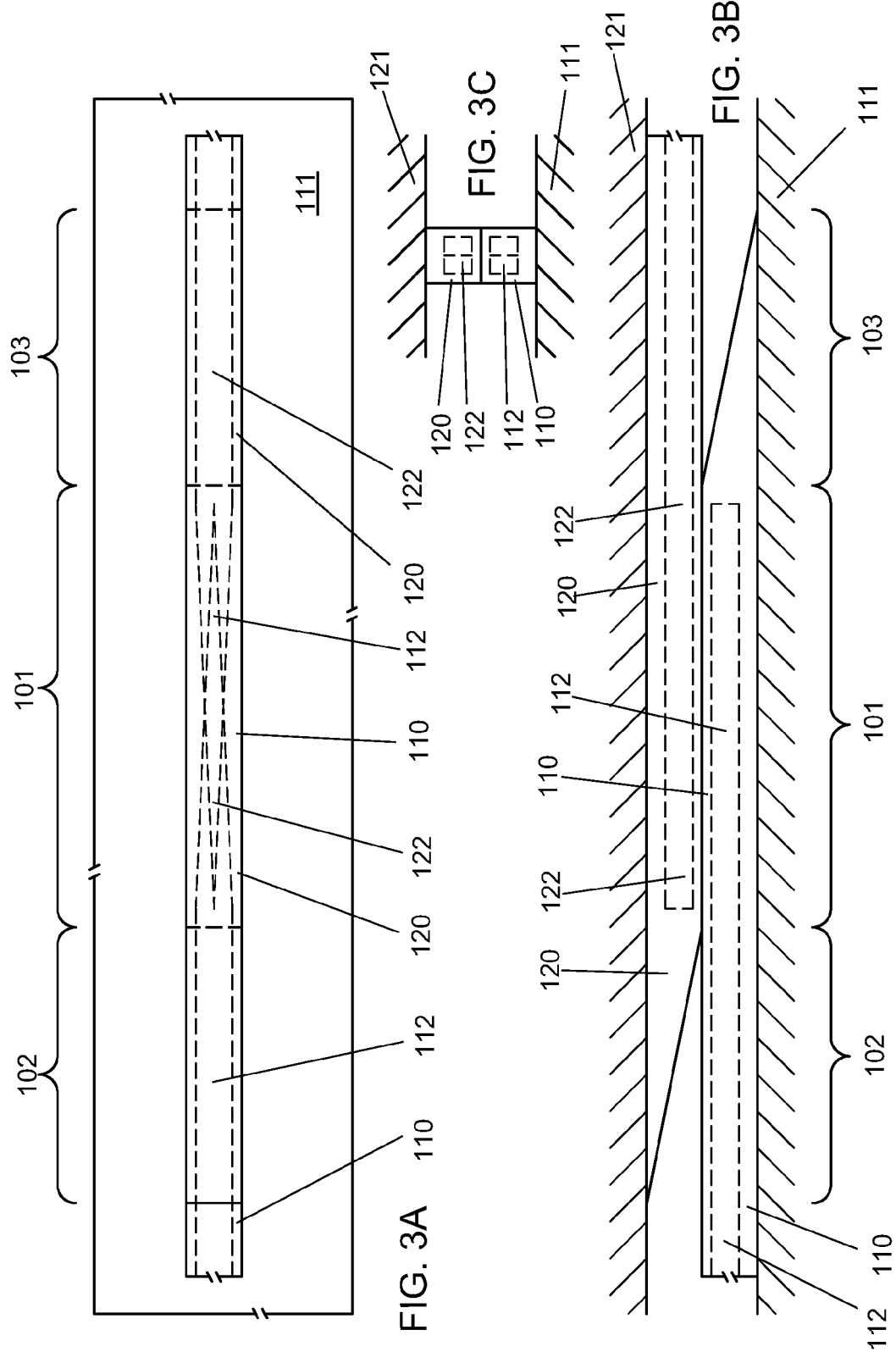

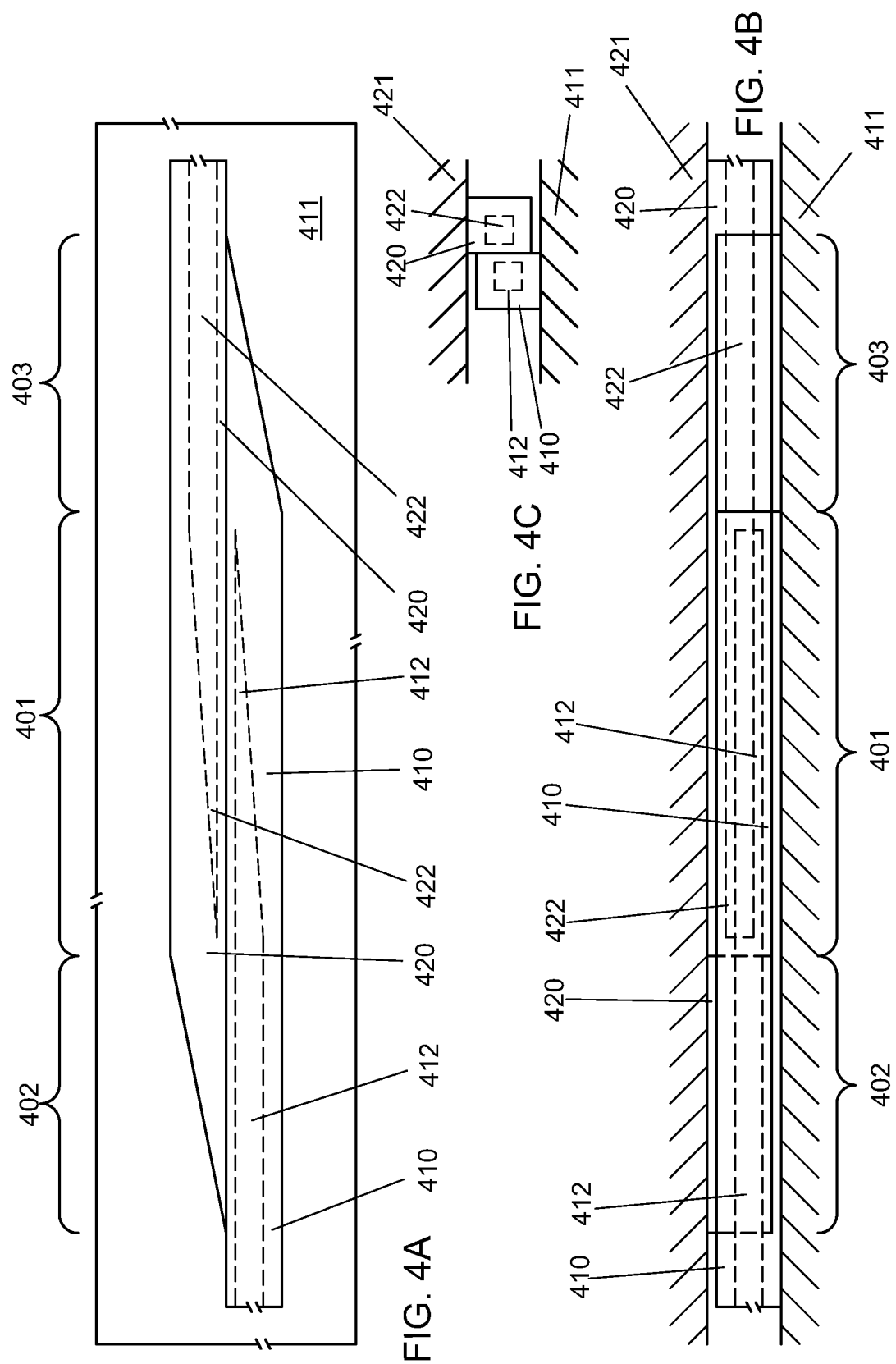

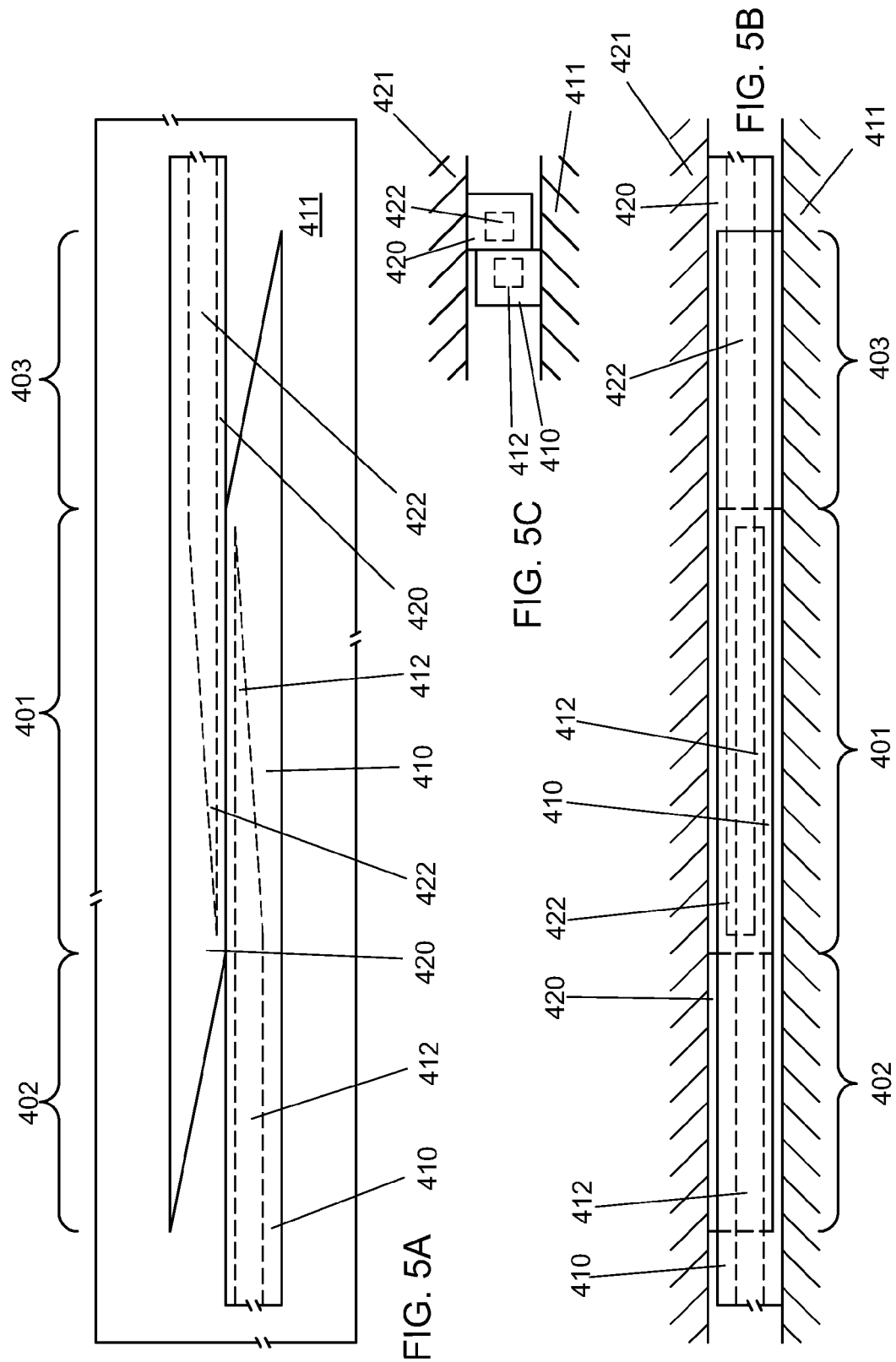

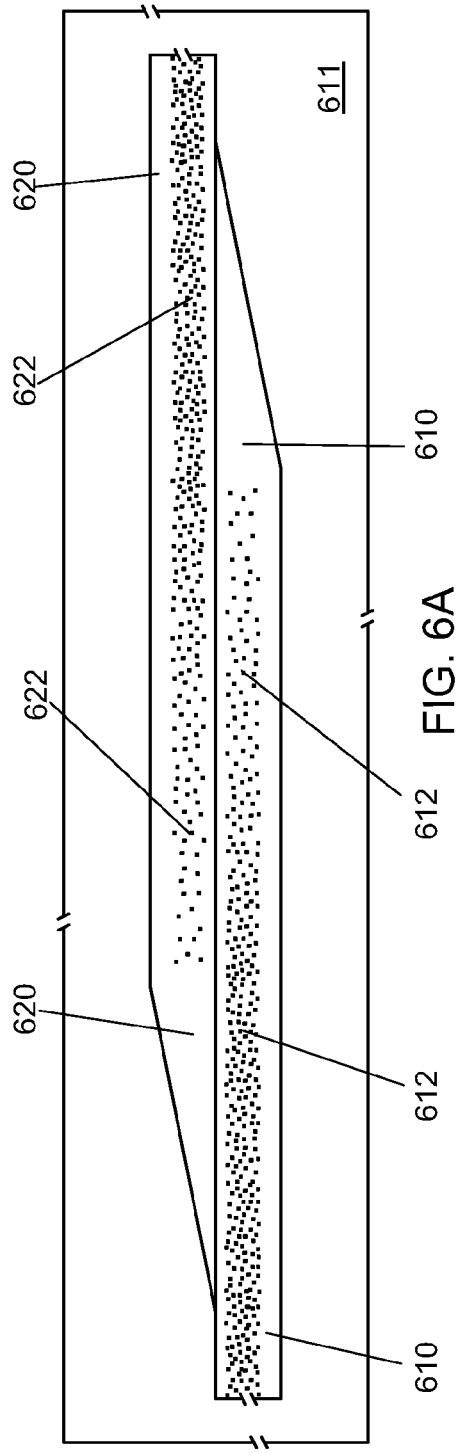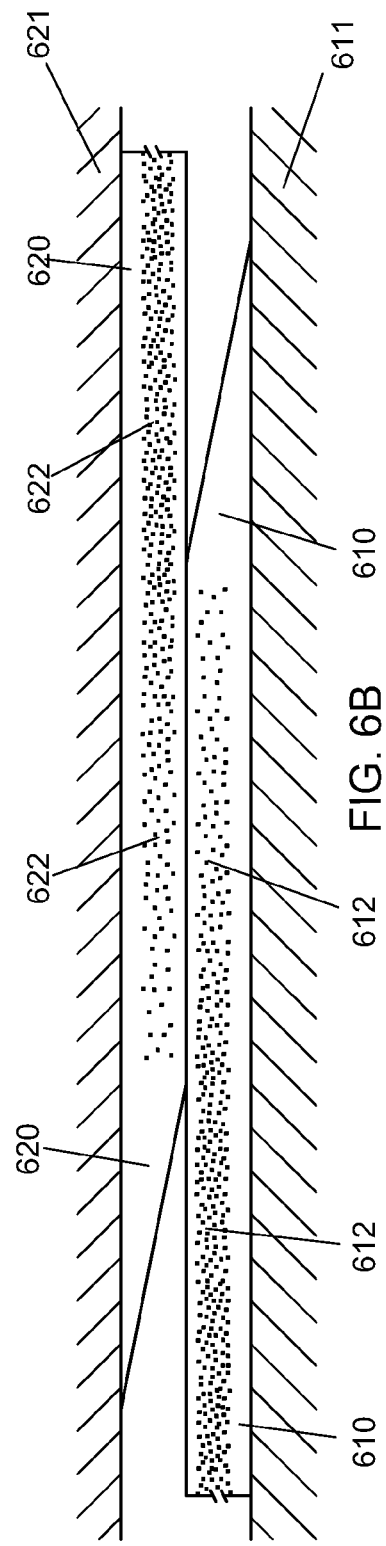

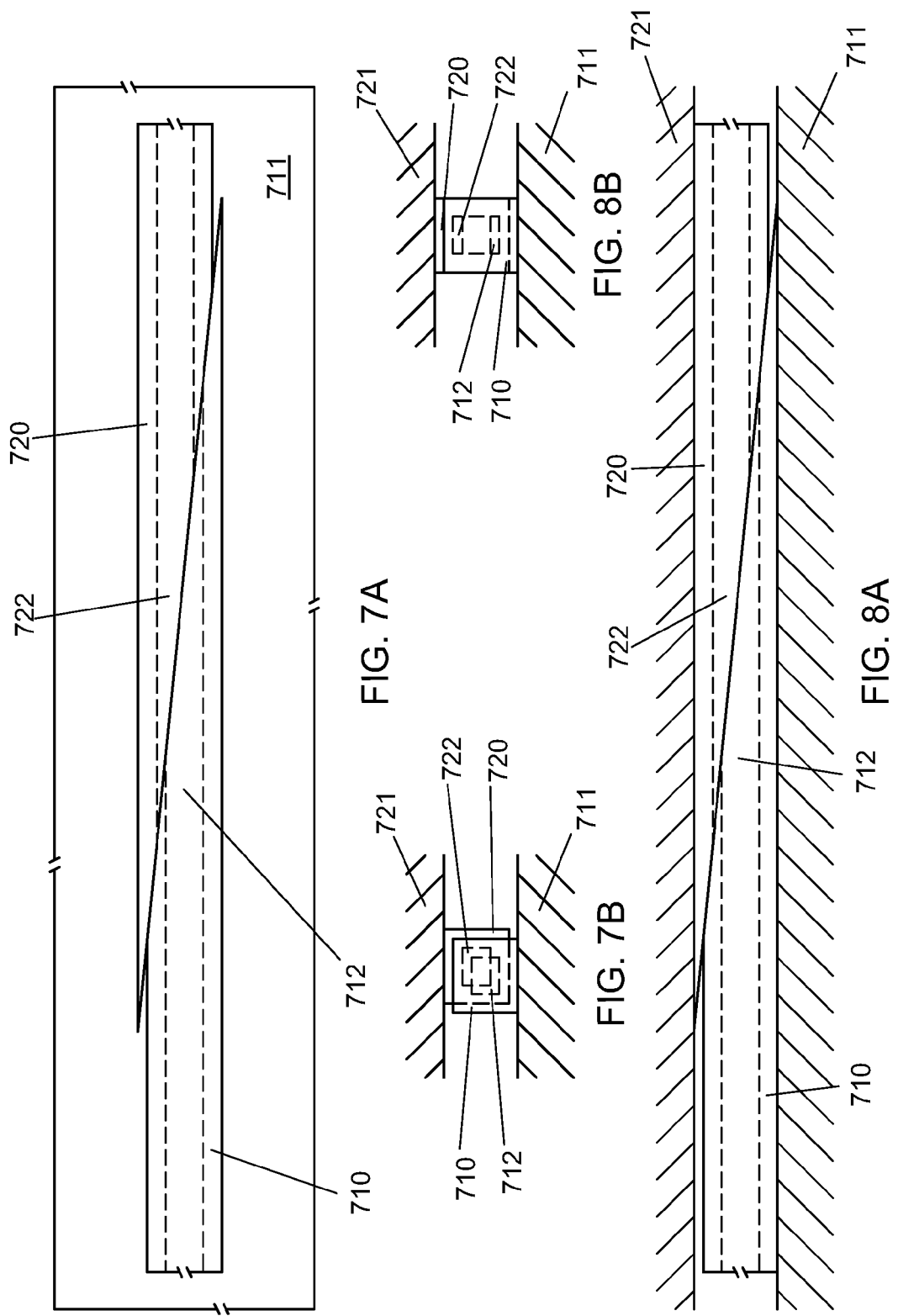

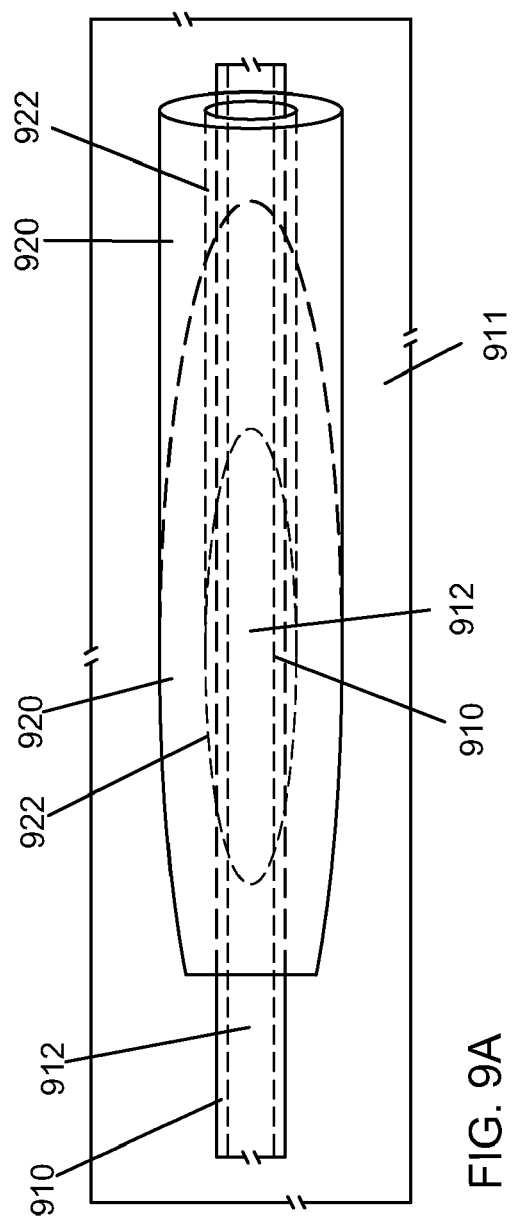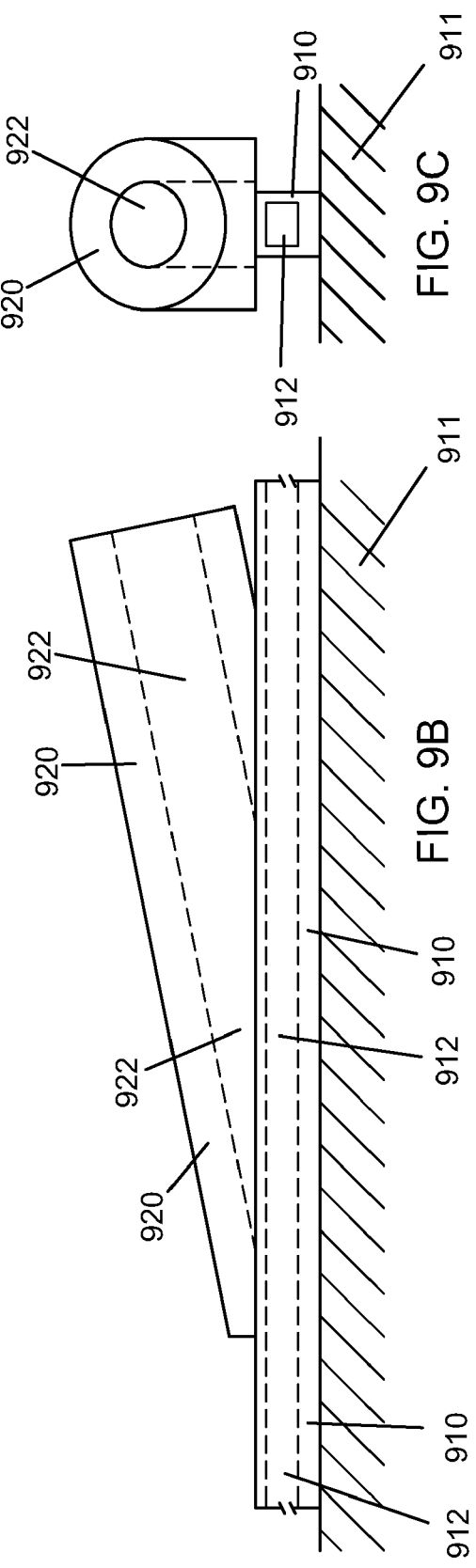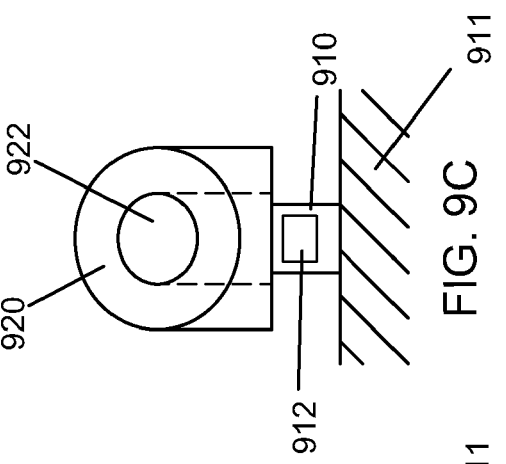

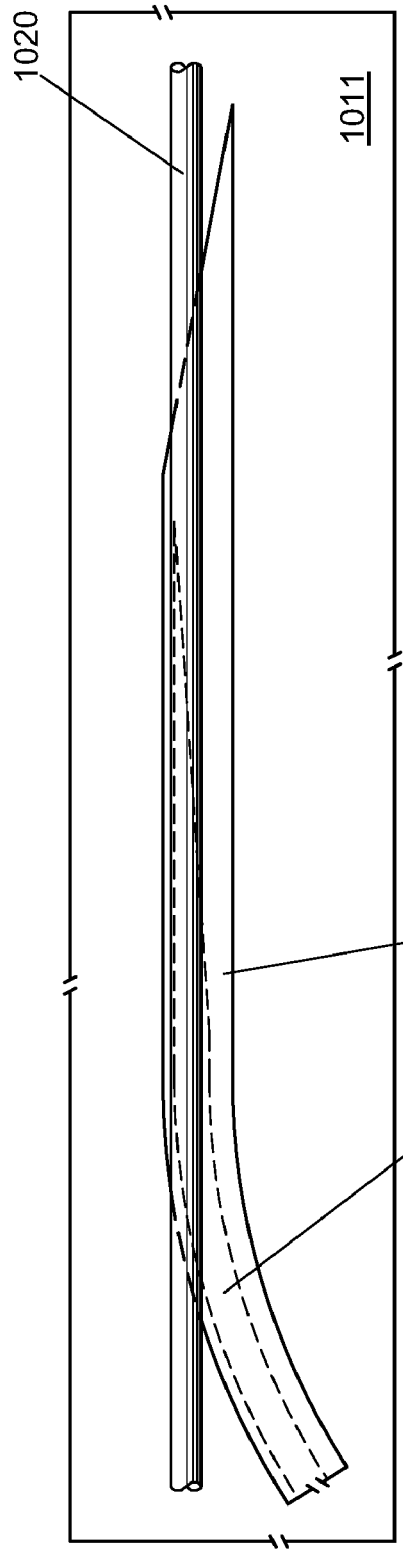
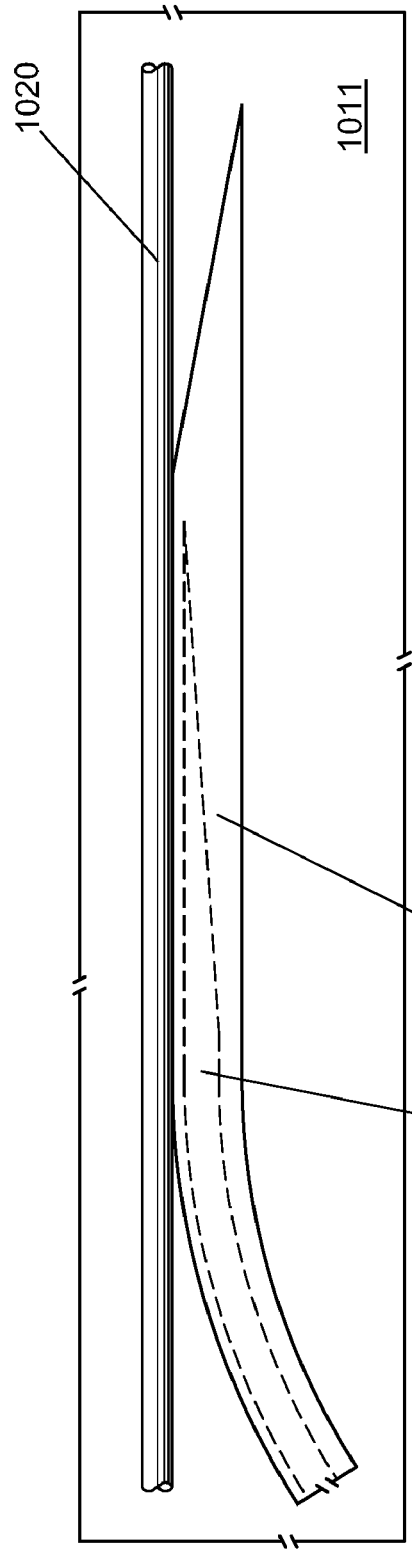
FIG. 10A
FIG. 10B

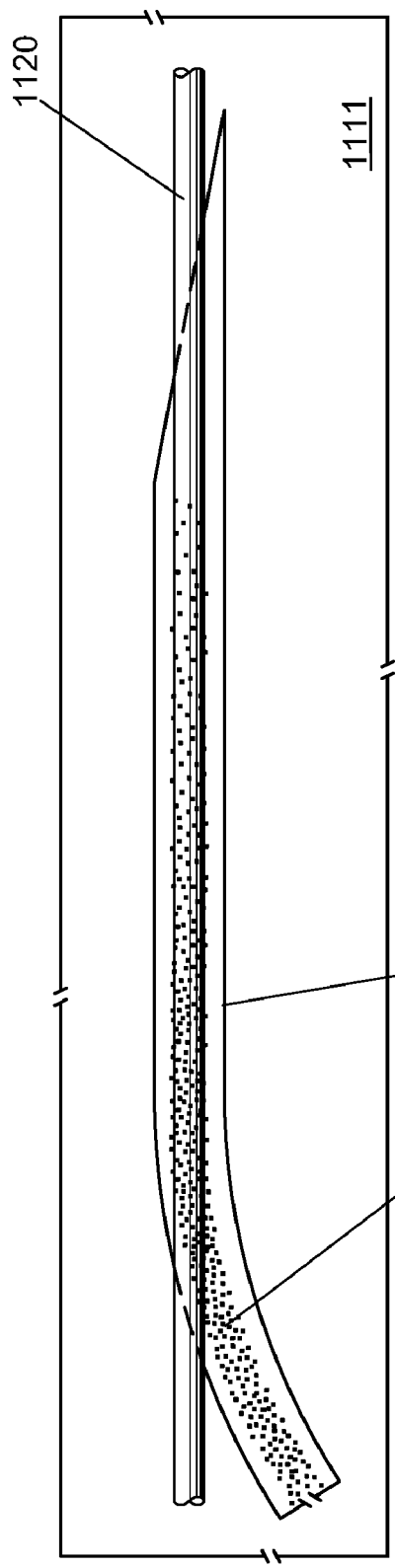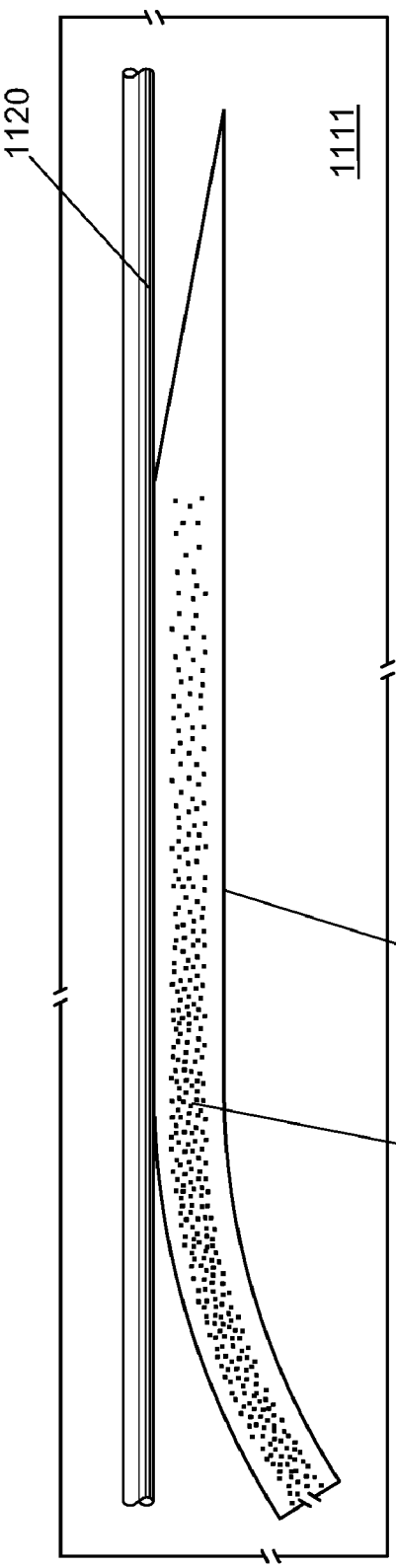

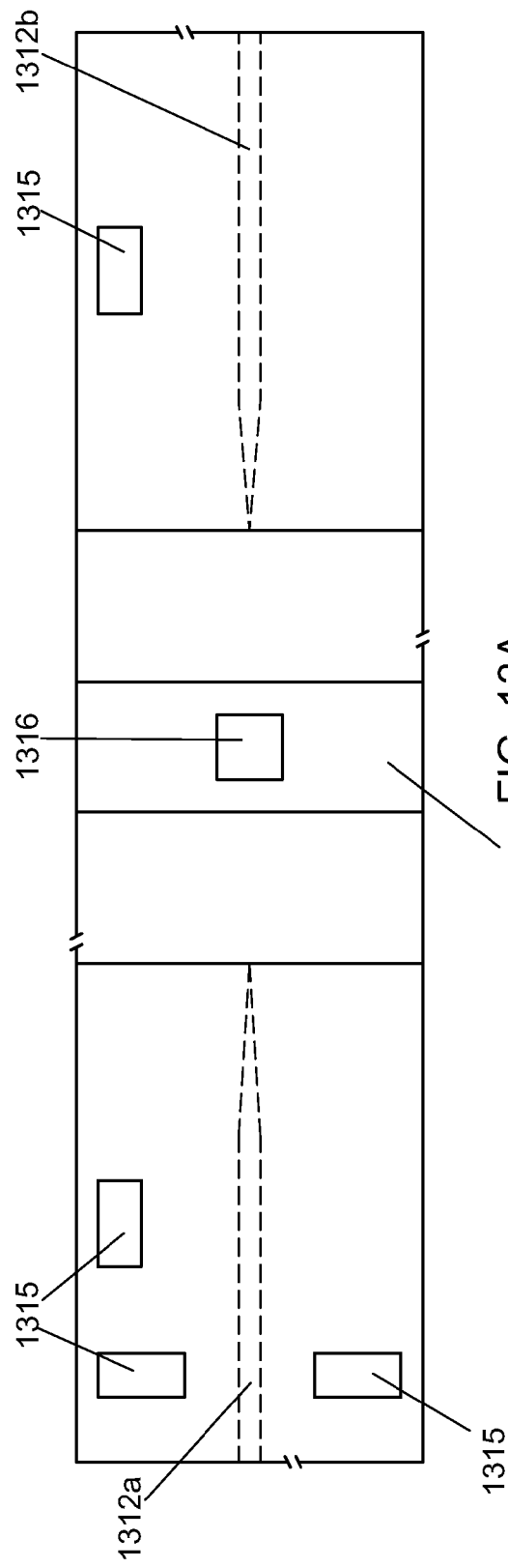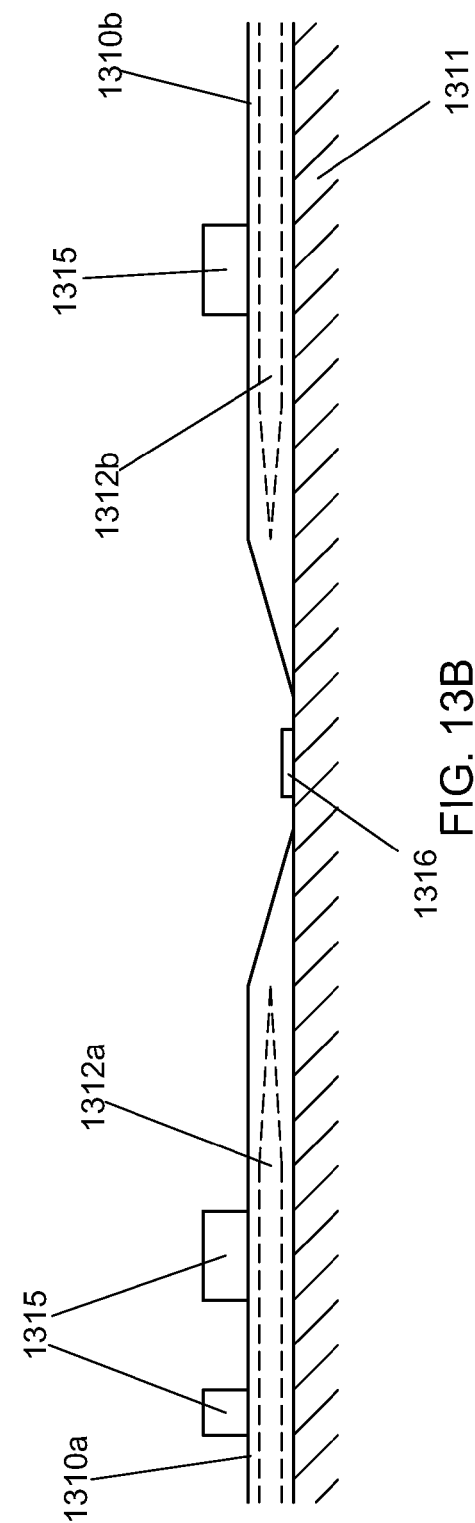

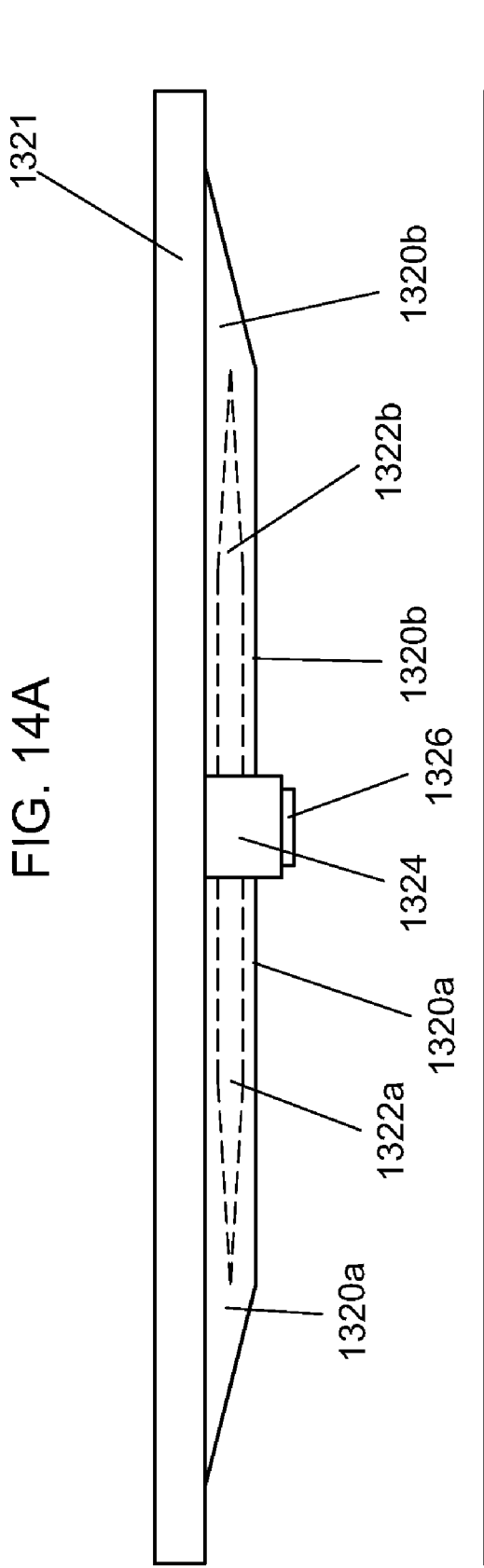

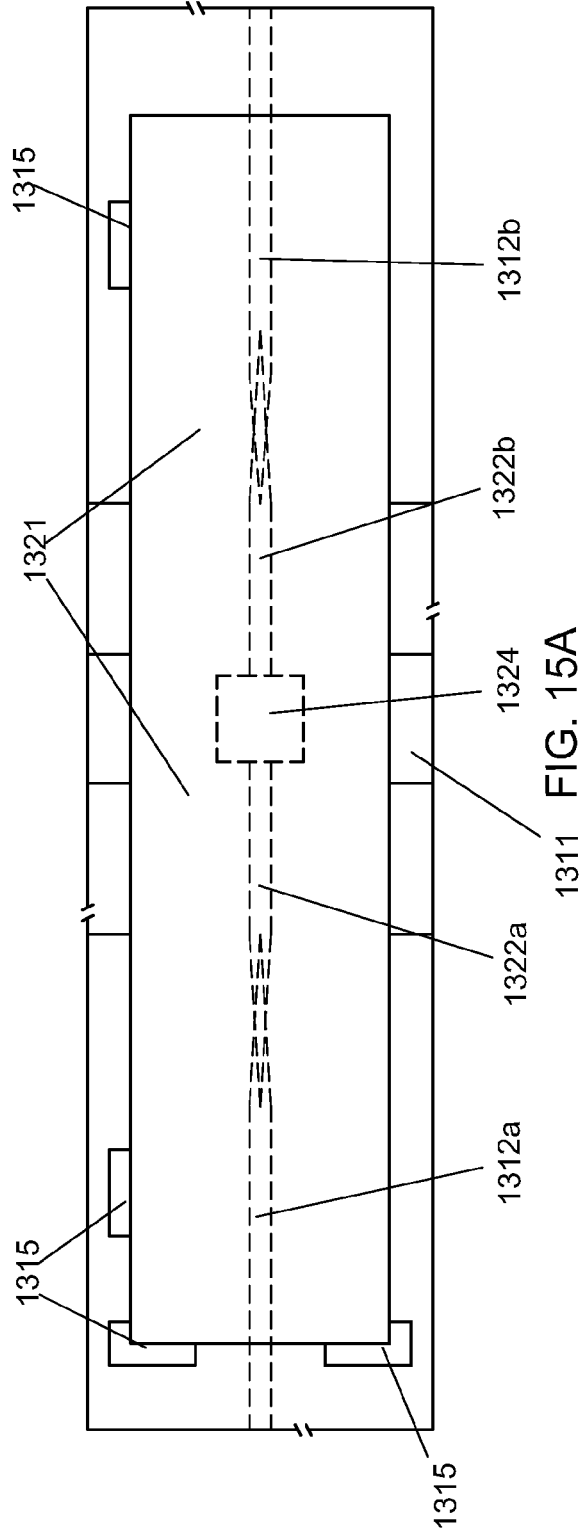
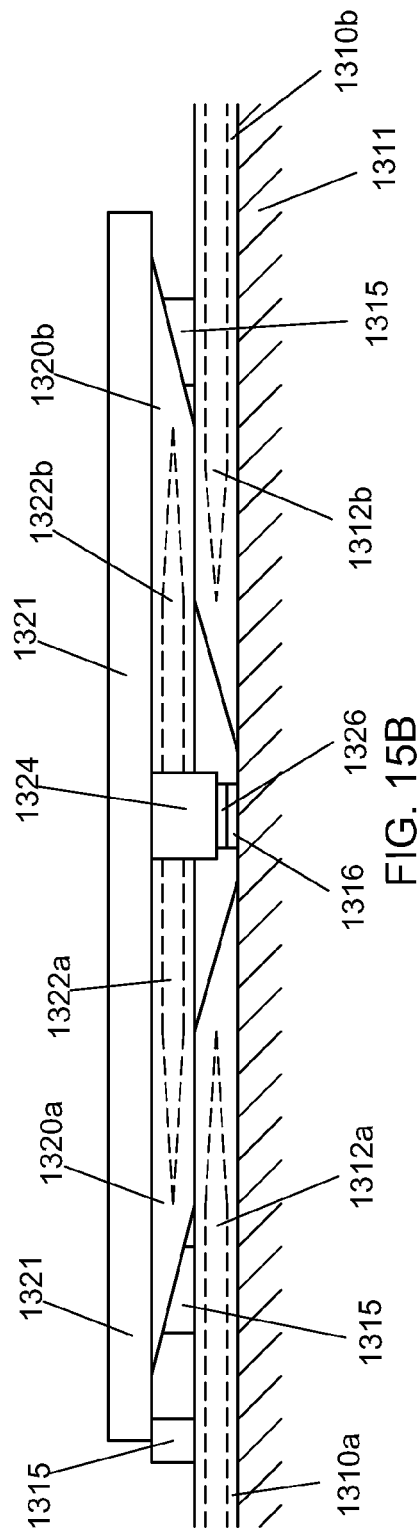

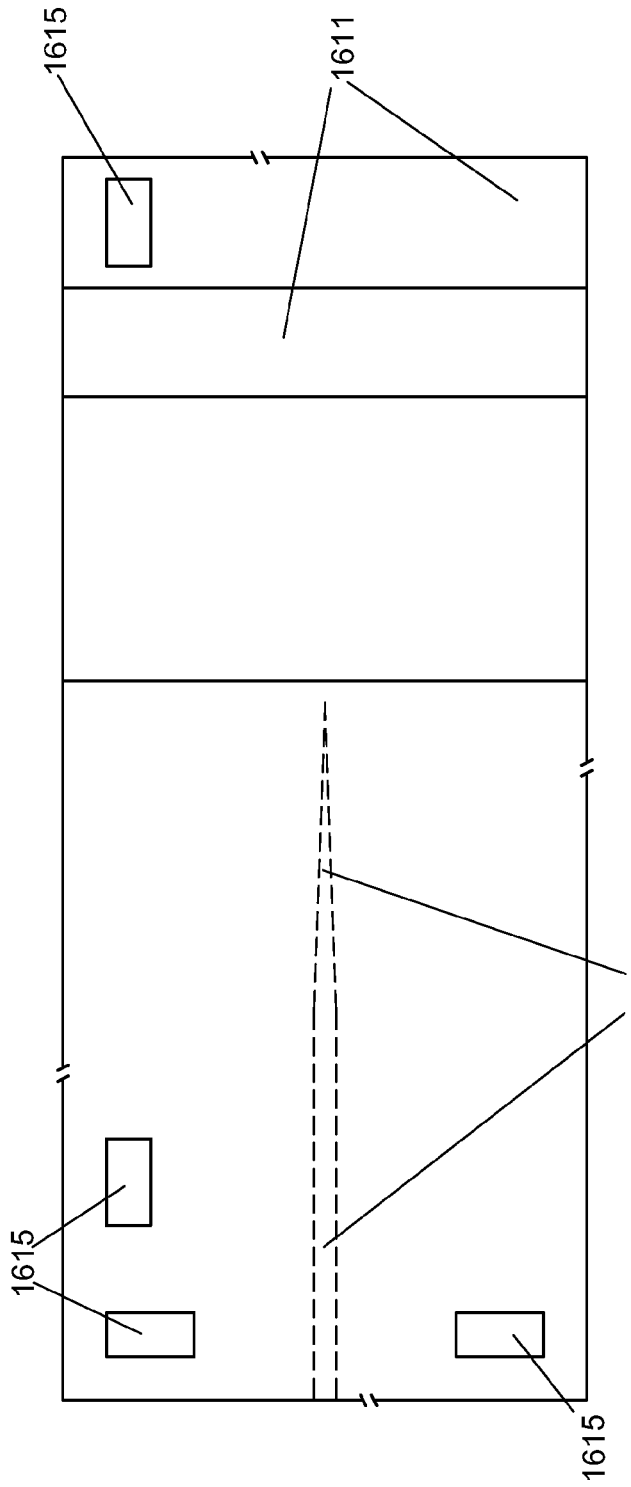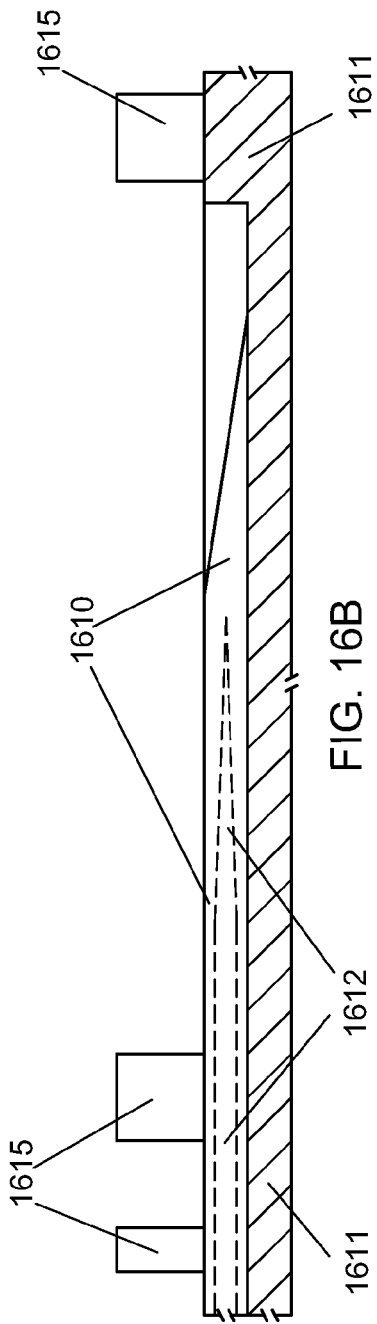

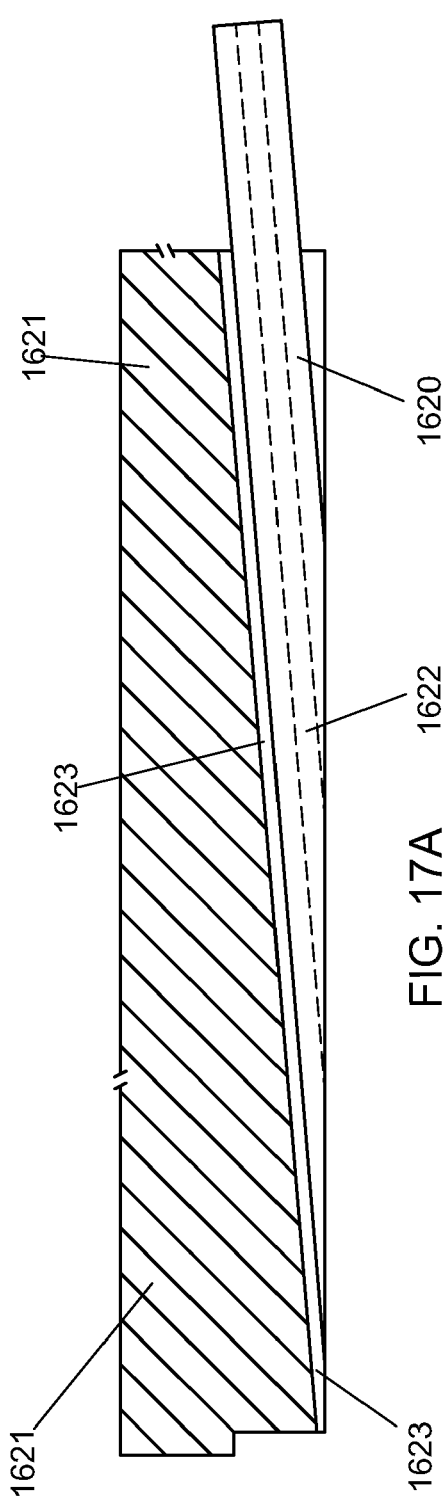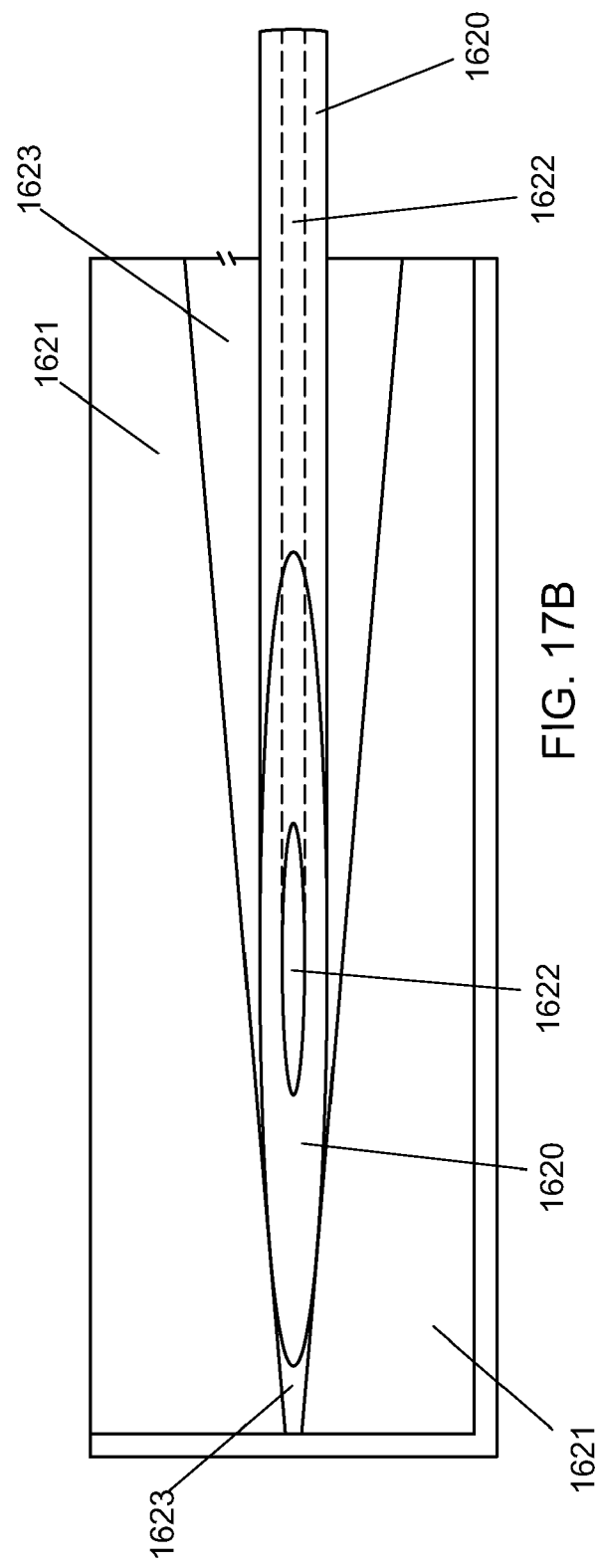
FIG. 17A
FIG. 17B

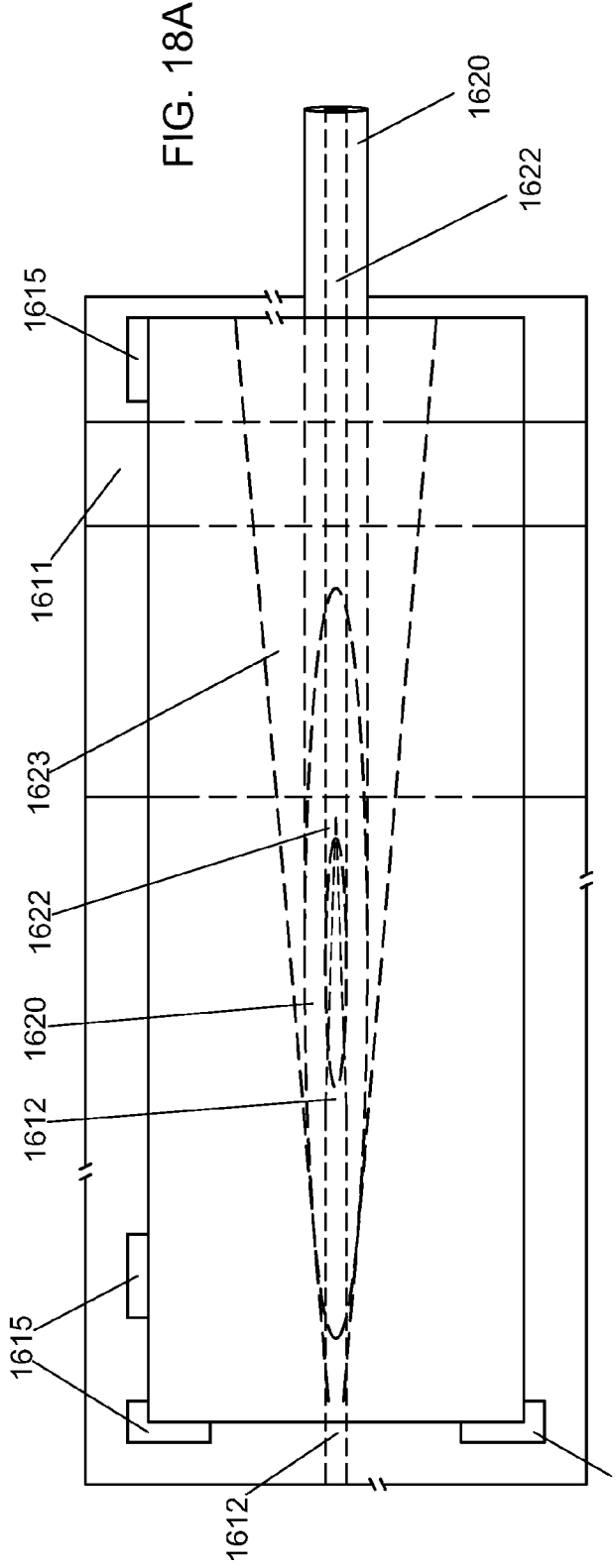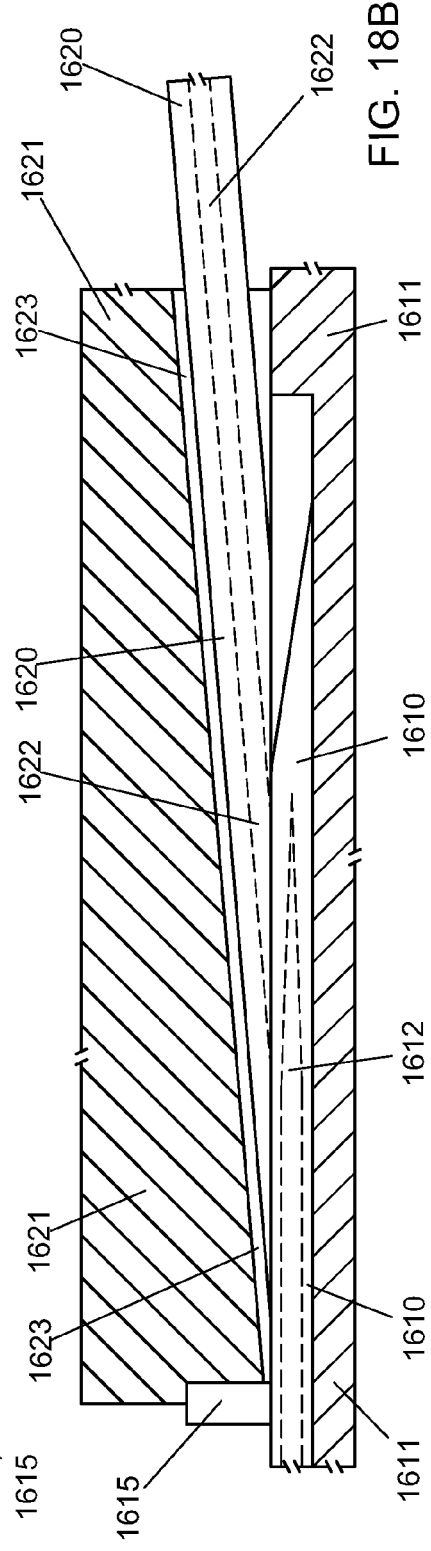

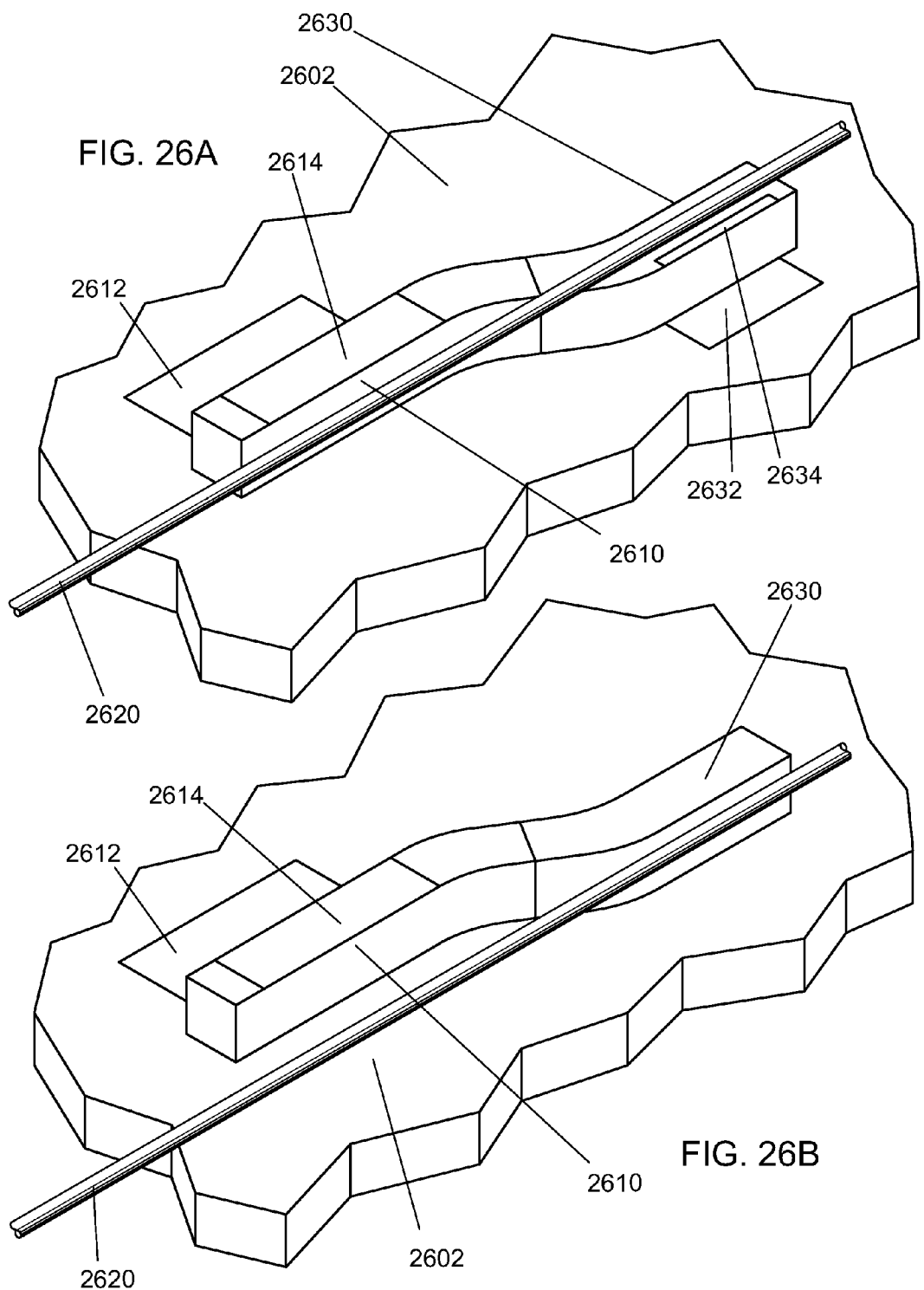

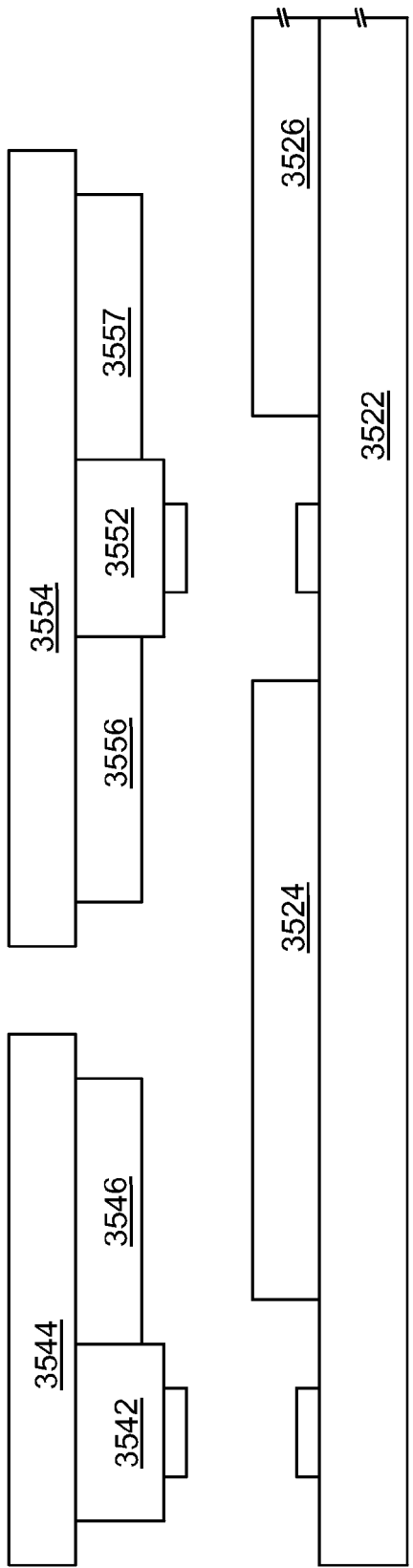
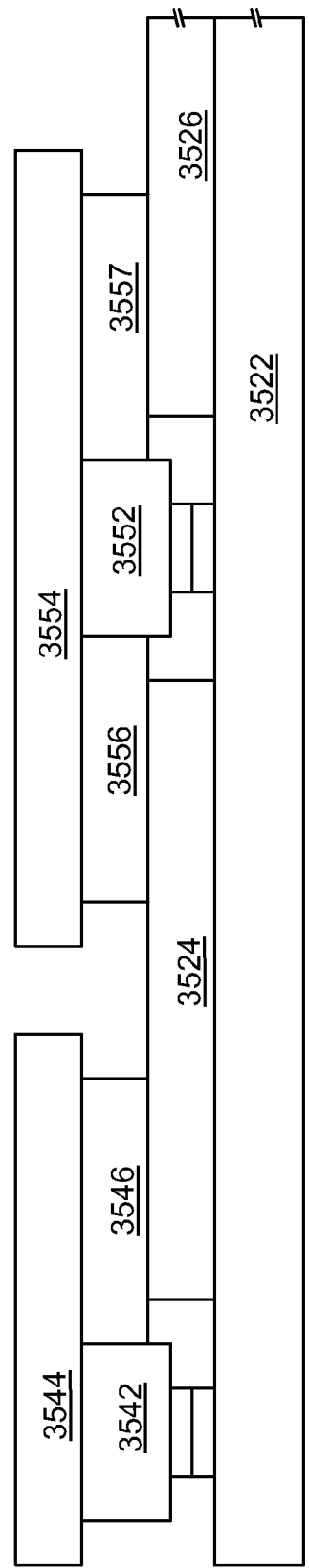
FIG. 36A
FIG. 36B

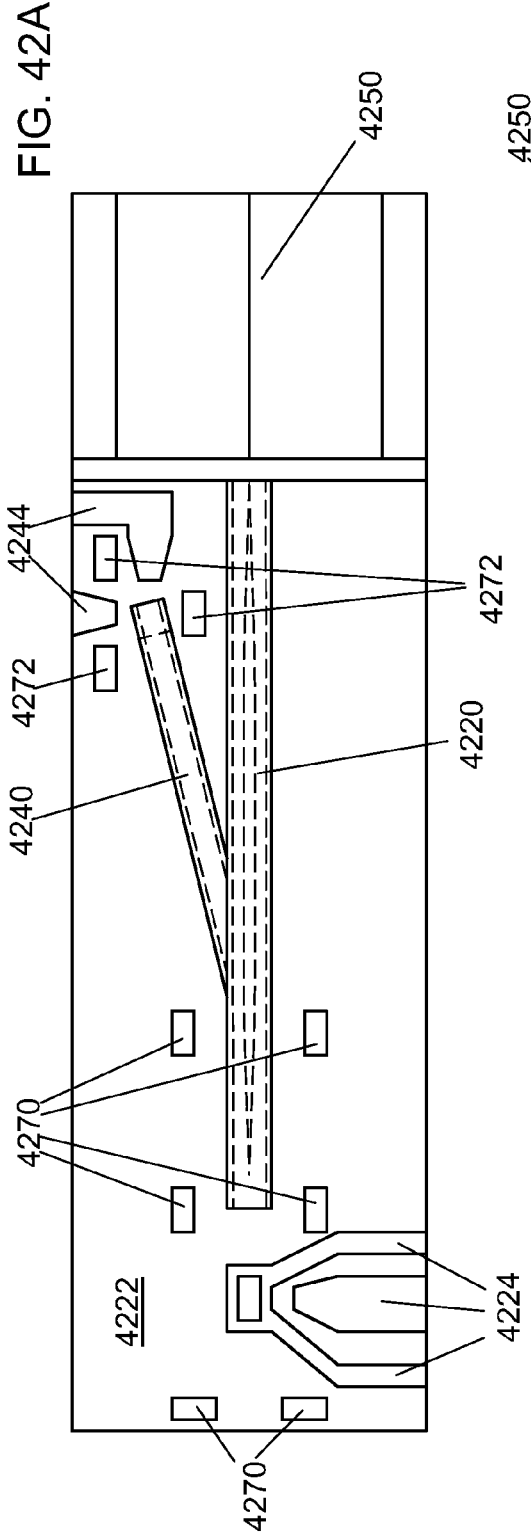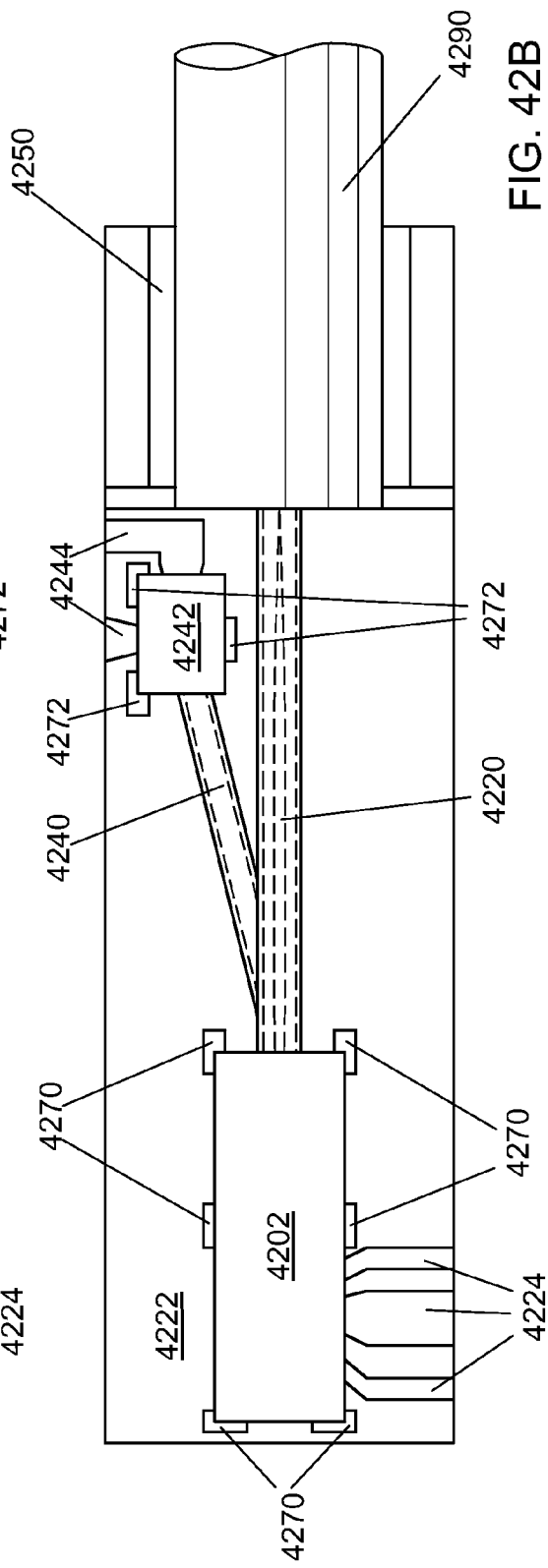

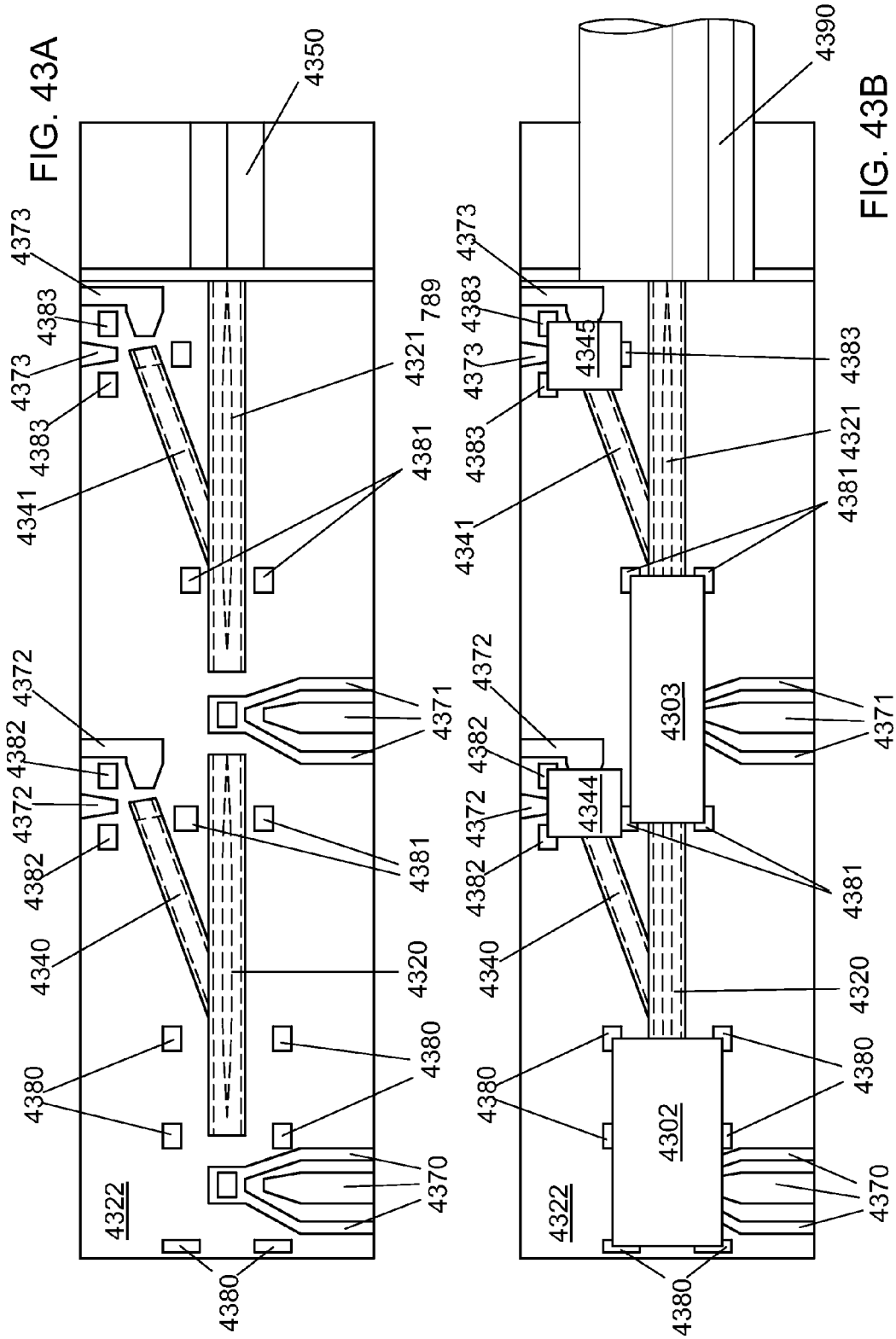

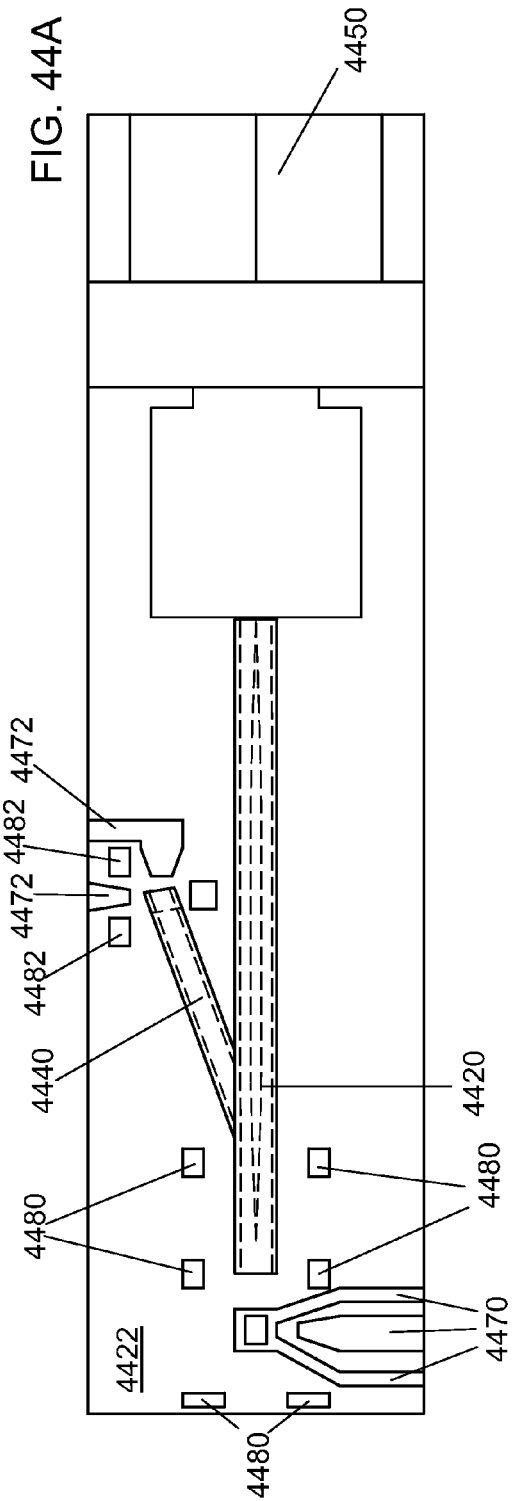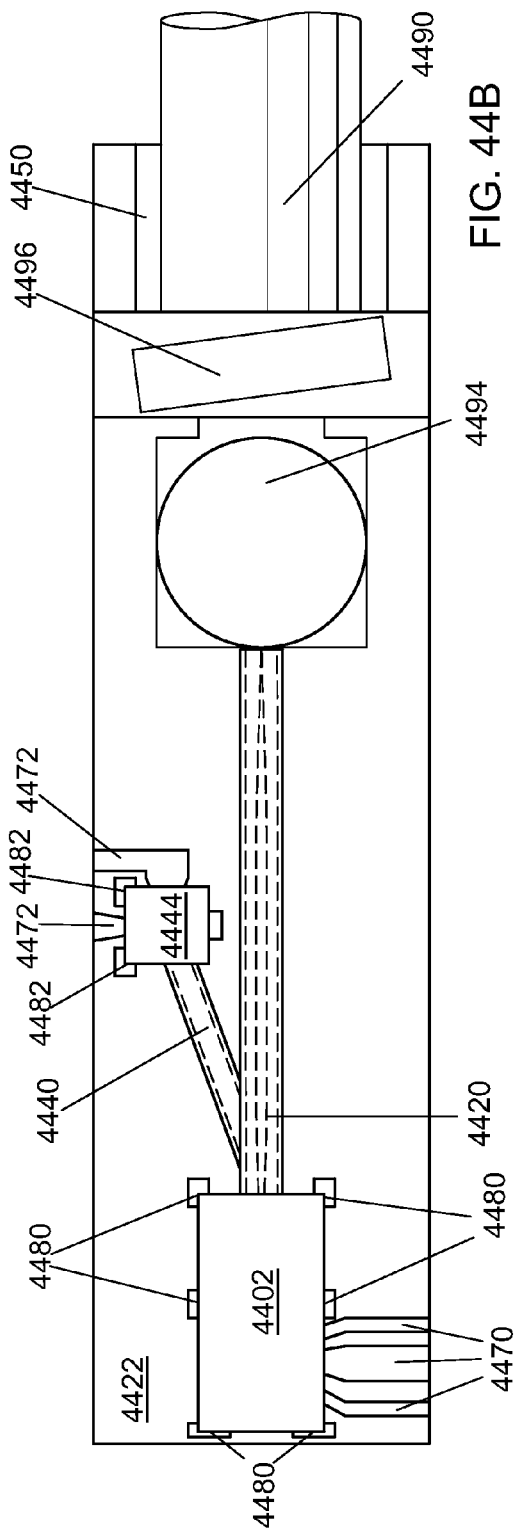

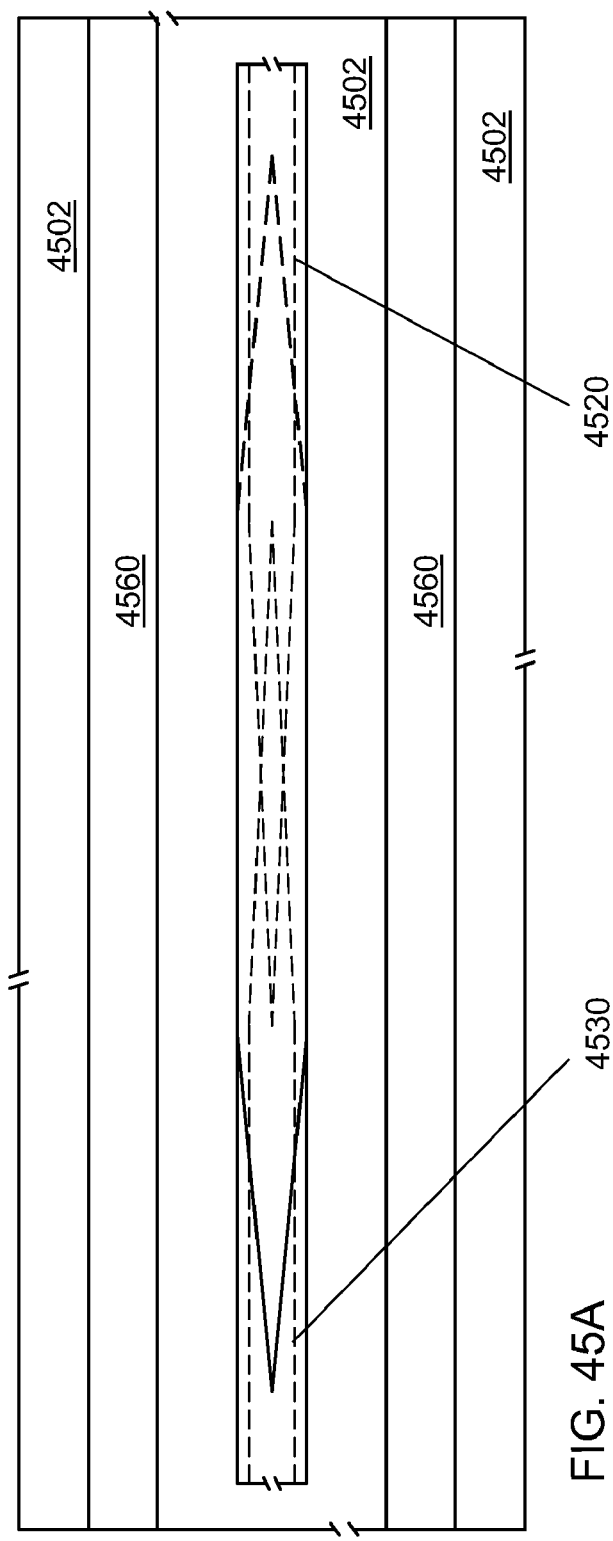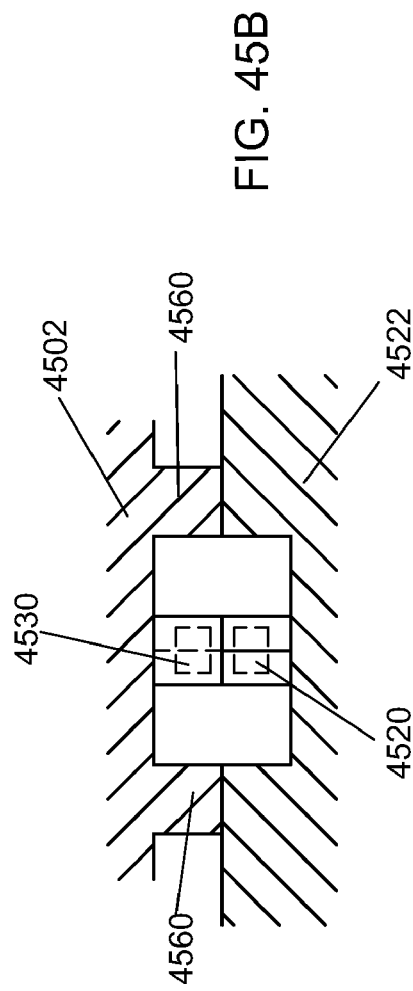
FIG. 45A
FIG. 45B

OPTICAL JUNCTION APPARATUS AND METHODS EMPLOYING OPTICAL POWER TRANSVERSE-TRANSFER

This application is a continuation of U.S. non-provisional application Ser. No. 12/126,883 filed May 25, 2008, which is in turn a continuation of U.S. non-provisional application Ser. No. 11/623,688 filed Jan. 16, 2007 (now U.S. Pat. No. 7,379, 638), which is in turn a continuation of U.S. non-provisional application Ser. No. 11/327,920 filed Jan. 9, 2006 (now U.S. Pat. No. 7,164,825), which is in turn a continuation of U.S. non-provisional application Ser. No. 10/187,030 filed Jun. 28, 2002 (now U.S. Pat. No. 6,987,913), which in turn claims benefit of U.S. provisional App. No. 60/334,705 filed Oct. 30, 2001 and U.S. provisional App. No. 60/360,261 filed Feb. 27, 2002. Each of said non-provisional and provisional applications is hereby incorporated by reference as if fully set forth herein.

BACKGROUND

The field of the present invention relates to optical telecommunications. In particular, optical junction apparatus and methods are described herein employing transverse-transfer of optical power between assembled optical components.

This application is related to subject matter disclosed in:

A1) U.S. provisional Application No. 60/257,218 entitled "Waveguides and resonators for integrated optical devices and methods of fabrication and use thereof" filed Dec. 21, 2000 in the name of Oskar J. Painter, said provisional application being hereby incorporated by reference in its entirety as if fully set forth herein;

A2) U.S. provisional Application No. 60/301,519 entitled "Waveguide-fiber Mach-Zender interferometer and methods of fabrication and use thereof" filed Jun. 27, 2001 in the names of Oskar J. Painter, David W. Vernooy, and Kerry J. Vahala, said provisional application being hereby incorporated by reference in its entirety as if fully set forth herein;

A3) U.S. provisional Application No. 60/322,272 entitled "Fiber-optic-taper probe for characterizing transversely-optically-coupled waveguides and resonators" filed Sep. 13, 2001 in the name of David W. Vernooy, said provisional application being hereby incorporated by reference in its entirety as if fully set forth herein;

A4) U.S. Pat. No. 5,032,219 entitled "Method for improving the planarity of etched mirror facets" issued Jul. 16, 1991 in the names of Peter. L. Buchman, Peter Vettiger, Otto Voegeli, and David J. Webb, said patent being hereby incorporated by reference in its entirety as if fully set forth herein;

A5) U.S. Pat. No. 5,103,493 entitled "Improved planar etched mirror facets" issued Apr. 7, 1992 in the names of Peter. L. Buchman, Peter Vettiger, Otto Voegeli, and David J. Webb, said patent being hereby incorporated by reference in its entirety as if fully set forth herein;

A6) U.S. Pat. No. 5,177,031 entitled "Method of passivating etched mirror facets of semiconductor laser diodes" issued Jan. 5, 1993 in the names of Peter. L. Buchman, David J. Webb, and Peter Vettiger, said patent being hereby incorporated by reference in its entirety as if fully set forth herein;

A7) U.S. Pat. No. 5,259,049 entitled "Self-aligned optical waveguide to laser structure and method of making the same" issued Nov. 2, 1993 in the names of Gian-Luca Bona, Fritz Gfeller, Heinz Jaeckel, and David J. Webb, said patent being hereby incorporated by reference in its entirety as if fully set forth herein;

A8) U.S. provisional App. No. 60/334,705 entitled "Integrated end-coupled transverse-optical-coupling apparatus and methods" filed Oct. 30, 2001 in the names of Henry A. Blauvelt, Kerry J. Vahala, Peter C. Sercel, Oskar J. Painter, and Guido Hunziker, said application being hereby incorporated by reference in its entirety as if fully set forth herein;

A9) U.S. provisional App. No. 60/333,236 entitled "Alignment apparatus and methods for transverse optical coupling" filed Nov. 23, 2001 in the names of Charles I. Grosjean, Guido Hunziker, Paul M. Bridger, and Oskar J. Painter, said application being hereby incorporated by reference in its entirety as if fully set forth herein;

A10) U.S. non-provisional application Ser. No. 10/037, 966 (now U.S. Pat. No. 6,839,491) entitled "Multi-layer dispersion-engineered waveguides and resonators" filed Dec. 21, 2001 in the names of Oskar J. Painter, David W. Vernooy, and Kerry J. Vahala, said application being hereby incorporated by reference in its entirety as if fully set forth herein; and A11) U.S. provisional App. No. 60/360,261 entitled "Alignment-insensitive optical junction apparatus and methods employing adiabatic optical power transfer" filed Feb. 27, 2002 in the names of Henry A. Blauvelt, Kerry J. Vahala, David W. Vernooy, and Joel S. Paslaski, said provisional application being hereby incorporated by reference as if fully set forth herein.

This application is also related to subject matter disclosed in the following publications, each of said publications being hereby incorporated by reference in its entirety as if fully set forth herein:

P1) Y. P. Li and C. H. Henry, Silicon Optical Bench Waveguide Technology, in Optical Fiber Telecommunications, IIIb, I. P. Kaminow and T. L. Koch eds., Academic Press, 1997;

P2) T. Ramadan, R. Scarmozzino, and R Osgood "Adiabatic Couplers: Design Rules and Optimization" IEEE J. Lightwave Tech., v16, No. 2, pp 277-283, (1998);

P3) D. G. Dalgoutte, R. B. Smith, G. Achutaramayya, and J. H. Harris, "Externally mounted fibers for integrated optics interconnections", Appl. Optics Vol. 14, No. 8, pp 1860-1865 (1975); and P4) Y. Shani, C. H. Henry, R. C. Kistler, R. F. Kazarinov, and K. J. Orlowsky, "Integrated optic adiabatic devices on silicon", IEEE J. Quant. Elec., Vol. 27, No. 3, pp 556-566 (1991).

A fundamental problem in the field of optical telecommunications is attaining efficient and cost-effective transfer of optical signal power between assembled optical components. One particularly significant example is achieving optical signal power transfer between an active or passive optical device and a low-loss transmission optical waveguide, including optical fibers and/or planar waveguide circuits. Examples of active optical devices may include but are not limited to semiconductor lasers, electro-absorption modulators, electro-absorption modulated lasers, electro-optic modulators, semiconductor optical amplifiers, photodiodes or other photodetectors, N×N optical switches, and so forth. Examples of passive devices may include but are not limited to wavelength division multiplexers/de-multiplexers, wavelength division slicers/interleavers, wavelength division add/drop filters, other optical filters, splitters/combiners, interferometers, phase shifters, dispersion compensators, fixed or variable optical attenuators, and so forth. Such optical devices often involve generation of, interaction with, and/or manipulation of optical modes that are typically small (particularly in semiconductor-based devices), often on the order of just a few microns across and sometimes less than 1 micron high. This interacting mode size is typically much smaller than an optical mode size supported by a single-mode optical fiber or a planar lightwave circuit (generally about ten microns across).

End-coupling of an optical fiber or planar waveguide circuit to an optical device is therefore often inefficient (around 5-15%) due to spatial mode mismatch, yielding devices having undesirably large insertion losses. Prior art methodologies exist for achieving higher end-coupling efficiencies, but these require expensive components for achieving better mode-matching (aspheric lenses and the like), and also require high-precision active alignment of the optical components and the optical device (required tolerances may be as small as 0.1 µm, and must typically be achieved on an individual device basis).

Prior art methodologies exist for low-cost end-coupled optical assembly (such as methodologies based on silicon optical bench technologies, for example). However, these low-cost solutions generally suffer from low optical power transfer efficiency between an optical device and an optical fiber or other waveguide, for the reasons set forth hereinabove.

Optical power transfer by end-coupling (equivalently, end-fire coupling or end-transfer) is characterized by positioning of the optical components in an end-to-end geometry substantially along the direction of propagation of the optical signal power to be transferred. At the optical junction thus formed, optical power propagates out through an end-face of one optical component and in through an end-face of another optical component. Alternatively, optical power transfer may be achieved by so-called transverse-coupling (equivalently, transverse-transfer), in which the optical components are positioned in a side-by-side geometry relative to the direction of propagation of the optical signal power. At the optical junction formed by transverse-coupling, there is typically at least one segment of the junction with optical power propagating along both components simultaneously.

Efficient end-transfer between optical components requires that optical modes in the respective components be substantially spatial-mode matched. Transverse-transfer of optical power between an optical device and a transmission optical waveguide provides an alternative to end-transfer for transferring optical signal power between an optical device and a transmission waveguide (through a taper segment of an optical fiber or through a suitably adapted portion of a planar waveguide, for example). In particular, the requirement for spatial-mode matching is eliminated; transverse-transfer of optical power may be achieved between optical modes of differing spatial-mode size and/or shape.

Transverse-transfer (also referred to as transverse coupling, transverse optical coupling, evanescent optical coupling, evanescent coupling, directional optical coupling, directional coupling) is discussed at length in several of the prior patent applications cited hereinabove, and the entire discussion need not be repeated herein. Transverse-transfer may be readily described in terms of optical modes characteristic of the separate optical waveguides (or other optical components) transitioning to the optical modes characteristic of a coupled-waveguide optical system. These latter modes are referred to herein as the "system modes" or "coupled-system modes", while the former modes are referred to herein as the "isolated modes" or "isolated-waveguide modes". Efficient transfer of optical signal power between optical waveguides by transverse-coupling may be achieved in one of several operating regimes. Two such regimes discussed herein are so-called mode-interference coupling and so-called adiabatic optical power transfer.

In so-called mode-interference coupling (described in several of the above-cited references, particularly A8 and A10, and referred to therein simply as transverse optical coupling), optical signal power entering a junction region from one waveguide is divided between two guided system modes. Ideally, this transition into the junction region is configured so that the isolated mode is very nearly a linear superposition of the two lowest order system modes. This condition results in minimal power loss to higher order system modes (and/or radiation modes) as optical signal power enters the junction region. The two system modes propagate through the junction region along the waveguides with differing propagation constants (designated as $\beta+$ and $\beta-$ for the two lowest-order system modes). Upon reaching the end of the junction region, optical signal power is divided into the two waveguides according to the relative phase of the two system modes. Once again, to minimize loss to higher-order and/or radiative modes, the isolated modes should substantially resemble linear superpositions of the two system modes. Since this is typically the case in practical devices, and presents a reasonable approximation even when it is not the case, it is usually possible to describe the characteristics of the junction region in terms of properties of the isolated modes, and such a description shall be used hereinafter. In particular, the degree of optical signal power transfer via mode-interference coupling is determined by the degree of transverse overlap between the isolated-waveguide modes, (characterized by a coupling coefficient $\kappa$), by the propagation distance over which the modes overlap (i.e., junction region length or interaction length L), and by the degree of modal index mismatch (characterized by $\Delta\beta=\beta_1-\beta_2$, the $\beta$'s being the propagation constants for the respective isolated-waveguide modes). In mode-interference coupling, $\kappa$, $\beta_1$, $\beta_2$ are typically assumed to remain substantially constant over the length L of the junction region. Transfer of optical power between the mode-interference-coupled waveguides is given by (neglecting the effects of optical losses):

$$\frac{|E_2(L)|^2}{|E_1(0)|^2} = \frac{|\kappa|^2}{q^2}\sin^2(qL)$$

$$q^2 = |\kappa|^2 + \frac{1}{4}\Delta\beta^2.$$

where the following definitions apply:
$E_{1,2}(z)$ amplitudes of the coupled fields;
$\beta_{1,2}$ propagation constants of the coupled fields;
$\kappa$ coupling amplitude resulting from spatial overlap of the fields;
z longitudinal propagation distance coordinate An incident field of amplitude $E_1$ that is spatially confined to a first optical waveguide before the junction region will transfer to the other optical element with a resultant field amplitude $E_2(L)$ at $z=L$ (where we define $z=0$ as the start of the junction region and $z=L$ as the end of the junction region). Optical power transfer as a function of the junction region length L is therefore oscillatory with a characteristic period or "beat length" that depends on $\kappa$ and $\Delta\beta$. This may be thought of as a manifestation of the interference between the system modes excited within the junction region, both of which carry optical signal power. Greater coupling amplitude $\kappa$ and/or greater modal-index mismatch $\Delta\beta$ will reduce the beat length. The absolute magnitude of the oscillatory power transfer decreases with increasing modal-index mismatch, with substantially complete transfer of optical power back and forth between the optical elements when $\Delta\beta$ is near zero. A particular degree of optical power transfer from one waveguide to the other may be achieved by configuring the junction region with the length L to achieve the desired transfer fraction for a given $\Delta\beta$ and $\kappa$.

To understand the distinction between mode interference coupling and adiabatic power transfer, it is first necessary to understand the meaning of the adiabatic condition within the general context of an optical waveguide. Two examples are presented for illustration. Consider first a single mode waveguide that is tapered over some segment of its length so as to modify both the transverse extent and the propagation constant of the guided mode. Tapering of a waveguide supporting even a single mode induces coupling to radiation modes. However, provided that the tapering is sufficiently gradual so that this radiative loss is weak (i.e., adiabatic tapering), it still makes sense to consider the optical power traversing the tapered waveguide as representing a single mode, albeit one whose properties have a longitudinal position dependence (i.e. z-dependence) as it traverses the tapered waveguide segment. Provided the adiabatic condition is satisfied (i.e., tapering is slow enough to render coupling to other modes minimal or below an operationally acceptable level), it is possible to describe the mode using longitudinally varying quantities such as a z-dependent propagation "constant" $\beta(z)$.

As a second example, the properties of a waveguide could be varied along the longitudinal propagation direction so that the waveguide at one position supports a single transverse mode while at another position supports two or more transverse modes. In this example, adiabatic variation of the waveguide properties would result in negligible (or operationally acceptable) coupling to these other modes so that once again it is possible to think of the single "mode" as being preserved as it propagates along the waveguide, albeit as a mode whose properties such as its propagation "constant" $\beta$ and/or its transverse spatial profile acquire a dependence on longitudinal position z along the waveguide.

This approximate way of considering optical modes subject to an adiabatic variation along the longitudinal or propagation direction is an important concept for understanding the operation of adiabatic power transfer devices. It is important to note that the term "mode" acquires a slightly more general meaning in the context of waveguides and junctions that satisfy an adiabatic condition. In particular, to the extent that coupling to other modes is minimal or remains at or below some operationally acceptable level, the terms "mode" and/or "optical mode" shall be used herein even if spatial, temporal, polarization, and/or other properties might evolve as the mode propagates along a waveguide whose properties vary longitudinally in an adiabatic fashion. This more general interpretation of modes is distinct from the more conventional use of the term "mode" which may typically imply preservation of certain modal properties, such as propagation constant $\beta$, transverse spatial profile, polarization state, and so on, as the mode propagates along a substantially longitudinally invariant waveguide.

For adiabatic optical power transfer, two isolated modes $a_1(z)$ and $a_2(z)$ characteristic of the isolated waveguides begin to experience weak coupling as they enter the junction region. Under the adiabatic condition this weak coupling may be characterized by a coupling coefficient $\kappa(z)$ and modal-index mismatch $\Delta\beta(Z)=\beta_1(Z)-\beta_2(z)$. The resulting system modes will substantially resemble the superposition modes $a+(z)$ and $a-(z)$ of the coupled-waveguide system given by $$a_\pm = \frac{\lambda_\pm}{\sqrt{\kappa^2 + \lambda_\pm^2}} a_1 + \frac{\kappa}{\sqrt{\kappa^2 + \lambda_\pm^2}} a_2 \text{ where } \lambda_\pm = \left(\frac{\Delta\beta}{2}\right) \pm \sqrt{\kappa^2 + \left(\frac{\Delta\beta}{2}\right)^2}$$

where all quantities are z-dependent. For purposes of the present discussion, the terms "superposition modes" and "system modes" may be used interchangeably, even though the system modes may not resemble the superposition modes throughout the junction region. At the beginning of the junction region (i.e., z=0), superposition mode $a_+$ preferably closely resembles only one of the isolated-waveguide modes $a_1$ or $a_2$, while mode $a_-$ resembles the other. For example, in the limit of $|\Delta\beta|\gg|\kappa|$ (i.e., strongly modal-index mismatched)

$$a_+ \approx a_1 + \frac{\kappa}{\Delta\beta}a_2 \approx a_1 \text{ and } a_- \approx a_2 - \frac{\kappa}{\Delta\beta}a_1 \approx a_2,$$

meaning each superposition mode is predominantly associated with a single isolated-waveguide mode in this limit (i.e., $a_+\Leftrightarrow a_1$ and $a_-\Leftrightarrow a_2$). For adiabatic optical coupling, preferably $|\Delta\beta|\gg|\kappa|$ for the isolated-waveguide modes at z=0. Under this input termination condition, the superposition modes (and hence also the system modes) substantially resemble the isolated-waveguide modes, and optical signal power entering the junction region in a first waveguide is transferred predominantly (even exclusively) into the corresponding system mode. The junction region is configured so that $|\Delta\beta|$ (for the isolated-waveguide modes) initially decreases along the junction region. The coefficient $\kappa$ may also vary along the junction region, preferably reaching a maximum absolute value within the junction region. As evident from the equations defining the superposition modes given above, the variation of $\Delta\beta$ and/or $\kappa$ results in evolution of the superposition modes (more precisely, the system modes) along the length of the junction region. As described above, the adiabatic condition requires that the variation of $\Delta\beta$ and/or $\kappa$ must be sufficiently gradual so that transfer of optical power between system modes and/or between a system mode and other optical modes (guided or otherwise) remains at or below some operationally acceptable level. This criterion is equivalent to the adiabatic condition described in reference P2. In particular, any change in waveguide spacing, transverse dimensions, modal and/or material index, or other properties (before, within, and/or after the junction region) must be sufficiently gradual so as to minimize or reduce to an operationally acceptable level optical power transfer into undesirable modes of the coupled-waveguide system.

The "approach regions" of the joined waveguides (i.e., the regions directly before and after the junction region; may also be referred to as input and output regions) should preferably be adapted to satisfy the adiabatic condition. The waveguides to be joined may typically approach each other at a fairly shallow angle in order to minimize undesirable optical power transfer or optical loss that might result from an abrupt approach. Alternatively, one waveguide may arise from a narrow tip and increase in height and/or width along the length of the other waveguide before reaching its full transverse dimensions. This gradual "appearance" of optical material may be made sufficiently gradual so as to satisfy/maintain the adiabatic condition. Similarly, after the junction region, the waveguides may move apart at a shallow angle, or one waveguide may decrease in transverse dimension(s) until it terminates in a narrow tip. The relative lengths of the approach regions and the junction region will typically depend on the strength of the interaction between the joined waveguides. For strong interaction between the waveguides in the junction region, the junction region might be relatively short, while very gradual approach and separation of the waveguides (and correspondingly longer approach regions) may be required to maintain an adiabatic condition. On the other hand, weaker interaction between the waveguides in the junction region requires a relatively longer junction region to achieve a given level of optical power transfer, but shorter approach regions may be used while nevertheless substantially avoiding undesirable optical power transfer to other optical modes. For a given waveguide type/geometry, it should be possible to achieve a desired level of optical power transfer between the waveguides with undesirable optical coupling maintained below some operationally acceptable level, while minimizing the overall length of the adiabatic optical power transfer device. If a higher level of undesirable optical coupling is tolerable (i.e., operationally acceptable) in a given device, shorter approach regions may be employed in order to reduce overall device size. It should be noted that the approach regions and junction region may not be clearly demarcated, but instead may gradually transition from one to the next. Such gradual transitions are typically necessary in order to satisfy the adiabatic condition.

For achieving substantially complete transfer of optical power between the waveguides, $\Delta\beta$ preferably reaches zero and changes sign at some point within the junction region, after which $|\Delta\beta|$ increases along the junction region. At the end of a sufficiently long junction region (i.e., $|\Delta\beta|>>|\kappa|$ at z=L; output termination condition), the system mode carrying the optical power has evolved to substantially resemble the isolated-waveguide mode of the second waveguide, and the optical power leaves the coupling region in the second waveguide. The first waveguide may or may not terminate at the end of the junction region or shortly thereafter, provided that such termination satisfies the adiabatic condition. Likewise, the second waveguide may only appear at the beginning of the junction region or shortly before, provided that such appearance satisfies the adiabatic condition.

It is important to note that adiabatic transfer of optical power from the first waveguide to the second waveguide is accomplished without the use of "mode coupling." In particular, optical power leaves the junction region on the second waveguide carried by the "same" system mode as the system mode that carried the optical signal power entering the junction region on the first waveguide. This occurs since the adiabatic condition dictates that only negligible (or at most operationally acceptable) optical power transfer to other modes has occurred during the transfer of optical power between the waveguides (i.e., the system mode has been preserved by the adiabatic properties of the junction, even though its physical appearance has evolved in transit through the junction region). This behavior is quite distinct from the behavior of mode-interference coupling, which relies upon optical power being carried through the junction region by multiple system modes (usually two) to achieve optical power transfer.

In order to achieve division of optical power leaving the junction region between the two adiabatic-coupled waveguides (having entered the junction region through only one of them), the junction region may be configured so that at z=L the system mode substantially resembles a superposition mode that includes substantial components of both isolated-waveguide modes. Under these conditions optical power in the system mode will be divided into the two isolated-waveguide modes and leave the junction region in both waveguides. For example, a desired fraction of optical power transfer of about 50% (i.e., about 3 dB) may be desirable for implementing an interferometric device. An adiabatic optical power transfer junction may be employed having $|\Delta\beta|$ decreasing to about zero and then remaining near zero over the remaining length L of the junction region. The resulting system modes may have substantially equally weighted components substantially corresponding to each of the isolated-waveguide modes at the end of the junction region, resulting in substantially equal fractions of optical power leaving the junction region in each waveguide. Other fractions of optical power transfer may be implemented by employing adiabatic transverse optical power transfer as required for a specific device.

In contrast to the behavior of mode-interference-coupled waveguides, in which optical power transfer oscillates as a function of the junction length L, the fraction of power transfer for adiabatic optical power transfer is a substantially monotonic function of the distance L, typically closely approaching an asymptotic value after a certain minimum distance (which depends on $\kappa$ and $\Delta\beta$) and then remaining substantially unchanged with additional junction region length. This fundamental difference in behavior has a profound influence on the fabrication/assembly/alignment tolerances required for producing transverse-coupled optical components. Briefly, variations in $\kappa$ and/or $\Delta\beta$ may affect the minimum junction region length required to achieve a desired level of optical power transfer between waveguides, but do not typically affect the asymptotic fraction of optical power transferred. As long as the junction region of an assembled device is longer than the largest such minimum junction region length likely to arise due to fabrication/assembly/alignment variations, then the fraction of optical power transfer in the assembled device will remain substantially unaffected. This is discussed in more detail below, and is an important feature of the present invention.

Frequently the desired objective of an optical junction device is to effect a specific degree of optical power transfer from one optical component to another optical component assembled therewith. Achieving a specifically-desired degree of optical power transfer using mode-interference coupling requires design, fabrication, and assembly of transverse-optical-coupled elements having $\kappa$, $\Delta\beta$, and L kept within tight tolerances (although not as tight as tolerances required for end-coupling, as discussed in reference A8). Variation in relative positioning of the optical elements (affecting $\kappa$ and possibly also $\Delta\beta$) causes variation in the "beat length", and hence the degree of optical power transfer for a given junction region length L (which may typically range between several tens to about 100 μm). For example, a fiber-optic taper segment (diameter 2-3 μm) mode-interference-coupled to a top surface of a dielectric waveguide on a substrate (3-5 μm wide) may require positioning within ±0.5 μm accuracy horizontally and ±20 nm accuracy vertically to keep nominally complete (100%) optical power transfer above the 90% level (0.5 dB level). Such tolerances may be difficult, expensive, and/or time-consuming to achieve, and may reduce device yield, particularly in a mass-production environment. Similarly, the mode-interference-coupled elements must be designed and fabricated sufficiently accurately to yield sufficiently accurate $\Delta\beta$ and $\kappa$. Variation in $\Delta\beta$ gives rise to variation in the beat length as well as the maximum degree of optical power transfer that may be achieved. Further discussion of mode-interference coupling, and optical coupling in general, may be found in Fundamentals of Photonics by B. E. A. Saleh and M. C. Teich (Wiley, New York, 1991), hereby incorporated by reference in its entirety as if fully set forth herein. Particular attention is called to Chapter 7 and Chapter 18.

Adiabatic optical power transfer may be exploited to further relax manufacturing tolerances for assembled optical components and devices relative to mode-interference coupling. For example, to achieve substantially complete transfer of optical power from one waveguide to another using adiabatic optical power transfer, the length of the junction region should be made sufficiently long (typically several hundred µm up to perhaps several mm) so that substantially complete optical power transfer occurs for nearly all values of |κ| and |Δβ| likely to arise during fabrication and assembly of an optical device. Manufacturing variations in κ and Δβ would therefore have little or no effect on the substantially complete transfer of optical power between waveguides (in contrast to the situation with mode-interference coupling). For example, in the example given above of a fiber-optic taper segment (diameter 2-3 µm) coupled to a top surface of a dielectric waveguide on a substrate (3-5 µm wide, with a modal index varying over a junction region several hundred µm in length) may only require position accuracy within limits about 3 to 5 times larger than those required for mode-interference coupling.

The techniques and configurations of adiabatic optical power transfer may therefore be exploited for constructing optical devices that include initially separate optical components subsequently assembled together, thereby providing apparatus and methods for transferring optical signal power between optical components that overcome various drawbacks described hereinabove. It is desirable to provide apparatus and methods for transferring optical signal power between waveguides joined by an adiabatic optical junction. It is desirable to implement apparatus and methods for adiabatic optical power transfer wherein fabrication, assembly, and/or alignment tolerances are substantially relaxed relative to end-coupling and mode-interference transverse-coupling. It is desirable to enable passive alignment of the waveguides. It is desirable to provide at least one of the waveguides as an integrated optical component on a substrate. It is desirable to implement substantially adiabatic optical power transverse-transfer adiabatic apparatus and methods that may be compatible with established optical device technologies.

A fundamental problem in the field of fiber-optic telecommunications is efficient transfer of optical signal power between the optical fiber and the optical devices for generating and/or manipulating the optical signal power. Transverse-transfer of optical power may be advantageously employed to transfer optical power between an optical fiber and an optical device through an intermediate external-transfer optical waveguide. It is desirable to provide apparatus and methods for transferring optical signal power between an optical device on a substrate and a transmission waveguide through an external-transfer waveguide optically integrated with the optical device on the substrate, wherein optical signal power is transferred between the external-transfer waveguide and the transmission waveguide by optical power transverse-transfer (adiabatic or otherwise). Optical power may be transferred between the device and the external-transfer waveguide by end-transfer or transverse-transfer (adiabatic or otherwise). An external-transfer waveguide adapted for end-transfer with the optical device may be substantially spatial-mode-matched therewith. The transmission optical waveguide may be the optical fiber (suitably adapted for transverse-transfer) or may be a planar waveguide. Such a planar transmission optical waveguide may more readily enable transfer of optical signal power to/from the optical fiber. It is desirable to implement optical power transfer via external-transfer waveguide apparatus and methods that may be compatible with established optical device technologies. An external-transfer optical waveguide (adapted for optical power transverse-transfer, adiabatic or otherwise, with a transmission waveguide) may be a component optically integrated with an optical device, and may be provided using precision spatially selective fabrication and processing techniques similar to those used to fabricate and process the optical device. Use of such fabrication techniques thereby enables wafer-scale fabrication and precision alignment of many external-transfer waveguide/device pairs in parallel on a single substrate, thereby realizing significant economies of time and cost to manufacture optical devices. It is desirable to enable and/or facilitate substantially simultaneous assembly/alignment of an optical device with two or more transmission waveguides.

SUMMARY

Certain aspects of the present invention overcome one or more aforementioned drawbacks of the previous art and/or advance the state-of-the-art of optical power transfer, and in addition may meet one or more of the following objects:

To provide apparatus and methods for substantially adiabatic optical power transverse-transfer between optical waveguides;

To provide mechanically separate optical waveguides adapted for substantially adiabatic optical power transverse-transfer when assembled;

To provide waveguides adapted for substantially adiabatic optical power transverse-transfer therebetween with relaxed fabrication and/or alignment tolerances for optical power transfer;

To provide apparatus and methods for substantially adiabatic optical power transverse-transfer between optical waveguides wherein optical power transverse-transfer is less sensitive to dimension(s) and/or relative position of the waveguides than is the case for end-transfer and/or mode-interference-coupled transverse-transfer;

To provide mechanically separate optical waveguides adapted for substantially adiabatic optical power transverse-transfer when aligned passively and assembled;

To provide apparatus and methods for substantially adiabatic optical power transverse-transfer between waveguides wherein the power transfer level remains substantially flat over a substantial range of relative transverse positions of the waveguides;

To provide apparatus and methods for substantially adiabatic optical power transverse-transfer between waveguides wherein the power transfer level remains within about 0.5 dB of its maximum level over a range of waveguide transverse offsets, the range being larger than about ±1.0 times a corresponding transverse spatial mode size characteristic of the waveguides;

To provide at least one of the optical waveguides adapted for substantially adiabatic optical power transverse-transfer as an integrated optical component on a substrate;

To provide at least one of the optical waveguides adapted for substantially adiabatic optical power transverse-transfer as a planar waveguide on a substrate;

To provide substantially adiabatic optical power transverse-transfer apparatus and methods that may be compatible with established optical device technologies;

To provide apparatus and method for enabling and/or facilitating transfer of optical signal power between an optical fiber and an optical device on a substrate;

To provide apparatus and methods for transferring optical signal power between an optical device and a transmission optical waveguide through an external-transfer optical waveguide, the external-transfer optical waveguide being optically integrated with the optical device on a common substrate, the external-transfer optical waveguide and the transmission optical waveguide being adapted for optical power transverse-transfer therebetween;

To provide a suitably adapted (for transverse-transfer) optical fiber as the transmission optical waveguide;

To provide a suitably adapted (for transverse-transfer) planar waveguide as the transmission optical waveguide;

To provide a suitably adapted (for transverse-transfer) planar waveguide as the transmission optical waveguide, the planar waveguide being further adapted for transferring optical power to/from an optical fiber;

To provide the optical device and/or the external-transfer optical waveguide adapted for substantially spatial-mode-matched end-transfer of optical power therebetween;

To provide the optical device and/or the external-transfer optical waveguide adapted for transverse-transfer of optical power therebetween;

To provide the external-transfer optical waveguide and/or the transmission optical waveguide adapted for substantially adiabatic optical power transverse-transfer therebetween;

To provide the external-transfer optical waveguide and/or the transmission optical waveguide adapted for passively-modal-index-matched mode-interference-coupled optical power transverse-transfer therebetween;

To provide the external-transfer optical waveguide and/or the transmission optical waveguide adapted for actively-modal-index-matched mode-interference-coupled optical power transverse-transfer therebetween;

To provide the transmission optical waveguide and the integrated optical device/external-transfer optical waveguide as mechanically separate components adapted for optical power transverse-transfer between the external-transfer optical waveguide and the transmission optical waveguide when assembled;

To provide the transmission optical waveguide and the integrated optical device/external-transfer optical waveguide as mechanically separate components adapted for optical power transverse-transfer between the external-transfer optical waveguide and the transmission optical waveguide when passively aligned and assembled;

To provide the optically integrated external-transfer waveguide by applying to the optical device precision material processing techniques such as lithography, deposition, masking, and/or etching techniques, thereby enabling precision alignment of the external-transfer optical waveguide and the optical device;

To provide external-transfer optical waveguide apparatus and methods that may be compatible with established optical device technologies;

To provide wafer-scale fabrication and precision alignment of many optically integrated external-transfer waveguide/device pairs in parallel on a single substrate;

To provide apparatus and methods enabling assembly/alignment of multiple optical devices on a common planar waveguide substrate, the devices each being adapted for optical power transfer with one or more planar transmission waveguides on the planar waveguide substrate;

To enable and/or facilitate substantially simultaneous assembly/alignment of a waveguide with two or more other transmission waveguides so as to establish optical power transverse-transfer therebetween; and To enable and/or facilitate substantially simultaneous assembly/alignment of an optical device with two or more waveguides so as to establish an optical junction between the device and each waveguide.

One or more of the foregoing objects may be achieved in the present invention by an apparatus for transferring optical power between a first optical waveguide and a second optical waveguide, the first and second waveguides being initially mechanically separate and subsequently assembled to form an optical junction for optical power transfer. The apparatus comprises: a first optical waveguide including an optical junction region; and a second optical waveguide including an optical junction region. The junction region of one or both of the waveguides is/are adapted for substantially adiabatic optical power transfer, through variation of one or more optical properties along the length thereof. Longitudinal variation of dimension(s) and/or optical properties of the first and second waveguides are sufficiently gradual so as to result in undesirable optical power transfer between the guided system optical mode and other optical modes at or below an operationally acceptable level. Assembly of the first and second waveguides serves to position the respective optical junction regions thereof so as to enable substantially adiabatic optical power transfer between the waveguides. The nature of adiabatic optical power transfer results in substantially relaxed alignment tolerances relative to end-transfer and/or mode-interference-coupled transverse-transfer. Passive alignment may be employed to assemble the first and second waveguides for optical power transfer. The junction regions may be adapted so as to provide substantially complete transfer of optical power between the waveguides.

One or more of the foregoing objects may be achieved in the present invention by an apparatus for transferring optical power between an optical device and a transmission optical waveguide, the apparatus comprising: a) an optical device on a substrate; b) a transmission optical waveguide; and c) an external-transfer optical waveguide optically integrated with the optical device, the external-transfer waveguide being adapted for transmitting optical power between the optical device and the transmission optical waveguide. The optical device and/or the external-transfer optical waveguide may preferably be adapted and positioned for end-transfer or transverse-transfer of optical power therebetween. The external-transfer waveguide and/or the transmission optical waveguide may preferably be adapted for transverse-transfer of optical power therebetween (mode-interference-coupled or adiabatic). The transmission optical waveguide is provided initially as a component mechanically separate from the optical device and external-transfer optical waveguide. Assembly of the transmission optical waveguide with the substrate, optical device, and/or external-transfer optical waveguide serves to position the transmission optical waveguide and the external-transfer optical waveguide for transverse-transfer of optical power therebetween. An external-transfer waveguide optically integrated with an optical device may be provided using wafer-scale fabrication and processing techniques, thereby enabling wafer-scale fabrication and precision alignment of many external-transfer waveguide/device pairs in parallel on a single substrate. The transmission optical waveguide may be a suitably adapted (for transverse-transfer with the external-transfer optical waveguide) optical fiber, or may preferably be a suitably adapted (for transverse-transfer with the external-transfer optical waveguide) planar transmission optical waveguide. The planar waveguide may be further adapted for transferring optical power to/from an optical fiber, thereby enabling transfer of optical power between the device and the fiber through the integrated external-transfer waveguide and the assembled planar transmission waveguide. The planar transmission waveguide may be part of a planar waveguide circuit.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIGS. 1A, 1B, and 1C are top, side, and end views, respectively, of waveguides adapted and assembled for substantially adiabatic optical power transfer according to the present invention.

FIGS. 2A, 2B, and 2C are top, side, and end views, respectively, of waveguides adapted and assembled for substantially adiabatic optical power transfer according to the present invention.

FIGS. 3A, 3B, and 3C are top, side, and end views, respectively, of waveguides adapted and assembled for substantially adiabatic optical power transfer according to the present invention.

FIGS. 4A, 4B, and 4C are top, side, and end views, respectively, of waveguides adapted and assembled for substantially adiabatic optical power transfer according to the present invention.

FIGS. 5A, 5B, and 5C are top, side, and end views, respectively, of waveguides adapted and assembled for substantially adiabatic optical power transfer according to the present invention.

FIGS. 6A and 6B are top and side views, respectively, of waveguides adapted and assembled for substantially adiabatic optical power transfer according to the present invention.

FIGS. 7A and 7B are top and end views, respectively, of waveguides adapted and assembled for substantially adiabatic optical power transfer according to the present invention.

FIGS. 8A and 8B are side and end views, respectively, of waveguides adapted and assembled for substantially adiabatic optical power transfer according to the present invention.

FIGS. 9A, 9B, and 9C are top, side, and end views, respectively, of a waveguide and fiber-optic adapted and assembled for substantially adiabatic optical power transfer according to the present invention.

FIGS. 10A and 10B are top views of a waveguide and fiber-optic-taper segment adapted and assembled for substantially adiabatic optical power transfer according to the present invention.

FIGS. 11A and 11B are top views of a waveguide and fiber-optic-taper segment adapted and assembled for substantially adiabatic optical power transfer according to the present invention.

FIGS. 13A and 13B are top and side views, respectively, of waveguides adapted for substantially adiabatic optical power transfer according to the present invention.

FIGS. 14A and 14B are side and bottom views, respectively, of an optical device including waveguides adapted for substantially adiabatic optical power transfer according to the present invention.

FIGS. 15A and 15B are top and side views, respectively, of an assembled optical device including waveguides adapted for substantially adiabatic optical power transfer according to the present invention.

FIGS. 16A and 16B are top and side views, respectively, of a waveguide adapted for substantially adiabatic optical power transfer according to the present invention.

FIGS. 17A and 17B are side and bottom views, respectively, of a fiber-optic adapted for substantially adiabatic optical power transfer according to the present invention.

FIGS. 18A and 18B are top and side views, respectively, of an assembled optical device including a waveguide and a fiber-optic adapted for substantially adiabatic optical power transfer according to the present invention.

FIGS. 26A and 26B are isometric views of exemplary optical devices including integrated external-transfer optical waveguides according to the present invention.

FIGS. 36A and 36B are side views of an optical device including integrated external-transfer optical waveguides according to the present invention.

FIGS. 42A and 42B are plan views of exemplary optical devices assembled onto a planar waveguide substrate according to the present invention.

FIGS. 43A and 43B are plan views of exemplary optical devices assembled onto a planar waveguide substrate according to the present invention.

FIGS. 44A and 44B are plan views of exemplary optical devices assembled onto a planar waveguide substrate according to the present invention.

FIGS. 45A and 45B are plan and side views of exemplary optical junctions adapted and assembled for transverse-transfer according to the present invention.

Figure 12:
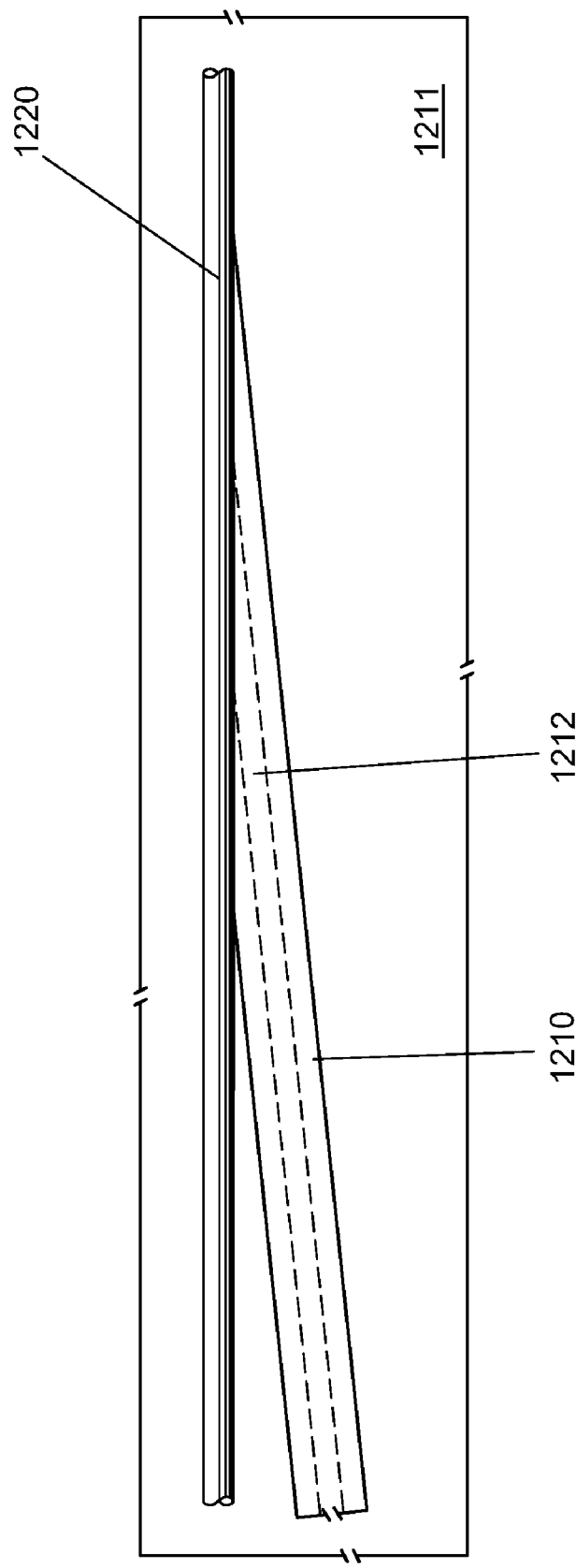
FIG. 12 is a top view of a waveguide and fiber-optic-taper segment adapted and assembled for substantially adiabatic optical power transfer according to the present invention.
Figure 19A:
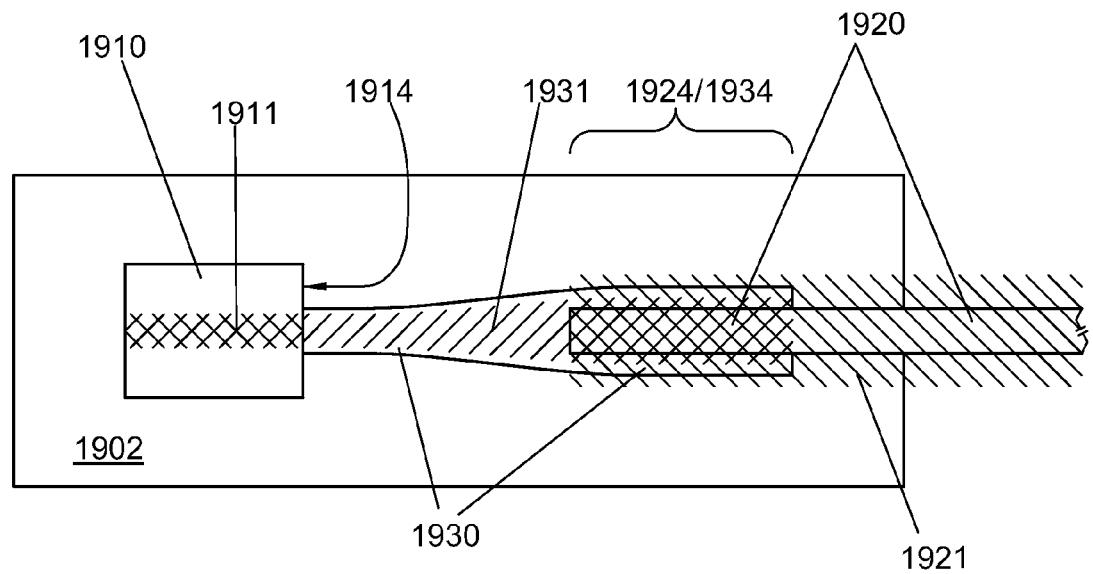
FIGS. 19A and 19B are top and side schematic diagrams, respectively, of an optical device including an integrated external-transfer waveguide according to the present invention.
Figure 19B:
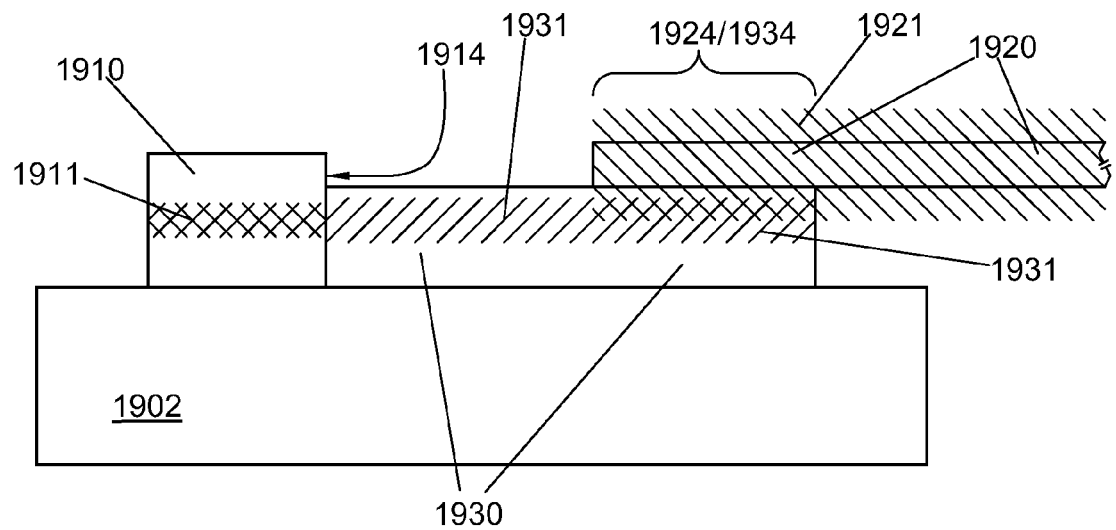
Figure 19C:
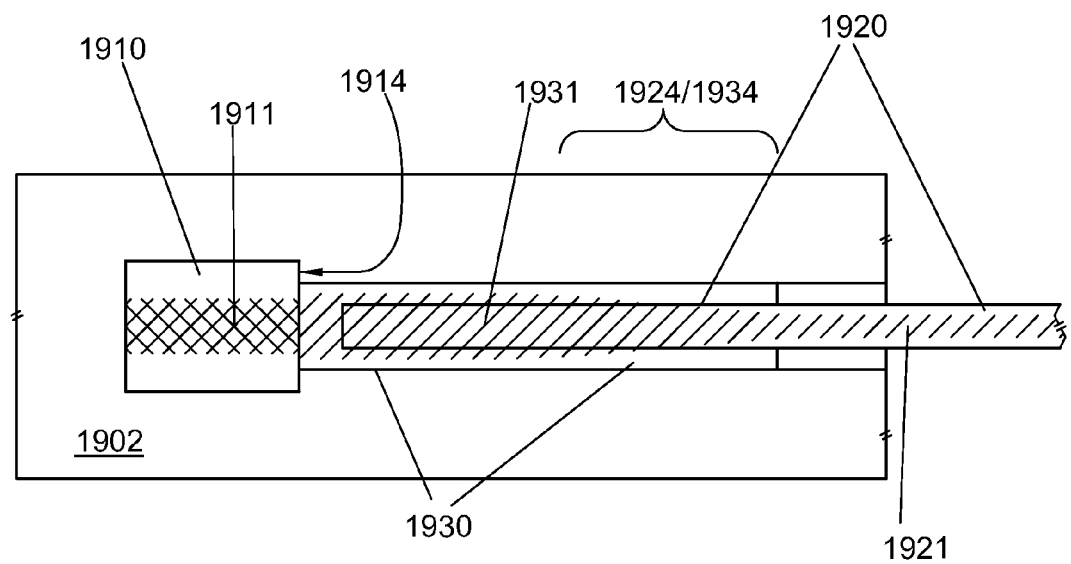
FIGS. 19C and 19D are top and side schematic diagrams, respectively, of an optical device including an integrated external-transfer optical waveguide according to the present invention.
Figure 19D:
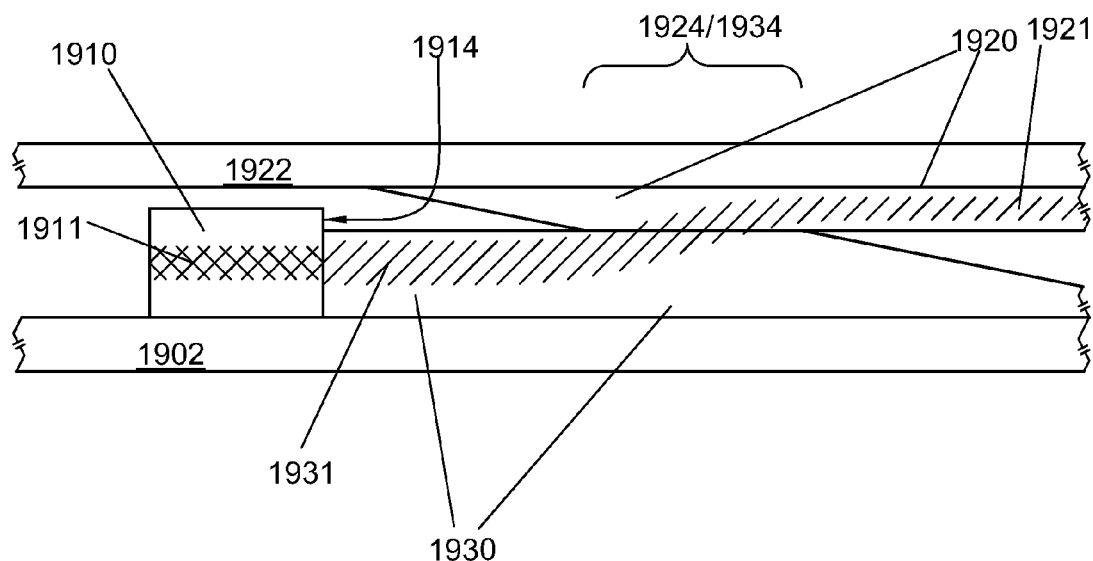

It should be noted that the relative proportions of various structures shown in the Figures may be distorted to more clearly illustrate the present invention. Relative dimensions of various devices, waveguides, resonators, optical fibers/tapers, and so forth may be distorted, both relative to each other as well as in their relative transverse and/or longitudinal proportions. In many of the Figures the transverse dimension of an optical element is enlarged relative to the longitudinal dimension for clarity, which will cause variations of transverse dimension(s) with longitudinal position to appear exaggerated. Also, in Figures which show an optical fiber positioned for end-transfer of optical power, the fiber diameter is typically much larger relative to other waveguide dimensions than is depicted. To show the fiber accurately scaled could have made it larger than the drawing sheet size. On the other hand, Figures showing a fiber-optic-taper segment are much closer to the actual relative scale.

The embodiments shown in the Figures are exemplary, and should not be construed as limiting the scope of the present invention as disclosed and/or claimed herein.

DETAILED DESCRIPTION OF EMBODIMENTS

For purposes of the written description and/or claims, "index" may denote the bulk refractive index of a particular material (also referred to herein as a "material index") or may denote an "effective index" $n_{eff}$, related to the propagation constant $\beta$ of a particular optical mode in a particular optical element by $\beta=2\pi n_{eff}/\lambda$. The effective index may also be referred to herein as a "modal index". As referred to herein, the term "low-index" shall denote any materials and/or optical structures having an index less than about 2.5, while "high-index" shall denote any materials and/or structures having an index greater than about 2.5. Within these bounds, "low-index" may preferably refer to: silica ($SiO_x$), germano-silicate, boro-silicate, other doped silicas, and/or other silica-based materials; silicon nitride ($Si_xN_y$) and/or silicon oxynitrides ($SiO_xN_y$); other glasses; other oxides; various polymers; and/or any other suitable optical materials having indices between below about 2.5. "Low-index" may also include optical fiber, optical waveguides, planar optical waveguides, and/or any other optical components incorporating such materials and/or exhibiting a modal index below about 2.5. Similarly, "high-index" may preferably refer to materials such as semiconductors, IR materials, and/or any other suitable optical materials having indices greater than about 2.5, and/or optical waveguides of any suitable type incorporating such material and/or exhibiting a modal index greater than about 2.5. The terms "high-index" and "low-index" are to be distinguished from the terms "lower-index" and "higher-index", also employed herein. "Low-index" and "high-index" refer to an absolute numerical value of the index (greater than or less than about 2.5), while "lower-index" and "higher-index" are relative terms indicating which of two particular materials has the larger index, regardless of the absolute numerical values of the indices.

The term "planar optical waveguide" as employed herein shall denote any optical waveguide that is provided on a substantially planar substrate. Examples of such waveguides include ridge waveguides, buried waveguides, semiconductor waveguides, other high-index waveguides, silica-based waveguides, polymer waveguides, other low-index waveguides, core/clad type waveguides, multi-layer reflector waveguides, metal-clad waveguides, air-guided waveguides, photonic crystal/photonic bandgap-based waveguides, and myriad other examples not explicitly set forth herein but nevertheless falling within the scope of inventive concepts disclosed and/or claimed herein. Many suitable substrates may be employed, including semiconductor, crystalline, silica or silica-based, other glasses, ceramic, metal, and myriad other examples not explicitly set forth herein but nevertheless falling within the scope of inventive concepts disclosed and/or claimed herein.

To provide optical junction apparatus and methods according to the present invention, transverse-transfer of optical power (adiabatic or mode-interference-coupled) between initially separate and subsequently assembled optical components may be exploited. Such optical junctions may be employed for transferring optical signal power between various types of optical components used to construct assembled optical devices, systems, and/or sub-systems. Examples of initially separate components that may be assembled to achieve optical power transfer therebetween may include but are not limited to: two separate optical fibers; two separate planar waveguides; an optical fiber and a planar waveguide; an optical device integrated onto a substrate and an optical fiber, planar waveguide, or other optical waveguide separate from the substrate; two optical devices integrated onto separate substrates. Of particular note is the use of apparatus and methods according to the present invention for transferring optical power between an optical transmission system (particularly a fiber-optic transmission system) and a semiconductor-based optical device on a substrate. Other combinations of separate optical components may be optically coupled using apparatus and methods adapted for transverse-transfer of optical power (adiabatic or mode-interference-coupled) according to the present invention. Some sort of joining element may typically be employed to effect assembly of initially separate and subsequently assembled components. Examples of such a joining element (which might arise from an interaction between the components and/or from structural members associated with one or both components) may include, but are not limited to: retainer, clamp, fastener, an adhesive, solder, potting or embedding materials, clip, tab/slot, groove, optical contacting, electrostatic and/or magnetostatic forces (including MEMS-based devices), spring or micro-spring, hermetic or micro-hermetic sealing of the assembled components, wafer-bonding techniques. Optical devices may be constructed in which various aspects of the functionality of the optical device reside on initially separate optical components, with the optical device becoming fully functional upon assembling and establishing an optical junction between the separate components. Device functionality may be provided, altered, and/or controlled via optical junctions according to the present invention.

Multiple planar optical waveguides may be provided on a common substrate to form so-called planar waveguide circuits, sometimes also referred to as planar lightwave circuits (PLCs), optical integrated circuits, or opto-electronic integrated circuits. The multiple planar waveguides may all be provided at the same height or thickness above the underlying waveguide substrate, or may be provided at multiple heights or thicknesses above the waveguide substrate to form a three-dimensional optical network. Providing multiple planar waveguides together on a single waveguide substrate enables construction of composite optical assemblies including multiple optical devices connected in any suitable topology. Planar waveguides and planar waveguide circuits comprise an important class of transmission optical waveguides used to implement the present invention. A planar waveguide may often comprise a low-index core/cladding-type dielectric waveguide fabricated on a substantially planar substrate, often silica or silica-based waveguides fabricated on an oxide-coated silicon substrate. Silicon is a desirable waveguide substrate material for a variety of reasons, including but not limited to: relatively easy and well-understood material processing techniques; mature industry standards; highly planar single crystal faces obtainable; amenable to selective dry- and/or wet-etching; highly rigid; desirable thermal characteristics. The silicon substrate is often provided with a silica over-layer, with one or more planar waveguides on the silica over-layer. Silica and silica-based materials are nearly ideal and well-understood optical materials.

Substantially adiabatic transverse-transfer of optical power may be employed to provide reduced alignment-sensitivity when establishing an optical junction. In order to achieve substantially adiabatic optical power transfer, at least one of the joined optical components (typically waveguides) must have a modal index varying along the length of the junction region, thereby adapting the waveguide for substantially adiabatic transverse-transfer. This modal index variation may be achieved in a variety of ways: 1) one or both transverse dimensions of the waveguide core and/or cladding may vary along the length of the waveguide; 2) the index of core and/or cladding material may vary along the length of the waveguide; 3) material of a selected index may be placed near the waveguide in amounts and/or at distances varying along the length of the waveguide; 4) a chirped grating may be written along the waveguide and optical material of differing index may be deposited, yielding an effective index varying along the length of the waveguide. Other techniques may be devised, and any suitable technique may be used alone or in combination to produce waveguides adapted for substantially adiabatic optical power transfer for providing optical junctions according to the present invention.

For purposes of the present written description and/or claims, the adiabatic condition shall generally be defined as longitudinal variation of one or more waveguide properties sufficiently gradual so as to maintain near or below an operationally acceptable level optical power transfer between an isolated or system mode of interest and another isolated, system, or radiation mode. An operationally acceptable level may be defined by any relevant set or subset of applicable constraints and/or requirements arising from the performance, fabrication, device yield, assembly, testing, availability, cost, supply, demand, and/or other factors surrounding the manufacture and deployment of a particular assembled optical device.

FIGS. 1A, 1B, 1C, 2A, 2B, 2C, 3A, 3B, and 3C schematically illustrate a pair of stacked waveguides 110 and 120 (i.e., surface-joined), with waveguide 110 shown positioned on substrate 111 and waveguide 120 on substrate 121 (substrate 121 omitted from FIGS. 1A, 2A, and 3A for clarity). Each waveguide core 112/122 varies in width along the length of the respective waveguide over junction region 101. The waveguide cores may equivalently vary in height, or in both transverse dimensions, along the length of a junction region (not shown here). The variation in core dimension(s) results in corresponding variation in $\Delta\beta$ along the lengths of the waveguides, which are preferably configured so that $\Delta\beta=0$ at some point in the junction region 101. Optical signal power entering waveguide 110 (from elsewhere on substrate 111) is transferred substantially completely to waveguide 120, provided that: 1) $|\kappa|<<|\Delta\beta|$ at the ends of junction region 101; 2) $\kappa$ is sufficiently large in the central portions of junction region 101; and 3) $\Delta\beta$ is positive near one end of the junction region and negative near the other end. Alternatively, optical signal power entering through waveguide 120 may be substantially completely transferred to waveguide 110, (and hence to other components optically integrated with waveguide 110, if present). Exemplary dimensions for dielectric waveguides 110 and 120 might be: maximum core width 1-10 μm, preferably between about 2-5 μm; length of junction region 101 between about 100 and 2000 μm, typically several hundred μm; spacing between waveguide cores between about 0-3 μm.

The behavior of adiabatic optical power transfer with respect to variation in $\kappa$ means that substantially complete transfer of optical power between waveguide 110 and 120 may be achieved within a wider range of relative position of waveguides 110 and 120 than could be tolerated with end-coupled or mode-interference-coupled devices. Waveguide 120 may therefore be positioned using passive alignment techniques, such as: providing alignment structures (not shown) on substrate 111 for receiving and positioning waveguide 120 relative to waveguide 110 (as in earlier-cited application A9, for example); providing waveguide 120 on a substrate 121 adapted for mating with substrate 111, so as properly position waveguides 110 and 120; or by other means. Active alignment techniques may also be employed (such as machine-vision assembly techniques, or by monitoring optical behavior of the coupled waveguides), and would be more readily and economically implemented with relaxed alignment tolerances as provided by the present invention.

In FIGS. 1A, 1B, and 1C, approach regions 102/103 are each shown with waveguide 120 or 110, respectively, bilaterally tapering in a horizontal dimension before finally coming to an end. An isolated mode of waveguide 110, for example, would be minimally perturbed by the appearance of the narrow tip at the end of waveguide 120. The increase in width of waveguide 120 along approach region 102 is preferably sufficiently gradual so as to substantially avoid undesirable optical power transfer to other system modes (i.e., adiabatic increase in width). Similarly, waveguide 110 bilaterally tapers along approach region 103 before ending in a narrow tip, where it minimally perturbs an isolated mode of waveguide 120. FIGS. 2A, 2B, and 2C show a similar arrangement of approach regions 102/103 where waveguides are horizontally tapered from only one side (equivalently, beveled). FIGS. 3A, 3B, and 3C show an arrangement where waveguides 110/120 are vertically tapered or beveled along the approach regions 103/102. In this embodiment the adiabatic condition is achieved primarily by the gradual approach of the tapered waveguide surface closer and closer to the other waveguide. These arrangements are exemplary, and many other arrangements may be equivalently employed for maintaining the adiabatic condition along the approach regions. It should also be noted that the division between "approach regions" and the "junction region" in these and subsequent examples need not be sharply delineated, either structurally or functionally, and in fact to satisfy the adiabatic condition the approach regions and junction region should preferably smoothly transition from one to the other.

FIGS. 4A, 4B, 4C, 5A, 5B, and 5C schematically illustrate a pair of waveguides 410 and 420 side by side (i.e., side-joined), with waveguide 410 shown positioned on substrate 411 and waveguide 420 on substrate 421 (substrate 421 omitted from FIGS. 4A and 5A for clarity). Each waveguide core 412/422 varies in width along the length of the respective waveguide over junction region 401 (or may equivalently vary in height, or in both transverse dimensions, along the length of a junction region; not shown here). As in the previous examples, the variation in core dimension(s) results in corresponding variation in $\Delta\beta$ along the lengths of the waveguides, which are preferably configured so that $\Delta\beta=0$ at some point in the junction region 401. Substantially complete transfer of optical signal power may be achieved provided that: 1) $|\kappa|<<|\Delta\beta|$ at the ends of junction region 401; 2) $\kappa$ is sufficiently large in the central portions of junction region 401; and 3) $\Delta\beta$ is positive near one end of the junction region and negative near the other end. Position tolerances for achieving substantially complete optical power transfer are relaxed in these embodiments relative to mode-interference-coupled waveguides in a manner similar to that described for earlier examples, and these side-joined examples may be aligned/assembled employing similar techniques.

In FIGS. 4A, 4B, and 4C, approach regions 402/403 are each shown with waveguide 420 or 410, respectively, tapered or beveled the horizontal dimension before finally coming to an end at a narrow tip substantially in contact with the other waveguide. An isolated mode of waveguide 410, for example, would be minimally perturbed by the appearance of the narrow tip at the end of waveguide 420. The increase in width of waveguide 420 along approach region 402 is preferably sufficiently gradual so as to substantially avoid undesirable optical power transfer to other system modes (i.e., adiabatic increase in width). Similarly, waveguide 410 tapers along approach region 403 before ending in a narrow tip substantially in contact with waveguide 420, where it minimally perturbs an isolated mode of waveguide 420. FIGS. 5A, 5B, and 5C show an arrangement where waveguides 410/420 are horizontally tapered or beveled along the approach regions 403/402, but with the narrow tip of each waveguide positioned away from the other waveguide. In this embodiment the adiabatic condition is achieved primarily by the gradual approach of the tapered waveguide surface closer and closer to the other waveguide. These arrangements are exemplary, and many other arrangements may be equivalently employed for maintaining the adiabatic condition along the approach regions.

FIGS. 6A and 6B show waveguide 610 on substrate 611 side-joined (FIG. 6A) or surface-joined (FIG. 6B) to waveguide 620 on substrate 621 (omitted from FIG. 6A for clarity). In each of these examples variation of the modal indices of the waveguides is achieved by a longitudinal gradient in the index differential between waveguide cores 612/622 and the respective waveguide cladding. In each waveguide, the index differential may be a maximum at one end (input/output ends of waveguides 610/620) and decreases to substantially zero across the junction region. The index differential gradient may arise from a cladding index gradient, a core index gradient (as in FIGS. 6A and 6B), or both. Any of the specific examples of coupled waveguides disclosed herein, or equivalents thereof, may be implemented with such graded-index-differential waveguides.

The longitudinal modal index variations shown in the embodiments of FIGS. 1A through 6B may be readily achieved using standard spatially-selective material processing techniques, including but not limited to lithography, deposition, doping, implantation, masking, etching, optical densification, photochemistry, and so forth. These techniques may also be employed to fabricate other optical components on a substrate along with one of the waveguides adapted for adiabatic optical power transfer, thereby enabling transfer of optical power from various components integrated onto a substrate to a separate waveguide. Use of such an external-transfer waveguide was discussed extensively in earlier-cited application A8 (wherein the "external-transfer waveguide" was referred to as an "external-coupling waveguide"; these phrases may be considered equivalent for purposes of the present written description and/or claims), and is discussed in detail hereinbelow. Application A8 discloses use of an external-transfer waveguide end-coupled to an optical component on a common substrate and mode-interference coupled to a separate transmission waveguide. All of the methods, apparatus, and embodiments disclosed in earlier-cited application A8 may be modified to include an external-transfer waveguide that is instead adapted for substantially adiabatic optical power transfer to the separate transmission optical waveguide. The fabrication, assembly, and alignment tolerances are thereby relaxed, and construction of such devices may be correspondingly less difficult, expensive, and/or time-consuming.

The degree to which substantially adiabatic transverse-transfer of optical power depends on waveguide position may be most readily characterized in relation to transverse optical mode sizes characteristic of the respective waveguides. In many cases of transverse-transfer, sufficiently accurate and precise relative positioning of the waveguides may be readily achieved in one of the transverse dimensions (vertical or horizontal/lateral relative to the substrate), even if the position tolerance is only a fraction of the corresponding transverse optical mode sizes characteristic of the waveguides (for example, position tolerance less than about 0.5 times transverse mode size in the corresponding transverse dimension). In the exemplary embodiments of FIGS. 1A-3C, vertical relative positioning may be determined by mechanical contact between the surface-joined waveguides, between one waveguide and support/alignment structures provided on the other waveguide substrate, and/or between support/alignment structures on each waveguide substrate. The accuracy of such positioning is dependent on the precision material fabrication and processing techniques employed to fabricate the waveguides, and may therefore provide sufficient accuracy and precision for achieving reliable and reproducible transverse-transfer of optical power, even within tolerances that are only a fraction of the vertical transverse mode size. Similarly, in the exemplary embodiments of FIGS. 4A-6B, precision fabrication of the waveguides enables precision lateral or horizontal positioning by mechanical contact between side-joined waveguides, even to within a fraction of the horizontal transverse mode size. It is often the case that similarly accurate relative positioning of the waveguides in the other transverse dimension (horizontal, or lateral positioning in FIGS. 1A-3C; vertical positioning for FIGS. 4A-6B) may not be so readily achieved.

However, it has been demonstrated for substantially adiabatic transverse-transfer that substantially complete transfer of optical power between waveguides may be achieved within lateral position tolerances that are as large as, or even twice as large as, the lateral transverse optical mode sizes characteristic of the waveguides. As shown by a simple analytic model which generates the curves in FIG. 46, variation in the degree of optical power transfer with respect to relative transverse offset of the waveguides (in the lateral dimension for surface-joined waveguides) is substantially flat over a significant range for adiabatic transverse-transfer. The corresponding degrees of optical power transfer for mode-interference-coupled transverse-transfer and end-transfer vary more rapidly with transverse position. These calculations (based on a simple analytic model) are based on waveguide cores about 5 µm wide by about 3 µm thick, vertically spaced by about 1 µm of cladding, having a core index of about 1.5 and a cladding index of about 1.45. The core widths vary by about 20% over a junction region about 750 µm long for the adiabatic case. Lateral offset of the waveguides away from the maximum power transfer position by about ±0.3 times the lateral transverse mode size results in a transverse-offset optical transfer loss of about 0.5 dB relative to the maximum power transfer achievable for end-coupled power transfer (typically limited by spatial mode mismatch). The transverse mode size is defined herein as the $1/e^2$ half-width for the intensity, with a root-mean-square mode size being the relevant mode size when dissimilarly sized optical modes are supported by the waveguides. The optical junction length for the mode-interference-coupled case is chosen to yield substantially complete optical power transfer assuming the waveguides are properly index-matched. For mode-interference-coupled transverse-transfer, a lateral waveguide offset of about ±0.7 times the lateral transverse mode size results in an analogous 0.5 dB transverse-offset transfer loss (relative to the maximum achievable transverse-transfer; in principle, substantially complete optical power transfer). The transverse-offset transfer loss stays below about 0.5 dB, and is substantially flat, for lateral offsets as large as about 1.5 times the transverse mode size for adiabatic transverse-transfer. The flatness of the transverse-offset transfer loss can be characterized as remaining within a specific range around a nominal optical power transfer loss over an acceptable range of transverse offset (within 0.5 dB of 100% transfer in this example).

Figure 46:
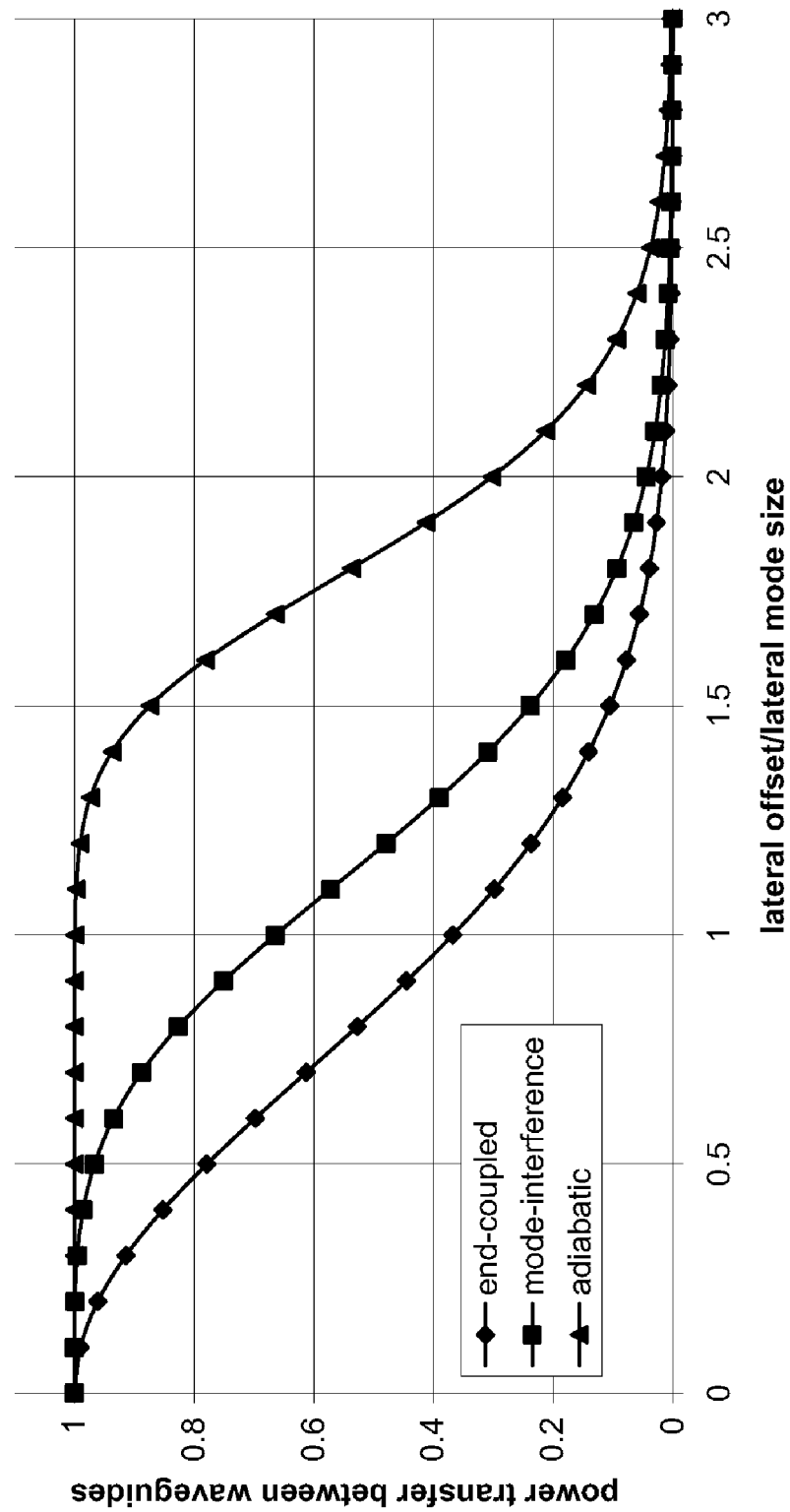
FIG. 46 is a plot of optical power transfer between waveguides as a function of transverse offset for end-transfer, mode-interference-coupled transverse-transfer, and adiabatic transverse-transfer. The optical power transfer is calculated using a simple analytical model.

These values depend on the specific geometry of the waveguides employed for transverse-transfer of optical power, the core and cladding materials employed, and the size of the coupling constant κ. The offset tolerance for mode-interference-coupled transverse-transfer also depends on the accuracy with which the required interaction length may be achieved. For adiabatic transverse-transfer, the offset tolerance also depends on the length of the optical junction region and the variation of κ and Δβ along the waveguides in the junction region. For comparable values of the coupling constant κ, the results of FIG. 46 are achieved with an optical junction region about 5 times longer for adiabatic transverse-transfer than that required for mode-interference-coupled transverse-transfer. Larger lateral offsets can be tolerated with even longer junction regions for adiabatic transverse-transfer and/or with increasing values of κ, assuming that care is taken to maintain a substantially adiabatic condition along the waveguides.

Figure 47:
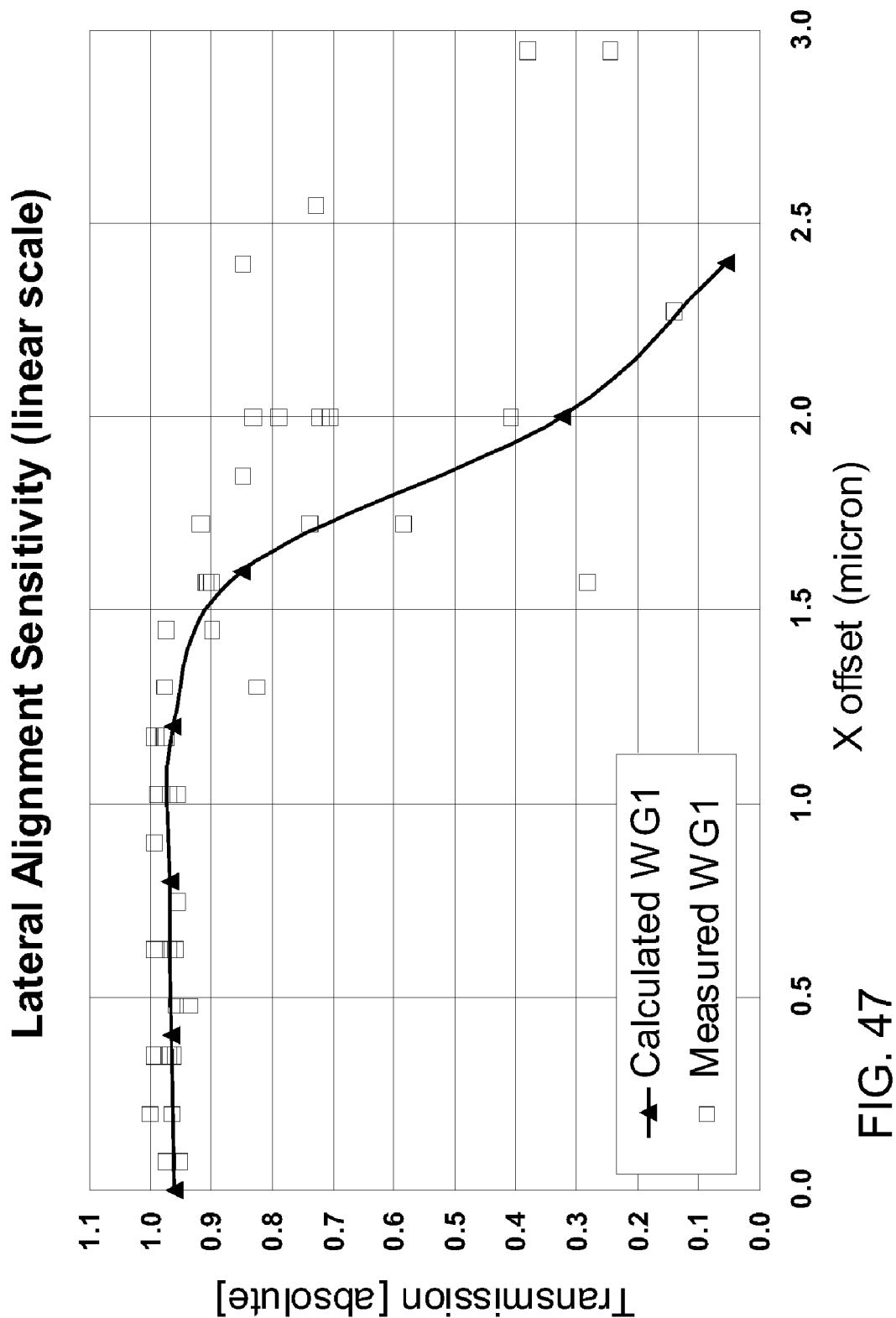
FIG. 47 is a plot of optical power transfer between waveguides as a function of transverse offset, the waveguides being adapted and positioned for adiabatic transverse-transfer according to the present invention. The curve (with solid triangles) is calculated using a numerical model, while the open squares are experimentally measured values.

Employing waveguide cores having large aspect ratios may enhance the transverse-offset-insensitivity exhibited by adiabatic transverse-transfer. A numerically modeled curve and measured data are shown in FIG. 47 for optical power transfer between surface-joined waveguides with thin-film type cores. The waveguides each have a core decreasing from about 2.2 µm wide to about 0.5 µm wide over about a 250 µm long optical junction region. The cores are about 0.13 µm thick vertically separated by about 0.8 µm of cladding, with a core index of about 2.0 and a cladding index of about 1.45. The cores are about 1.4 µm wide and the resulting optical mode sizes are about 0.7 µm in the lateral dimension near the point where Δβ crosses zero in the optical junction region. Transverse-offset optical power transfer loss remains below about 0.5 dB (and is substantially flat) over a range of lateral offsets of ±1.5 µm, or about ±2 times the corresponding transverse optical mode size.

For various optical junctions described herein employing substantially mode-interference-coupled transverse-transfer of optical power, the transverse-offset optical power transfer losses may preferably remain below about 0.5 dB for transverse offsets at least as large as about ±0.5 times the corresponding transverse optical mode size characteristic of one of the waveguides. For various optical junctions described herein employing substantially adiabatic transverse-transfer of optical power, the transverse-offset optical power transfer losses may preferably remain below about 0.5 dB for transverse offsets at least as large as about ±1 times the corresponding transverse optical mode size, and most preferably at least as large as about ±1.5 times the corresponding transverse optical mode size. For various optical junctions described herein employing substantially adiabatic transverse-transfer of optical power, transverse-offset transfer loss characterized as "flat" shall preferably remain within ±0.5 dB of a nominal transfer loss, most preferably within ±0.3 dB, over transverse offsets at least as large as about ±1 times the corresponding transverse optical mode size, and most preferably at least as large as about ±1.5 times the corresponding transverse optical mode size. Experimental and numerical data shown in FIG. 47 show that these criteria may be readily achieved.

Waveguides for implementing alignment-insensitive optical junctions according to the present invention may be provided by mechanical modification of more standard waveguide structures (i.e., waveguide, optical fiber, or similar structure having core and/or cladding profiles initially having substantially no longitudinal variation). By etching or polishing a standard waveguide at a very shallow angle, a beveled coupling region may be created having a longitudinally varying modal index. Placement of this etched or polished surface against another waveguide may then enable substantially adiabatic optical power transfer between the waveguides, if the termination conditions are met. Side- and surface-joined examples are shown in FIGS. 7A and 7B (side-joined) and 8A and 8B (surface-joined). A waveguide 710 on substrate 711 and including a core 712 is etched at a shallow angle (for example, about 0.5°, resulting in a junction region about 600 µm long for a waveguide 5 µm wide; other angles and junction region lengths may be employed). A second waveguide 720 with core 722 on substrate 721 (omitted from FIG. 7A for clarity) is similarly etched or polished and positioned relative to waveguide 710 as shown, preferably with the etched/polished surfaces of the waveguides in contact. As with embodiments previously shown, the nature of adiabatic optical power transfer results in substantially complete transfer of optical signal power between the waveguides for a wide range of relative position of waveguides 710 and 720, both horizontal and vertical. Passive and/or low-precision assembly/alignment techniques may therefore be readily and/or economically implemented for constructing devices, as described hereinabove. Sufficiently gradual approach conditions may be readily achieved, since cladding layers may be arbitrarily thick, with thicker cladding reducing perturbation of an isolated mode of one waveguide by the appearance of the narrow tip of the other waveguide.

One way to help ensure substantially complete transfer of optical power between waveguides is to employ two substantially identical waveguides (with opposing modal index gradients, of course), as has been the case in the embodiments presented thus far. This ensures that there will be a point within the junction region with $\Delta\beta=0$ and that $\Delta\beta$ will have opposite signs at the ends of the junction region (necessary conditions for substantially alignment-insensitive, substantially complete adiabatic optical power transfer), thereby simplifying the design process. Such a symmetric arrangement also ensures that if the input termination condition is satisfied, then the output termination will be similarly satisfied. However, without departing from inventive concepts disclosed and/or claimed herein, alignment-insensitive optical junction apparatus and methods employing adiabatic optical power transfer may be implemented using differing waveguides. Such waveguides may be of the same general type but differ in size, material, index, longitudinal gradient, and so on. Alternatively, the waveguides may be of substantially dissimilar types, as long as the appropriate termination and adiabatic conditions are substantially met. It should be particularly noted that both waveguides need not have a longitudinal modal-index gradient. Adiabatic transverse-transfer may be implemented in methods and apparatus according to the present invention wherein either one or both waveguides have a longitudinal modal-index gradient.

In FIGS. 9A, 9B, and 9C, an optical fiber 920 with core 922 is shown polished at a shallow angle to yield a beveled region having a longitudinally varying modal index. For example, a single-mode optical fiber with about an 8 µm core diameter and about a 0.5° polishing angle may yield a junction region about 1 mm in length; other angles and coupling region lengths may be employed. Optical fiber 920 is shown surface-joined to waveguide 910 with core 912 on substrate 911. Side-joining could also be employed, but may prove mechanically inconvenient due to the diameter of the cladding of optical fiber 920. Waveguide 910 is shown having no longitudinal variation of modal index. The modal index of waveguide 910 should be larger than the index of the cladding layer of fiber 920, but smaller than the modal index of the full fiber 920 (complete core 912 plus complete cladding). Alternatively, waveguide 910 may be provided with a longitudinally-varying modal index in any suitable manner, including those illustrated in FIGS. 1A through 8B.

FIGS. 10A, 10B, 11A, 11B, and 12 show a fiber-optic-taper segment and various waveguides adapted for substantially adiabatic optical power transfer. In FIGS. 10A and 10B, taper segment 1020 is adiabatically surface-joined (FIG. 10A) or side-joined (FIG. 10B) to waveguide 1010, the waveguide 1010 including a longitudinally tapered core 1012. The modal index of waveguide 1010 is preferably larger than the modal index of taper segment 1020, while the index of the cladding of waveguide 1010 is preferably smaller than the modal index of the taper segment 1020. In FIGS. 11A and 11B, taper segment 1120 is adiabatically surface-joined (FIG. 11A) or side-joined (FIG. 11B) to waveguide 1110, the waveguide 1110 including core 1112 with a longitudinal index-differential gradient. The modal index of waveguide 1110 is preferably larger than the modal index of taper segment 1120, while the index of the cladding of waveguide 1110 is preferably smaller than the modal index of the taper segment 1120. FIG. 12 shows fiber-optic-taper segment 1220 adiabatically side-joined to side-etched (or side-polished) beveled waveguide 1210. Surface-joining could also be employed with an etched waveguide and taper segment, but may prove to be mechanically inconvenient. The modal index of waveguide 1210 is preferably larger than the modal index of taper segment 1220, while the index of the cladding of waveguide 1210 is preferably smaller than the modal index of the taper segment 1220. It should be noted that the portion of the fiber-optic-taper segment 1020/1120/1220 shown forming an adiabatic optical power transfer junction in these embodiments is preferably the substantially straight central portion of the fiber-optic taper, and typically has a diameter and modal index substantially invariant with respect to longitudinal position along the taper segment. It may be desirable to construct adiabatic optical power transfer devices using portions of a fiber-optic taper having longitudinally varying diameter and/or modal index.

In any of the embodiments of FIGS. 10A through 12, the waveguide 1010/1110/1210 may be positioned on a substrate 1011/1111/1211, and perhaps also integrated with other optical components thereon. Alignment structures of the sort described in earlier-cited application A9 may be employed for aligning the fiber-optic-taper segment 1020/1120/1220 relative to the waveguide. The nature of adiabatic optical power transfer ensures that transfer of optical power between the fiber-optic-taper segment and the waveguide is substantially insensitive to the precise alignment of the fiber-optic-taper segment within a range of several microns. Construction of devices employing substantially adiabatic optical power transfer between a fiber-optic taper and a waveguide may be correspondingly less difficult, expensive, and/or time-consuming than analogous devices incorporating fiber-optic taper mode-interference-coupled to the waveguide. Mode-interference-coupled devices may nevertheless be employed, and may even be preferred under certain circumstances, as discussed hereinbelow.

FIGS. 13A, 13B, 14A, 14B, 15A, and 15B illustrate assembly of optical waveguides for adiabatic optical power transfer, using so-called "flip-chip" structures and planar waveguides. FIGS. 13A and 13B show top and side views, respectively, of a portion of a planar waveguide circuit on a substrate 1311, including planar waveguides 1310a and 1310b with tapered waveguide cores 1312a and 1312b, respectively. Tapered cores 1312*a* and 1312*b* are shown tapering in both transverse dimensions for clarity, but may equivalently be provided tapering in only one transverse dimension, with a longitudinal index-differential gradient, or in any other suitable form for providing a longitudinally varying modal index along a junction region. Substrate 1311 is provided with alignment guides 1315, and electrical contact 1316. The planar waveguide circuit is adapted to receive an optical component and transmit optical power thereto/therefrom through waveguides 1310*a*/1310*b*. FIGS. 14A and 14B show side and bottom views, respectively, of an optical device 1324 on a substrate 1321. Device 1324 may be an active or passive device of any desired sort, including a laser, modulator, filter, or other optical device. External-transfer waveguides 1320*a* and 1320*b* are also positioned on substrate 1321 and are end-coupled to device 1324, in the manner disclosed in earlier-cited application A8 (wherein the external-transfer waveguides are referred to as external-coupling waveguides; the terms may be considered equivalent for purposes of the present written description and/or claims). The external-transfer waveguides 1320*a*/1320*b* are provided with cores 1322*a*/1322*b* (respectively), each having a longitudinally varying modal index provided in any suitable manner as described hereinabove. Optical device 1324 may be provided with an electrical contact 1326 for engaging contact 1316.

FIGS. 15A and 15B show top and side views, respectively, of the device 1324 on substrate 1321 assembled with waveguide substrate 1311. Alignment guides 1315 engage lithographically defined alignment edges of device substrate 1321 so as to position external-transfer waveguides 1320*a*/1320*b* for adiabatic optical power transfer with planar waveguides 1310*a*/1310*b* (respectively). Many other forms of alignment guides may be equivalently employed, including but not limited to ridges, edges, tabs, slots, pins, flanges, interlocking teeth, optical targets, and so forth. An optical signal may therefore be substantially completely transferred from a planar waveguide into the device, and substantially completely transferred into the other planar waveguide after being acted upon by the device. Alternatively, optical signal power emitted from device 1324 may be transferred into external-transfer waveguides 1310*a*/1310*b*. The relaxed tolerances of adiabatic transverse-transfer enable an optical device to be readily inserted into a planar waveguide system with substantially reduced time, cost, and/or difficulty, and/or increased device yield. In particular, relaxed tolerances readily enable simultaneous alignment of an optical device with multiple waveguides, as exemplified in FIGS. 15A and 15B. Such simultaneous alignment would be exceedingly difficult to achieve by either end-coupling or mode-interference coupling. Multiple device locations such as that shown in FIGS. 13A and 13B may be provided on a single waveguide substrate, thereby enabling ready assembly of multiple optical devices provided in the manner shown in FIGS. 14A and 14B.

It should be re-emphasized that any of the methods and apparatus disclosed in earlier-cited application A8 may be implemented using waveguides adapted for substantially adiabatic optical power transfer as disclosed herein as an external-transfer waveguide (external-transfer waveguides are referred to as external-coupling waveguides in earlier-cited application A8; the terms may be considered equivalent for purposes of the present written description and/or claims). The relaxed alignment tolerances provided by adiabatic optical power transfer would further enhance the advantages provided by the use of external-transfer waveguides according to application A8.

FIGS. 16A, 16B, 17A, 17B, 18A, and 18B illustrate an assembly suitable for substantially adiabatic optical signal power transfer between a planar waveguide system and an optical fiber. FIGS. 16A and 16B are top and side views, respectively, of a portion of a planar waveguide substrate 1611 adapted for substantially adiabatic optical power transfer to an optical fiber. Waveguide 1610 may be provided on substrate 1611 with tapering core 1612. The longitudinally varying modal index provided by tapered core 1612 may be provided by any other suitable structure, including a core tapered in one or both transverse dimensions, a graded-index-differential core, or any other suitable form. Substrate 1611 is provided with alignment guides 1615. FIGS. 17A and 17B are side and bottom views, respectively, of an angle-polished beveled optical fiber 1620 positioned in an angled V-block 1621. The angled V-groove 1623 of block 1621 may preferably be used to polish optical fiber 1620 to the appropriate bevel angle, and may then be used to position the beveled end of fiber 1620 and core 1622 relative to waveguide 1610.

FIGS. 18A and 18B are top and side views, respectively, of planar waveguide substrate 1611 assembled with block 1621. Alignment guides 1615 engage lithographically defined alignment edges of block 1621 so as to position the polished portion of fiber 1620 relative to tapered core 1612 for substantially adiabatic optical power transfer therebetween. Many other forms of alignment guides may be equivalently employed, including but not limited to ridges, edges, tabs, slots, pins, flanges, interlocking teeth, optical targets, and so forth. The relaxed tolerances of adiabatic optical power transfer enable an optical fiber to be readily coupled to a planar waveguide system with substantially reduced time, cost, and/or difficulty, and/or increased device yield. Apparatus and methods according to the present invention may be particularly well-suited for simultaneous assembly/alignment of an optical component or sub-assembly with two or more other optical waveguides, devices, and/or sub-assemblies.

A variety of waveguide types may be employed as a waveguide adapted for substantially adiabatic optical power transfer while remaining within the scope of the present invention. A low-index dielectric waveguide including a core and lower-index cladding layers may be a preferred waveguide adapted for substantially adiabatic optical power transfer (and have been shown in the Figures). Such waveguides may be fabricated using silica-based materials using precision material processing techniques. The resulting waveguide may be readily employed for adiabatic optical power transfer to a silica-based fiber-optic-taper segment or angle-polished optical fiber. Other waveguide materials and/or configurations may be equivalently employed, and varying waveguide properties exploited to modify and/or enhance the utility of adiabatic optical power transfer. Germano-silicates are commonly employed as waveguide or fiber core materials, and may be suitable for use as a core material in the present application. Silicon nitride ($Si_xN_y$) and/or silicon oxynitride ($SiO_xN_y$) may also be preferred materials for forming a waveguide core adapted for adiabatic transverse-transfer. Waveguides may be employed wherein confinement of waveguide optical modes is effected by: one or more waveguide cores surrounded by lower-index cladding layers, distributed Bragg reflectors, other multi-layer reflectors, photonic bandgap/photonic crystal-based techniques, metal reflector coatings, dielectric reflector coatings, and/or internal reflection at an air/waveguide interface. A waveguide with a core may include a single core or multiple-cores, the latter which may be employed for altering the field distribution of a supported isolated or system mode (so-called "field-flattening", thereby further reducing alignment sensitivity of an assembled optical device). Waveguide materials may include (but are not limited to) one or more of: silica, germanosilicate, and/or other doped silicas or silica-based materials; silicon nitride and/or silicon oxynitride; semi-conductor materials; organic materials; inorganic materials; crystalline materials; glassy or amorphous materials; polymeric materials; electro-optic materials; other low- or high-index dielectric materials; and so forth. Low-index dielectric waveguides (including silica-, germano-silicate-, silicon nitride-, and or silicon oxynitride-based, for example) and silica-based optical fiber (angle-polished and/or tapered) are particularly noted as suitable waveguides for adiabatic optical power transverse-transfer according to the present invention. Such waveguides may exhibit little or no dependence of adiabatic optical power transfer performance on wavelength or polarization, and this may be desirable for a variety of optical devices employing waveguides adapted for substantially adiabatic optical power transfer according to the present invention. Multi-layer waveguides as disclosed in earlier-cited applications A1 and A10 are also noted as potentially desirable candidates for use as waveguides adapted for substantially adiabatic optical power transfer. Such waveguides may exhibit substantial dependence of adiabatic optical power transverse-transfer performance on wavelength and/or polarization, and this may be desirable for a variety of optical devices. Incorporation of electro-active and/or non-linear-optical materials into a waveguide adapted for substantially adiabatic optical power transverse-transfer may enable active control of performance of the waveguide.

In the exemplary embodiments shown in the Figures, the waveguides (or cores thereof) adapted for adiabatic optical power transfer are shown terminating, and the embodiments shown are all intended for use in situations where substantially complete transfer of optical signal power between waveguides is desired. The waveguides (or cores) need not necessarily terminate in such embodiments, and embodiments in which the waveguide and/or core does not terminate shall fall within the scope of the present invention as disclosed and/or claimed herein. Waveguides adapted for adiabatic optical power transfer may also be employed for less than complete transfer of optical signal power between waveguides while remaining within the scope of the present invention as disclosed and/or claimed herein.

Fabrication of waveguides suitable for adiabatic optical power transfer may be facilitated by use of precision material processing techniques. This may be especially advantageous when such waveguides are provided integrated onto a substrate along with other optical components and/or devices that may be fabricated using similar techniques. These may include precision and/or spatially-selective material processing techniques such as lithography, deposition, doping, masking, etching, and so forth. Such techniques may be implemented on a wafer-scale to effect simultaneous fabrication of many integrated groups of optical devices, components, and/or waveguides. In particular, waveguides adapted for adiabatic optical power transfer employed as external-transfer waveguides for optical devices as disclosed in earlier-cited application A8 may preferably be fabricated on a wafer-scale using these techniques.

Use of an external-transfer optical waveguide as a link between an optical device fabricated on a substrate and a transmission optical waveguide is a powerful technique, and was introduced in earlier-cited applications A8 and A11. Wafer-scale fabrication may be employed for simultaneous fabrication of many optical devices, each having an optically integrated external-transfer optical waveguide for providing an optical junction with a transmission waveguide (a planar waveguide, an optical fiber, or some other transmission optical waveguide). Precision material processing techniques readily enable proper positioning and alignment of each optical device and its respective external-transfer optical waveguide for optical power transfer (i.e., optical integration, for end-transfer or transverse-transfer). Optical power transverse-transfer between the external-transfer optical waveguide and a transmission optical waveguide configured as an optical probe (as disclosed in earlier-cited applications A3, for example) allows testing and qualification of optical devices on the substrate before the difficult, time-consuming, and expensive step of dividing the wafer into individual devices.

Relaxed alignment tolerances for optical power transverse-transfer (and particularly for substantially adiabatic transverse-transfer) readily enable proper positioning and alignment of the external-transfer optical waveguide and the transmission optical waveguide. Adiabatic transverse-transfer may be particularly appropriate in applications where substantially complete transfer of optical power is desired and/or when substantially polarization- and/or wavelength-independent transfer is desired, and generally provides the least demanding alignment tolerances of the optical power transfer techniques discussed herein. Optical junction regions may be quite long, however, even exceeding a millimeter in length, which in turn increases overall device size. Mode-interference-coupled transverse transfer may be particularly appropriate when polarization- and/or wavelength-dependent transfer is desired, when active control of optical power transfer is desired, when varying degrees of optical power transfer are desired, and/or when a short optical junction region (even shorter than 100 µm) and smaller device size is desired.

FIGS. 19A, 19B, 19C, and 19D schematically illustrate generic examples of an optical device 1910 and a transmission optical waveguide 1920 with an external-transfer optical waveguide 1930 positioned and adapted for transferring optical power therebetween according to the present invention. The optical device 1910 may typically define a spatial optical mode 1911 only a few microns across. Such device-supported modes may also differ between horizontal and vertical dimensions, sometimes being less than one micron high. An end face of a previous optical device would generally comprise a cleaved end face of the material from which the device was fabricated, through which optical signal power would be transmitted. For an optical device implemented according to the present invention, the end face 1914 may be etched rather than cleaved. Further material processing steps (lithography, deposition, masking, etching, and so forth) may be used to fabricate an external-transfer optical waveguide 1930 on the device substrate 1902. Precision material processing techniques readily enable sub-micron tolerances in the fabrication and alignment of the external-transfer optical waveguide 1930 on the device substrate 1902 relative to the spatial mode 1911 defined by the device 1910. The external-transfer optical waveguide 1930 may preferably be fabricated so as to support an optical mode 1931 (substantially characteristic of the waveguide 1930 when isolated) substantially spatial-mode-matched to the optical mode 1911 defined by the device 1910. As a result of this spatial-mode-matching, optical power may be efficiently transferred between the optical device 1910 and the external-transfer optical waveguide 1930. Alternatively, the optical power may be transferred between the optical device and the external-transfer optical waveguide by any suitable method, including end-transfer and transverse-transfer (adiabatic or mode-interference-coupled). Whatever scheme is employed for optical power transfer between the optical device and the external-transfer optical waveguide, fabrication/integration of the optical device and the external-transfer optical waveguide on a common substrate enables precision alignment and efficient, reproducible, and reliable optical power transfer.

The external-transfer optical waveguide 1930 is provided with a transverse-transfer optical junction segment 1934 to enable transfer of optical signal power between the optical device 1910 and a transmission optical waveguide 1920 at an optical junction segment 1924 thereof. A preferred transmission optical waveguide may include an optical fiber having a tapered segment for transverse-transfer, a planar waveguide or planar waveguide circuit fabricated on a substrate and having a transverse-transfer optical junction segment, an optical fiber or optical waveguide having a side-etched transverse-transfer optical junction segment, or other suitable transmission optical waveguide having a suitably adapted transverse-transfer optical junction segment. The transmission optical waveguide may support an optical mode 1921 (characteristic of the waveguide 1920 when isolated). The respective optical junction segments 1934/1924 of the external-transfer optical waveguide 1930 and the transmission optical waveguide 1920 may be adapted for mode-interference-coupled optical power transverse-transfer (depicted schematically in FIGS. 19A and 19B), or adapted for substantially adiabatic optical power transverse-transfer (depicted schematically in FIGS. 19C and 19D, with transmission waveguide 1920 shown on a substrate 1922 in FIG. 19D). Optical modes at/near the junction regions 1924/1934 may resemble superpositions of isolated waveguide modes 1921/1931 or may be system modes that may not particularly resemble isolated waveguides modes or superpositions thereof.

The optical junction segment 1924 of the transmission waveguide 1920 may be positioned relative to the optical junction segment 1934 of the external-transfer optical waveguide 1930 so as to achieve transverse-transfer of optical power between optical mode 1931 of the external-transfer optical waveguide 1930 and the optical mode 1921 of transmission optical waveguide 1920. The structure, dimensions, material(s), and/or positions of the optical junction segment(s) 1924 and/or 1934 may be chosen to achieve substantially modal-index-matched transverse transfer by providing the correct combination of coupling coefficient κ and interaction length L for efficient transfer of optical power. Alternatively, the structure, dimensions, material(s), and/or positions of the optical junction segment(s) 1924 and/or 1934 may be chosen to achieve substantially adiabatic transverse transfer by providing the correct longitudinal variations of coupling coefficient κ(z) and modal-index mismatch Δβ(z). Alignment structures may be provided on the optical device for enabling passive alignment of the optical junction segment of the transmission optical waveguide relative to the optical junction segment of the external-transfer optical waveguide.

Figure 20A:
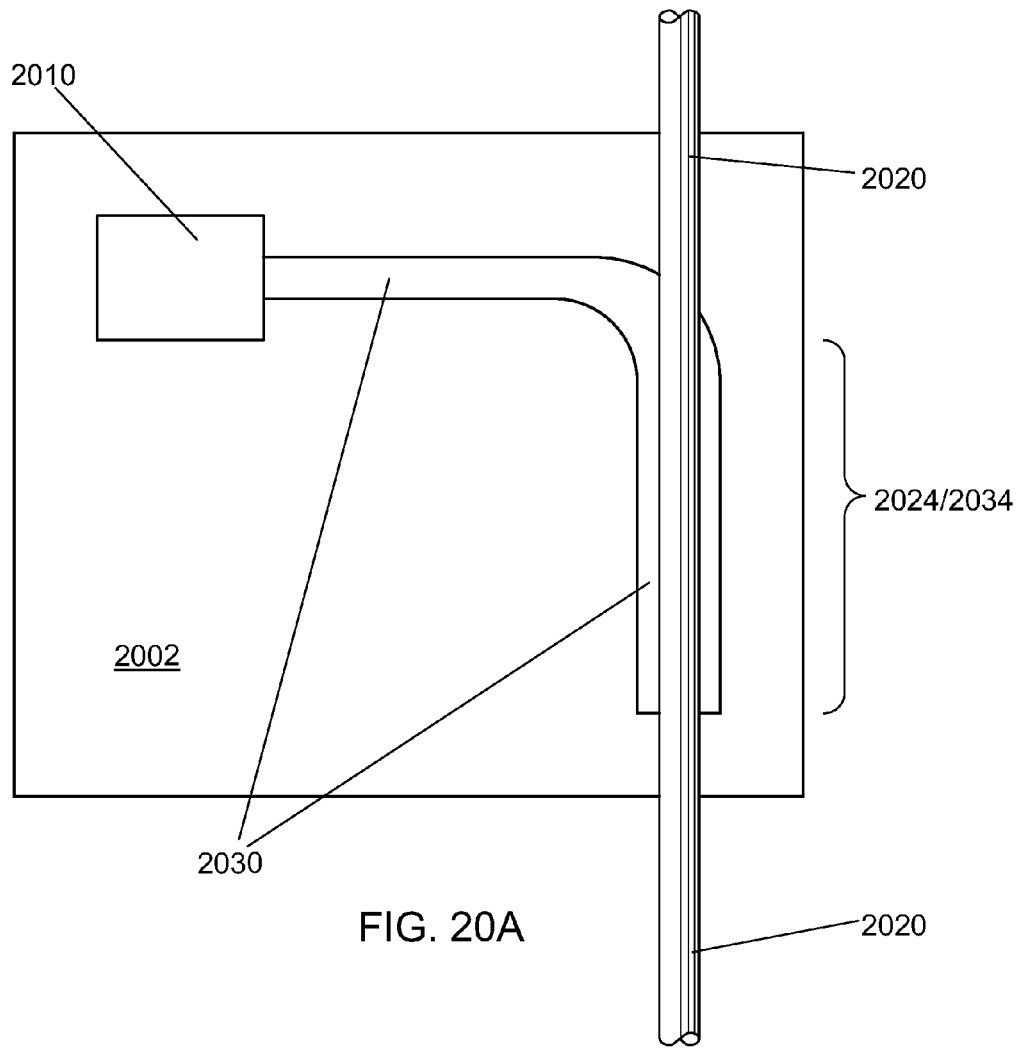
FIGS. 20A and 20B are top and side views, respectively, of an exemplary optical device including an integrated external-transfer optical waveguide according to the present invention.
Figure 20B:
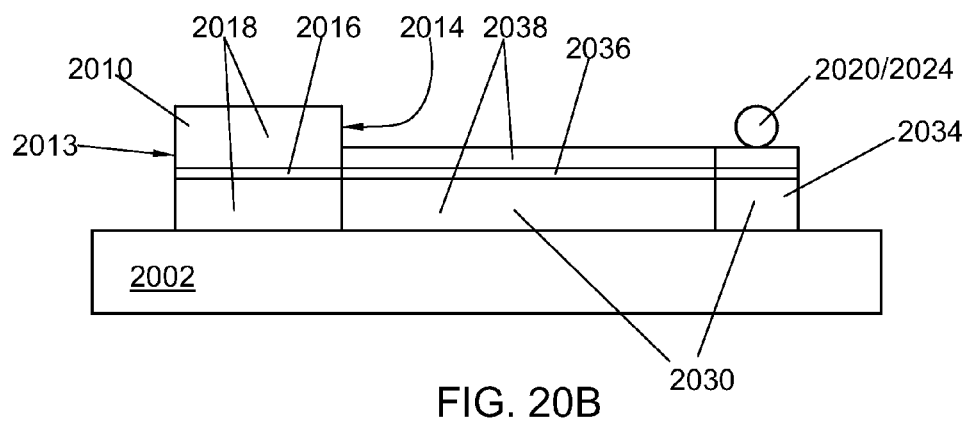

The embodiments of FIG. 20A and many subsequent Figures generally depict configurations suitable for optical power transverse-transfer between an optical device and a transmission optical waveguide through an external-transfer optical waveguide. Any of the embodiments depicted in these Figures may be adapted for mode-interference-coupled or substantially adiabatic transverse-transfer between the external-transfer optical waveguide and the transmission optical waveguide, and should be considered to encompass both configurations unless specifically stated otherwise.

Examples of an optical device connected to a transmission optical waveguide by an external-transfer optical waveguide are shown in FIGS. 20A through 20H. A standard edge-emitting semiconductor laser 2010 is shown having a device optical mode defined by an active layer 2016 and cladding layers 2018. The laser is terminated by faces 2013 and 2014, preferably formed by etching of the device. An external-transfer optical waveguide 2030 is fabricated on the same substrate 2002 as the semiconductor laser 2010. The external-transfer waveguide 2030 may be configured and positioned so as to support an optical mode that is substantially spatial-mode-matched with the spatial mode of the semiconductor laser output. Highly precise material processing techniques (such as lithography, deposition, masking, etching, and so forth) may be employed for aligning the external-transfer optical waveguide 2030 to the laser output far more accurately than could be achieved by active alignment of separate components. Such techniques, which may include self-aligned processes, are often the same as or similar to techniques used to fabricate the semiconductor laser 2010, and may be scaled to simultaneously fabricate numerous optically integrated and precision-aligned laser/waveguide devices during wafer-scale processing.

The laser 2010 and external-transfer optical waveguide 2030 may be fabricated during a single multi-step fabrication process, or during distinct laser- and waveguide-fabrication processes. Laser 2010 and 2030 may be fabricated with similar materials (both semiconductor-based, for example), or with dissimilar materials (semiconductor-based laser and silica-based waveguide, for example). The demarcation between laser 2010 and waveguide 2030 may be sharp or gradual. It should be noted that the distinction between the optical device and the external-transfer optical waveguide may be functional and/or structural. In any of these cases, optical power emitted by the laser 2010 is efficiently end-transferred through face 2014 (equivalently, end-facet 2014) of the semiconductor laser 2010 into the external-transfer optical waveguide 2030. Etching may be employed to form face 2014. Alternatively, any other suitable spatially-selective material processing techniques (such as spatially-selective quantum-well inter-mixing, for example) may be employed to form face 2014 adapted for end-transfer of optical power therethrough. It may be desirable to provide one or more optical coating layers on laser end facet 2013 and/or between laser end facet 2014 and the external-transfer waveguide 2030. Such optical coatings on the end facets of the laser may serve to modify and/or control reflectivity of the end facets and operational properties of the laser. Any optical coating layers on end facet 2014 may be applied before fabrication of the external-transfer waveguide 2030, or may be formed between end facet 2014 and waveguide 2030 after fabrication thereof. It may be desirable to provide face 2014 as an angled end facet, and to provide external-transfer waveguide 2030 with an angled end face angled in a complementary fashion, for reducing feedback into laser 2010 while enabling efficient end-transfer between laser 2010 and external-transfer waveguide 2030.

Alternatively, an optical device and a corresponding external-transfer optical waveguide may be positioned and adapted for transverse-transfer of optical power therebetween. Precision manufacturing techniques as described hereinabove may be employed for achieving efficient optical power transverse-transfer between the optical device and the external-transfer optical waveguide.

Once optical power has been transferred to the external-transfer optical waveguide 2030, it may be transferred to a transmission optical waveguide 2020 (a fiber-optic taper segment in these examples) by transverse-transfer (shown adapted for mode-interference-coupled transverse-transfer in FIGS. 20A-20D; shown adapted for adiabatic transverse-transfer in FIGS. 20E-20H) at respective optical junction segments 2024/2034 of the transmission and external-transfer optical waveguides 2020/2030. In these exemplary devices, the external-transfer optical waveguide 2030 may preferably comprise a low-index optical waveguide including a core 2036 surrounded by lower-index cladding layers 2038 (including silica, germanosilicate, silicon nitride, silicon oxynitride, other glasses, polymers, and so forth). Such a low-index waveguide may be passively modal-index-matched (typically through proper design of the transverse shape/dimensions of the optical junction segment) to a fiber-optic-taper segment 2020 of a silica-based optical fiber for modal-index-matched transverse transfer (FIGS. 20A-20D). If the transverse shape/dimensions of the external-transfer optical waveguide 2030 required for spatial-mode-matching with the laser 2010 and modal-index-matching with the fiber-optic-taper segment 2020 differ substantially, the external-transfer optical waveguide 2030 may be made sufficiently long so as to enable a substantially adiabatic transition between the differing shapes/dimensions. The external-transfer optical waveguide may alternatively be adapted for active modal-index-matching by employing electro-active and/or non-linear optical materials and electrical and/or optical control signals. The fiber-optic-taper segment 2020 may be positioned relative to the external-transfer optical waveguide 2030 to achieve mode-interference-coupled transverse-transfer characterized by a coupling coefficient κ (also determined in part by the transverse shape/dimensions of the optical junction segment 2034 of the external-transfer optical waveguide 2030). The optical junction segments 2034 and 2024 of the external-transfer optical waveguide 2030 and the fiber-optic-taper segment 2020, respectively, may preferably be configured to yield a coupling coefficient κ and an interaction length L such that $\kappa L \approx \pi/2$, thereby resulting in substantially complete transfer of optical power from the external-transfer optical waveguide to the optical fiber.

In the exemplary embodiments of FIGS. 20E-20H, substantially adiabatic transverse-transfer may be employed between optical junction regions 2024/2034, in any of the ways described hereinabove. In other exemplary embodiments, a transmission optical waveguide of another type may be employed instead of fiber-optic-taper segment 2020. Optical power transverse-transfer may be established between external-transfer optical waveguide 2030 and a planar waveguide, for example.

Figure 20C:
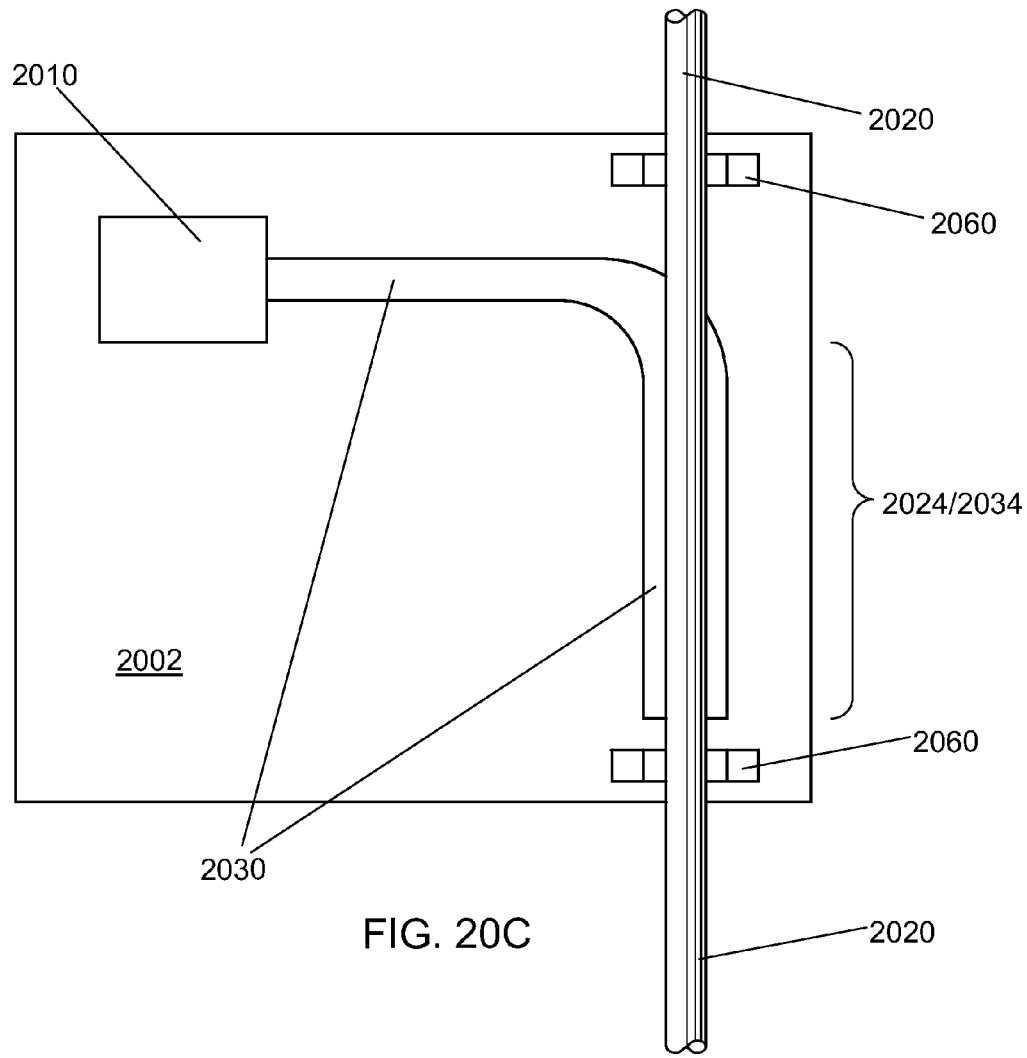
FIGS. 20C and 20D are top and side views, respectively, of an exemplary optical device including an integrated external-transfer optical waveguide according to the present invention.
Figure 20D:
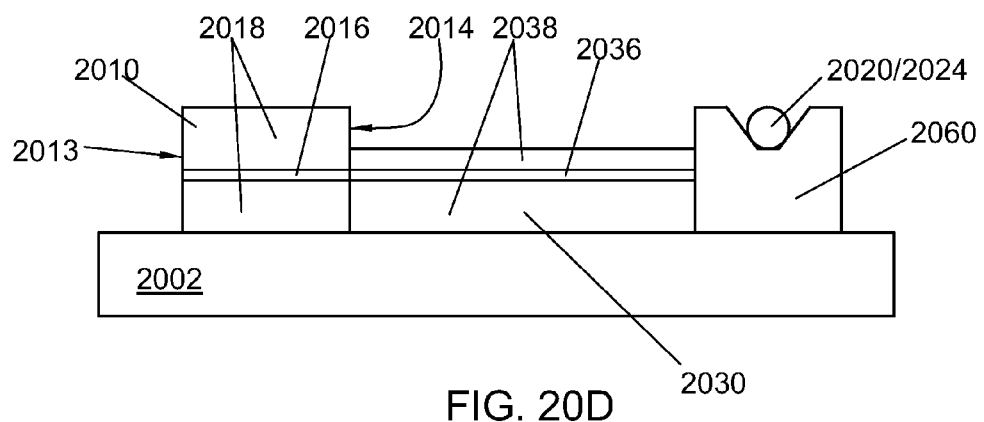
Figure 20E:
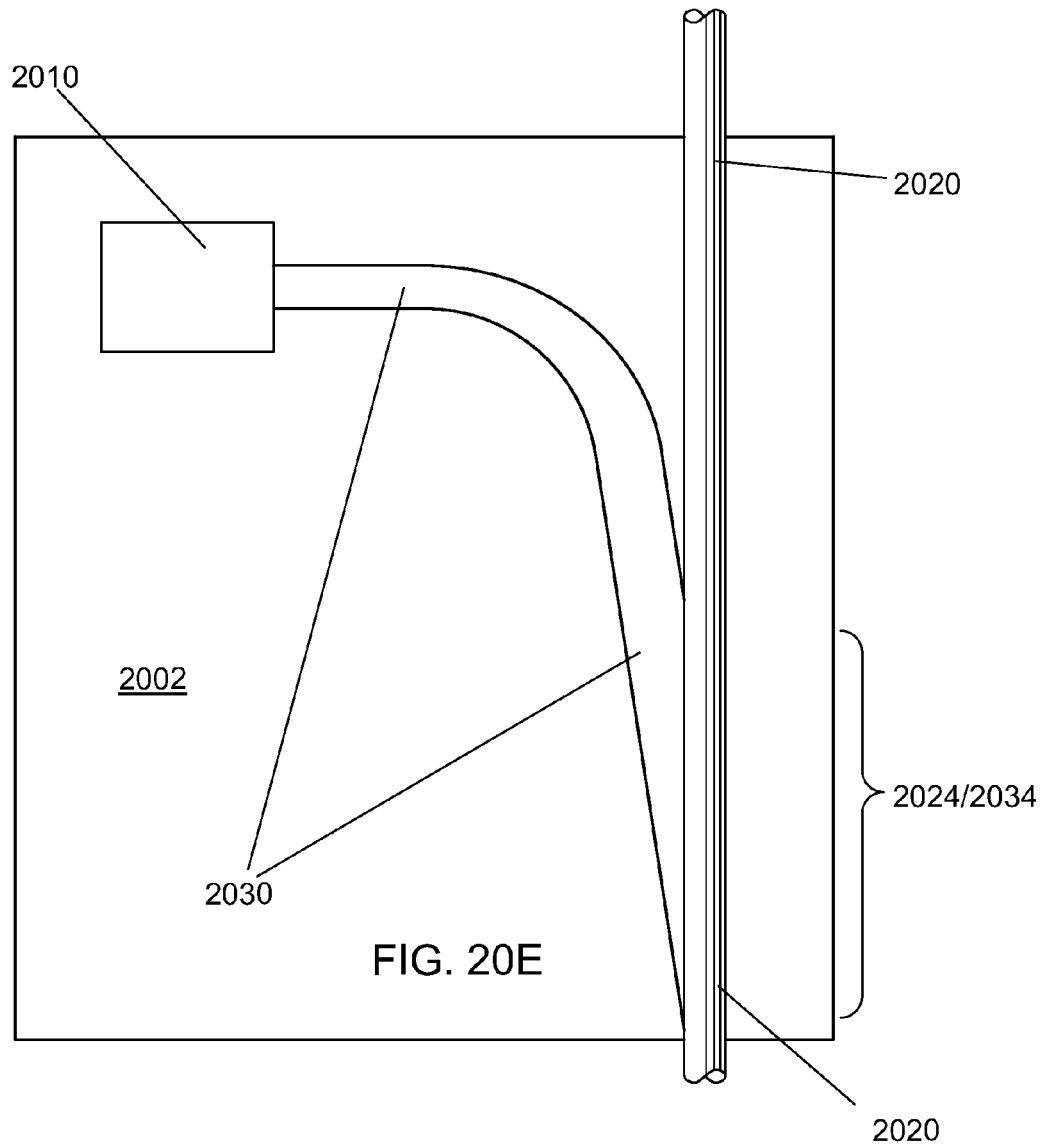
FIGS. 20E and 20F are top and side views, respectively, of an exemplary optical device including an integrated external-transfer optical waveguide according to the present invention.
Figure 20F:
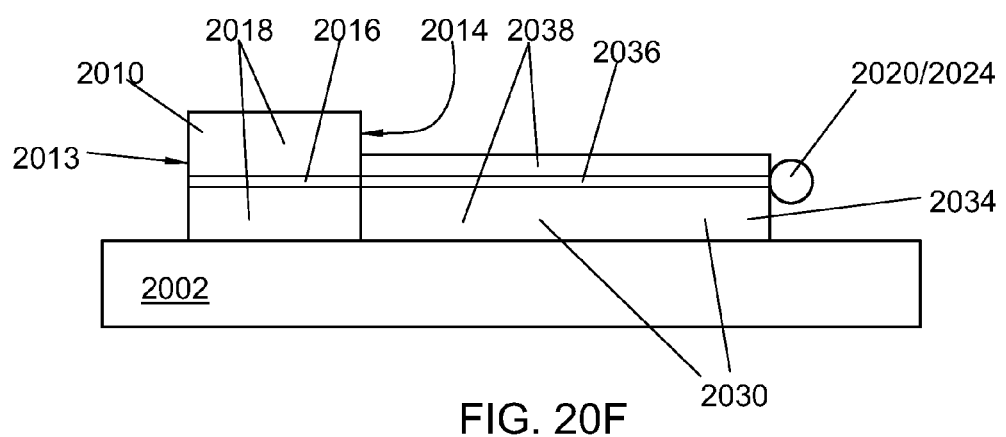
Figure 20G:
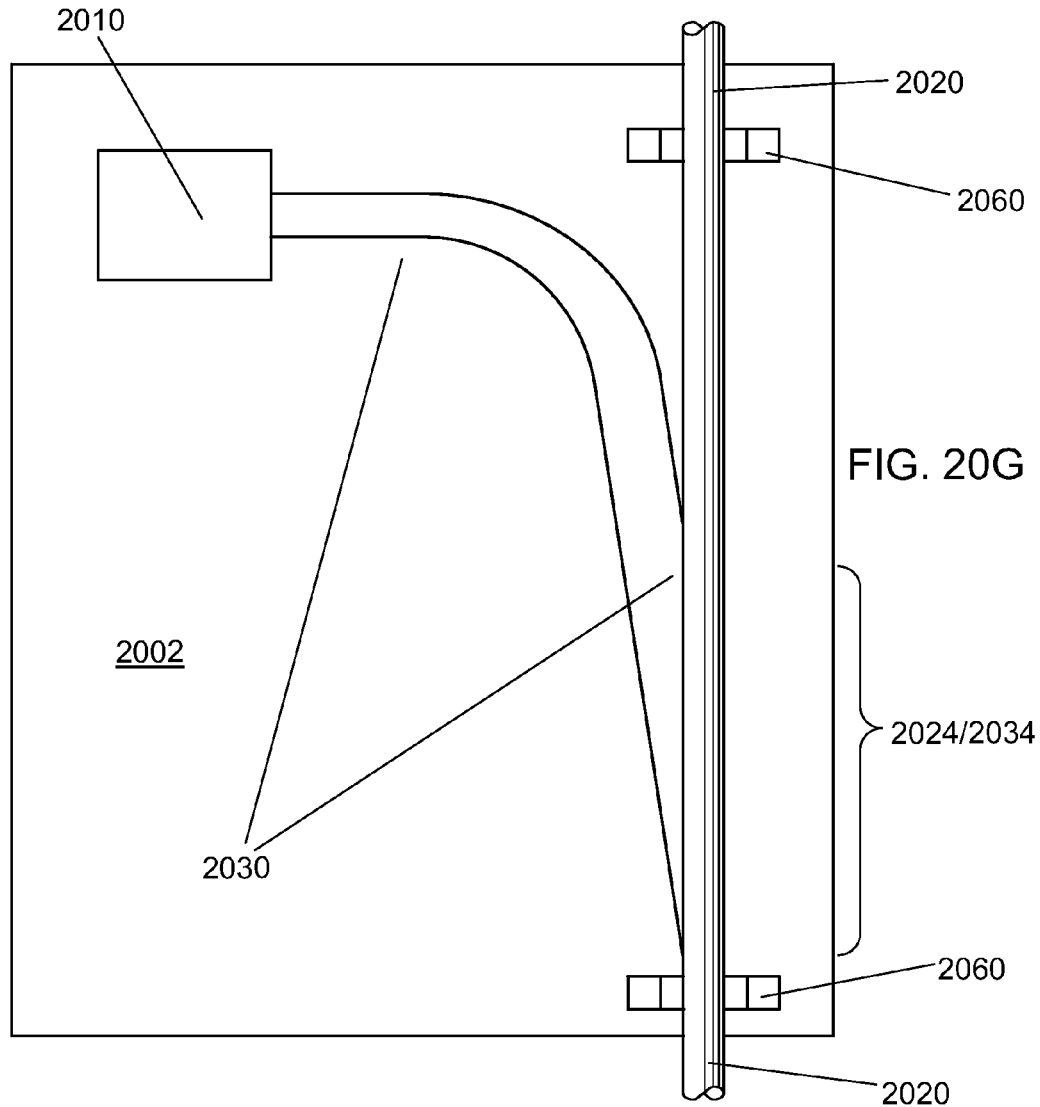
FIGS. 20G and 20H are top and side views, respectively, of an exemplary optical device including an integrated external-transfer optical waveguide according to the present invention.
Figure 20H:
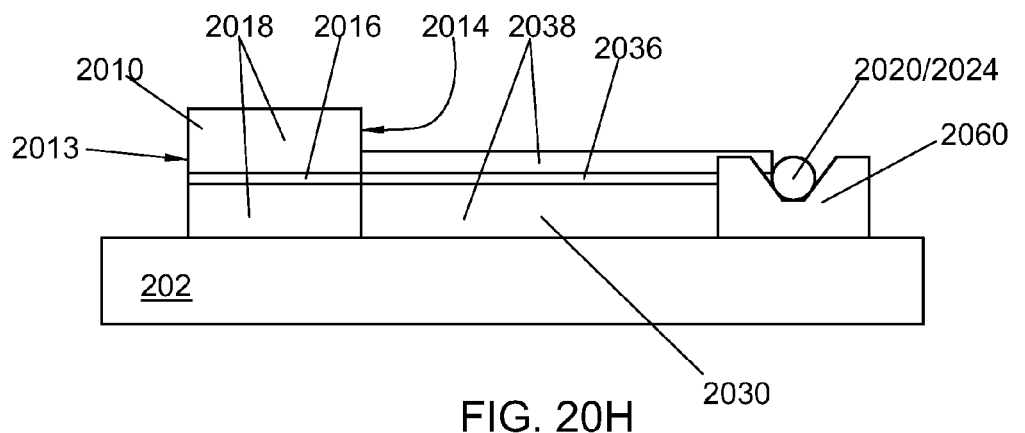

The accuracy with which the optical junction segments 2024/2034 of the transmission optical waveguide 2020 and external-transfer optical waveguide 2030 must be positioned to achieve a desired degree of optical power transfer therebetween (usually substantially complete transfer is desired) employing mode-interference-coupled or substantially adiabatic transverse-transfer is described in detail hereinabove. Accurate transverse positioning may be facilitated or enabled by providing alignment structures in and/or on the substrate such as grooves, flanges, posts, tabs, slots, yokes, solder/metal surface tension, and the like for guiding the optical junction segment of the transmission optical waveguide (the fiber-optic-taper segment of the optical fiber in this example) to the properly aligned position relative to the optical junction segment of the external-transfer optical waveguide and maintaining the alignment thus achieved. Segments of optical fiber (separate from optical fiber carrying the optical signal) may be employed as structural elements for aligning and supporting a fiber-optic taper or other transmission waveguide, and may have fabricated thereon rings, grooves, flanges, and/or knife-edges therefor. Exemplary alignment structures 2060 are shown in FIGS. 20C/20D and 20G/20H for positioning fiber-optic taper segment 2020 relative to external-transfer waveguide 2030. Other similar alignment structures are disclosed in earlier-cited application A9.

Figure 21:
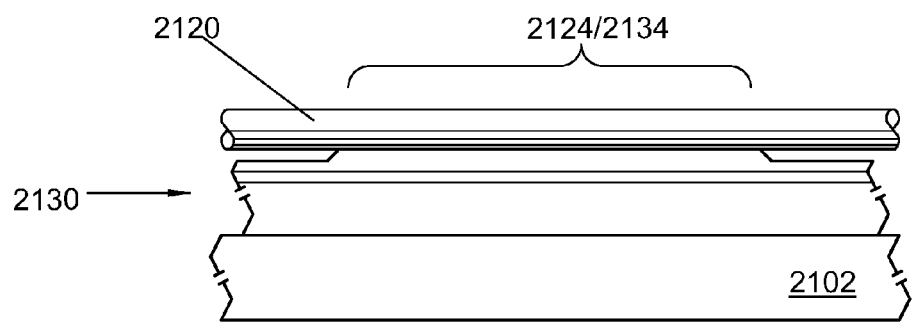
FIG. 21 is a side view of an exemplary external-transfer optical waveguide according to the present invention.

For mode-interference-coupled transverse-transfer, the optical junction segment 2034 of the external-transfer optical waveguide 2030 may be configured to yield the appropriate interaction length L for substantially complete optical power transfer (or other desired optical power transfer level) from the external-transfer optical waveguide 2030 to the transmission optical waveguide 2020. The interaction length may be determined by providing a bend in the external-transfer optical waveguide 2030 between the laser 2010 and the optical junction segment 2034, with the portion of the external-transfer optical waveguide beyond the bend being of the appropriate interaction length (FIGS. 20A-20H). Alternatively, an optical junction segment 2134 of an external-transfer optical waveguide 2130 may be provided with a raised portion of length L and the desired value of κ modal-index-matched transverse-transfer to/from an optical junction segment 2124 of fiber-optic-taper segment 2120 (FIG. 21). In either case, precise longitudinal positioning of the fiber-optic-taper segment relative to the external-transfer optical waveguide is not required. Sufficiently precise alignment of the optical fiber (i.e., the transmission waveguide in this example) and the fiber-optic-taper segment thereof with the external-transfer optical waveguide (and hence with the semiconductor laser) may therefore be achieved by passive alignment techniques. The optical fiber carrying the laser output power may be connected, spliced, or otherwise coupled to a fiber-optic-based optical system by any suitable technique. Alignment precision and the length tolerance for the optical junction segment are further relaxed if adiabatic transverse-transfer is employed instead of mode-interference-coupled transverse-transfer.

An optical device (a semiconductor laser in the preceding example) including an optically integrated external-transfer optical waveguide as described hereinabove enables significant economies of manufacturing to be realized. The use of passive alignment techniques for relative positioning of the transmission optical waveguide and the optical device while achieving high-efficiency optical power transfer therebetween is a significant improvement over the prior art. An additional benefit is the ability to pre-test and pre-qualify numerous devices/waveguides simultaneously fabricated on a single wafer. With cleaved-and-end-coupled devices, the wafer must be cleaved prior to testing of the devices thereon. Substantial processing time, effort, and cost are therefore expended on devices that may be subsequently discarded. According to the present invention, however, each device is provided with an external-transfer optical waveguide prior to any cleaving of the wafer, and the external-transfer optical waveguide enables optical coupling to the device for testing and characterization prior to any division of the wafer. The devices themselves may also be used for diagnosis of neighboring devices using electrical probes and contacts. On a wafer of laser diodes, for example, a diode may be reverse-biased to function as a photodetector for monitoring laser output power from a neighboring device. Alternatively, diagnostic devices may be specifically designed into the fabrication process that results in the optical devices.

The description of a semiconductor laser including an optically integrated external-transfer waveguide set forth in the preceding paragraphs provides only one exemplary implementation of the present invention. The present invention may be generalized to virtually any other optical device that may be fabricated on a substrate. For any such device, an external-transfer optical waveguide may be fabricated on the device substrate as an integral device component, adapted for optical power transfer by end-transfer and/or transverse-transfer between the external-transfer optical waveguide and the optical device. An optical junction segment of the external-transfer optical waveguide may be used to provide efficient transfer of optical power between the device and a transmission optical waveguide. The present invention may be implemented for single-ended or single-port devices such as the semiconductor laser of the preceding examples, and also for multi-port devices such as modulators, filters, switches, multiplexers, splitters/combiners, and so forth. Once a device has been fabricated with the appropriate number of input/output segments, these may be appropriately adapted for optical power transfer (end- or transverse-transfer) and an external-transfer optical waveguide provided for each. Each of these external-transfer optical waveguides may then provide optical power transverse-transfer between the optical device and respective transmission waveguides for connection to an optical system. Optical power transverse-transfer between each external-transfer optical waveguide and its respective transmission optical waveguide may be adiabatic or mode-interference-coupled (active or passive modal-index-matched), and need not be the same for all external-transfer waveguides associated with the optical device.

Figure 22A:
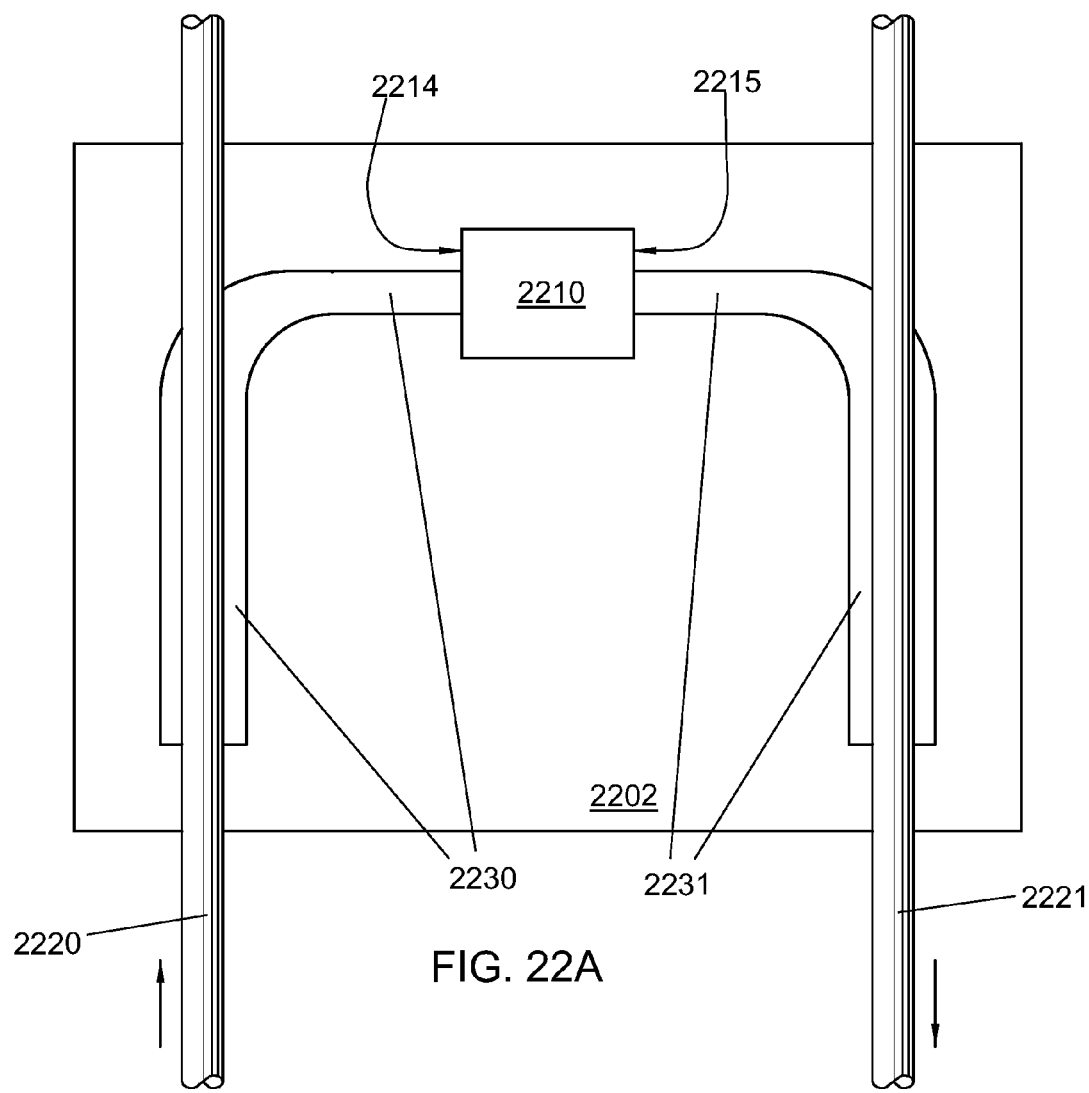
FIGS. 22A and 22B are top and side views, respectively, of an exemplary optical device including integrated external-transfer optical waveguides according to the present invention.
Figure 22B:
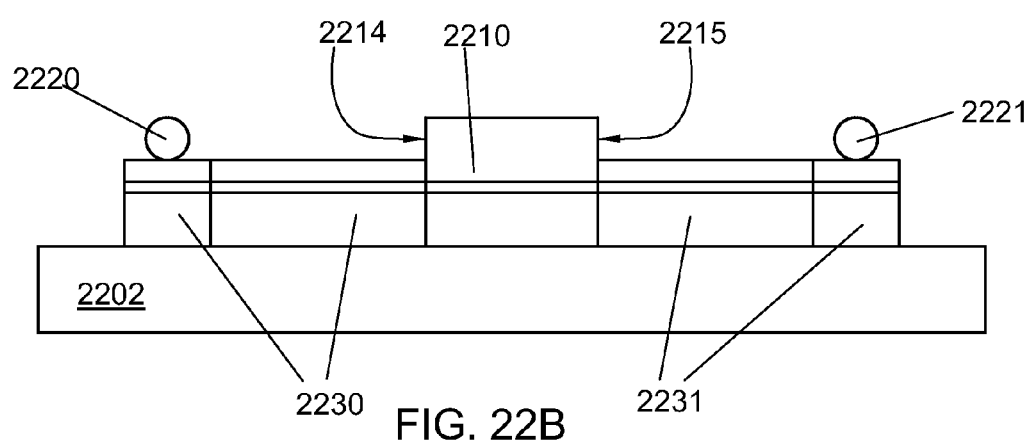

A specific two-port example is shown in FIGS. 22A and 22B, which show a semiconductor electro-absorption modulator 2210 having input and output external-transfer optical waveguides 2230 and 2231 end-coupled to input and output faces 2214 and 2215, respectively. Modulator 2210 and external-transfer optical waveguides 2230/2231 are preferably fabricated on a common substrate 2202. The external-transfer optical waveguides 2230/2231 may be substantially spatial-mode-matched and aligned with an optical mode defined by the modulator 2210. Input and output external-transfer optical waveguides 2230/2231 enable optical power transverse-transfer between the modulator 2210 and input and output transmission optical waveguides 2220/2221, respectively (fiber-optic-taper segments of optical fibers in this example; other transmission optical waveguides, such as planar waveguides, could equivalently be employed, as in FIGS. 13A through 15B). An optical signal to be modulated may be received from an optical system through the input transmission optical waveguide 2220, transferred by transverse-transfer into the input external-transfer optical waveguide 2230, transferred by end-transfer into the modulator 2210, modulated as it propagates through the modulator, transferred by end-transfer into the output external-transfer optical waveguide 2231, transferred by transverse-transfer into the output transmission waveguide 2221, and transmitted to the optical system. Alternatively, optical power transverse-transfer could be employed between modulator 2210 and external-transfer optical waveguides 2230/2231. High efficiency for each transfer of optical power yields a modulator having low insertion loss. Manufacturing and fabrication economies and wafer-scale pre-testing and pre-qualification capabilities described hereinabove would be realized for any device fabricated according to the present invention.

A variety of waveguide types may be employed as an external-transfer optical waveguide (adapted for adiabatic or mode-interference-coupled transverse-transfer) while remaining within the scope of the present invention. A low-index dielectric waveguide including a core and lower-index cladding layers may be a preferred external-transfer waveguide. Such waveguides may be fabricated using silica, germanosilicate, other doped silicas, silicon nitride, silicon oxynitride, other glasses, polymers, and so forth using precision material processing techniques. The resulting waveguide may be readily modal-index-matched to planar waveguides fabricated using similar materials or a silica-based fiber-optic-taper segment. Other waveguide materials and/or configurations may be equivalently employed, and varying waveguide properties exploited to modify and/or enhance the functionality of the optical device. A suitable external-transfer optical waveguide for a preferred embodiment of the present invention may: 1) be adapted at an end thereof for optical power end-transfer between the external-transfer optical waveguide and an optical device; 2) be adapted for optical power transverse-transfer between the external-transfer optical waveguide and an optical device (adiabatic, active modal-index-matched, or passive modal-index-matched); 3) be adapted at an optical junction segment thereof so as to yield suitable values of $\kappa$, L, and/or $\Delta\beta$ with a transmission optical waveguide for mode-interference-coupled transverse-transfer (active or passive modal-index-matched); and/or 4) be adapted at an optical junction segment thereof for substantially adiabatic transverse-transfer with the transmission optical waveguide. Waveguides may be employed wherein confinement of waveguide optical modes is effected by: one or more waveguide cores surrounded by lower-index cladding layers, distributed Bragg reflectors, other multi-layer reflectors, photonic crystal/photonic bandgap techniques, metal reflector coatings, dielectric reflector coatings, and/or internal reflection at an air/waveguide interface. A waveguide with a core may include a single core or multiple-cores, the latter which may be employed for altering the field distribution of a supported isolated or system mode (so-called "field-flattening", thereby further reducing alignment sensitivity of an assembled optical device). Waveguide materials may include (but are not limited to) one or more of: silica, germanosilicate, and/or other silica-based materials, silicon nitride, silicon oxynitride, organic materials, inorganic materials, crystalline materials, glassy or amorphous materials, polymeric materials, semiconductor materials, electro-optic materials, and so forth. Low-index dielectric waveguides (silica-based, for example) may be passively modal-index-matched to a transmission waveguide of similar index. Such waveguides may exhibit little or no dependence of transverse-coupling efficiency on wavelength or polarization, and this may be desirable for a variety of optical devices employing external-transfer optical waveguides according to the present invention.

It may be desirable (particularly when employing mode-interference-coupled transverse-transfer) to modify the distal end of the external-transfer optical waveguide (the end that is not coupled to the optical device) in a variety of ways. It may be preferable to substantially eliminate optical feedback to the optical device arising from optical power back-reflected from the distal end of the external-transfer optical waveguide. The distal end may be modified to substantially eliminate such feedback by providing an optical loss element (an optical absorber and/or optical scatterer), and/or by intentionally fabricating a mis-aligned end face of the external-transfer optical waveguide so that back-reflected optical power does not propagate back through the waveguide. Such a canted end-face may provide additional utility for testing and/or monitoring the optical device. A substantially planar (or suitably curved, if focusing properties are desired) canted or beveled end-face may serve to reflect optical power transversely out of the external-transfer optical waveguide (down toward the substrate, substantially parallel to the substrate, or up away from the substrate). Optical power directed out of the external-transfer optical waveguide in this way may be detected and/or analyzed for testing/characterization/monitoring of the optical device. For a waveguide end-face canted or beveled to direct optical power up and away from the wafer, an external detector may be employed for device testing and qualification during the manufacturing process. Alternatively, detectors may be integrated into/onto the wafer along with the optical devices and external-transfer optical waveguides, and may remain as part of the finished optical devices to serve as in situ monitors of device performance in addition to enabling testing during manufacturing.

Figure 23:
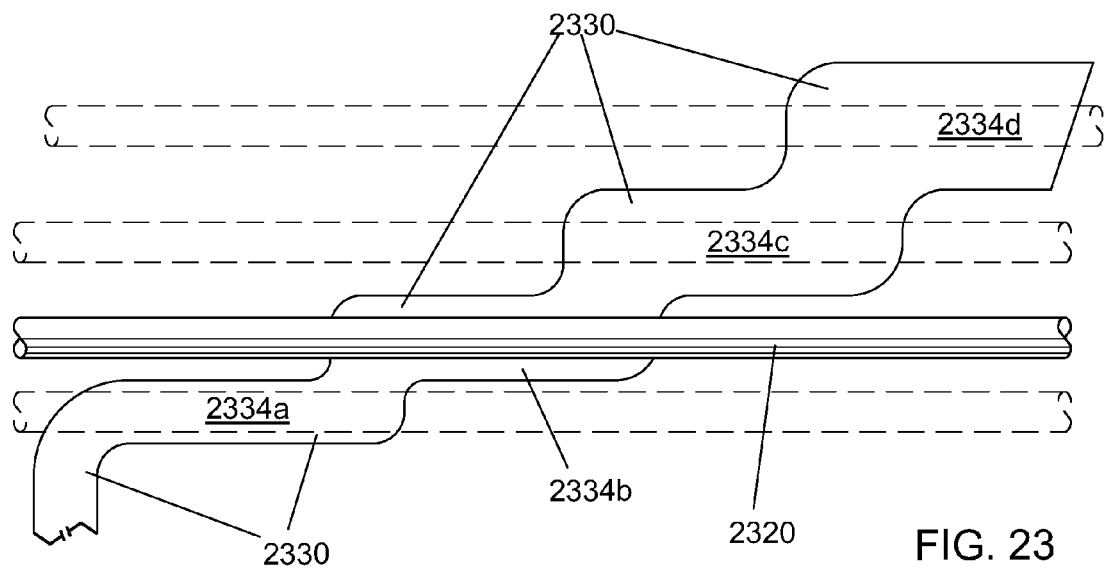
FIG. 23 is a top view of an exemplary external-transfer optical waveguide according to the present invention.

It may be desirable to provide wider tolerances for modal-index-matching near a given wavelength. In an alternative embodiment shown in FIG. 23, external-transfer optical waveguide 2330 may be fabricated with multiple distinct optical junction segments 2334a-2334d, each designed to modal-index-match transmission optical waveguide 2320 at differing wavelengths. Preferably, the modal-index-matched wavelength varies monotonically from segment 2334a to 2334d, and the respective modal-index-matched bandwidths for segments 2334a-d should preferably overlap somewhat to provide substantially continuous wavelength coverage. During assembly of an optical device, transmission waveguide 2320 may be sequentially coupled to each of segments 2334a-d until a substantially modal-index-matched segment is found. Four segments 2334 are shown, but any suitable number of separate optical junction segments 2334 may be provided.

Figure 24:
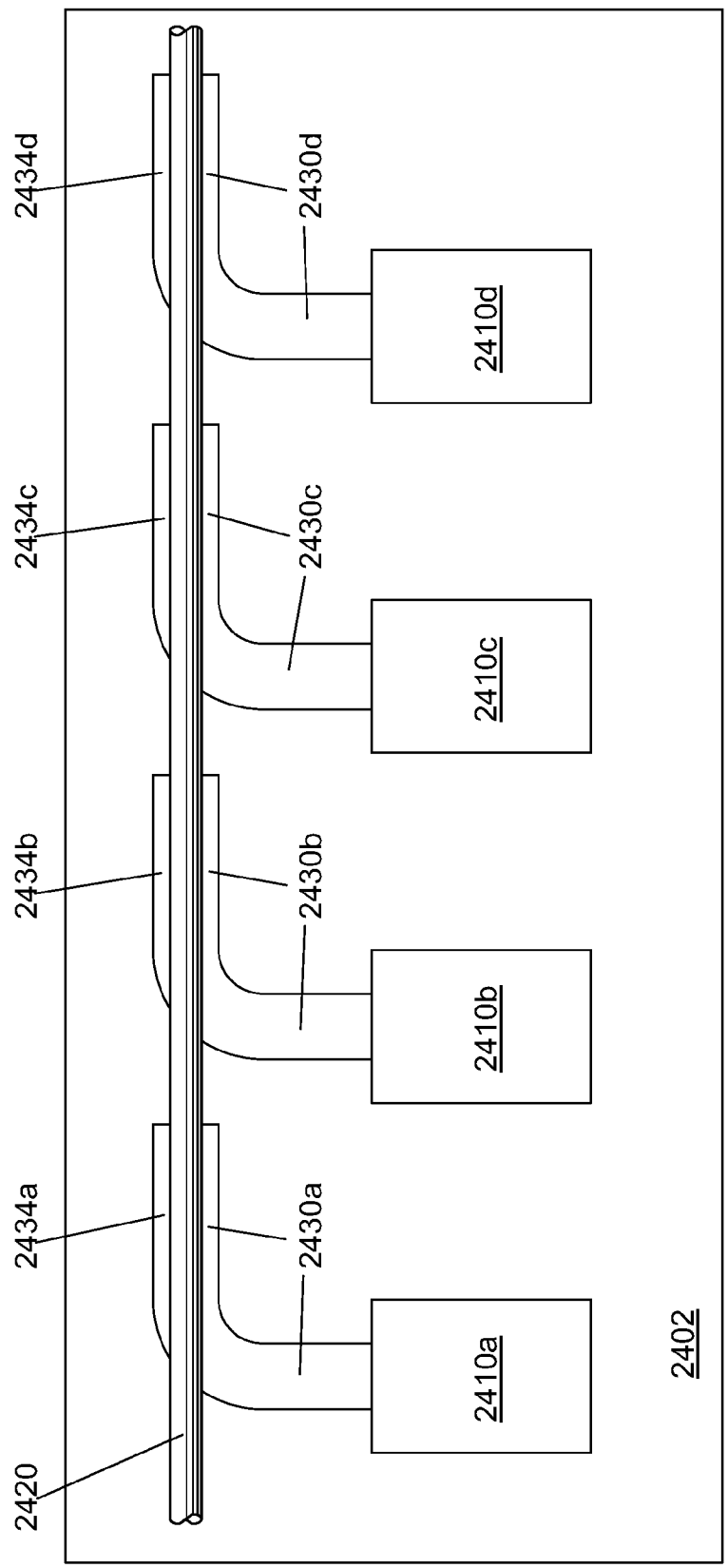
FIG. 24 is a top view of an exemplary optical device including integrated external-transfer optical waveguides according to the present invention.

Under certain circumstances it may be desirable to provide wavelength- or polarization-dependent transfer of optical power to/from an optical device. For example, the device of FIG. 24 shows multiple semiconductor laser sources 2410a-d each coupled to a single transmission waveguide 2420 through corresponding optically integrated external-transfer optical waveguides 2430a-d to form a wavelength-multiplexer. Lasers 2410a-d and external-transfer optical waveguides 2430a-d are preferably fabricated on a common substrate 2402. However, unless the transverse-transfer between the transmission waveguide 2420 and each external-transfer optical waveguide 2430a-d is wavelength dependent, optical power transferred to the transmission waveguide 2420 from the first laser 2410a will be at least partially transferred from the transmission waveguide 2420 into subsequent external-transfer optical waveguides 2430b-d and be lost. By providing wavelength-specific transverse-transfer between the transmission waveguide 2420 and the optical junction segments 2434a-d of external-transfer optical waveguides 2430a-d, optical power transferred to the transmission waveguide from one laser will pass subsequent external-transfer optical waveguides substantially undisturbed.

Wavelength-dependent transverse optical coupling may be most readily achieved by manipulating modal-index-matching between the transmission waveguide and the external-transfer optical waveguide adapted for mode-interference-coupled transverse-transfer. Dispersive properties and the transverse size and/or shape of the optical junction segment of the external-transfer optical waveguide may be exploited to yield transverse-transfer only over a desired wavelength range. Material dispersion alone may not be sufficient to yield a suitably narrow wavelength range for transverse-transfer. Multi-layer reflector waveguides (referred to as DBR waveguides in applications A1 and A2, as MLR waveguides in application A10) typically exhibit significantly greater wavelength dispersion in the modal index of supported optical modes, and may be preferred for implementing wavelength-dependent external-transfer optical waveguides for optical devices according to the present invention. Such waveguides are described in detail in earlier-cited applications A1, A2, and A10, and typically comprise a core layer between upper and lower λ/4 stacks of materials having differing refractive indices (these stacks are also referred to as multi-layer mirrors or multi-layer reflectors). The upper and lower stacks may be the same or may differ in materials and/or number of layers, depending on the desired waveguide characteristics (in some implementations the upper stack and even the core may be missing entirely). Transverse-transfer to a MLR waveguide may be achieved from the side of the waveguide (substantially perpendicular to the MLR stack grating wavevector) or from the surface of the waveguide (substantially along the MLR stack grating wavevector). The stacks serve to confine the waveguide optical modes, and give rise to the dispersive properties of the MLR waveguide. Suitable MLR waveguides for use in the present invention may be fabricated using dielectric and/or semiconductor layers, and may be designed to exhibit the desired dispersive properties.

Figure 25:
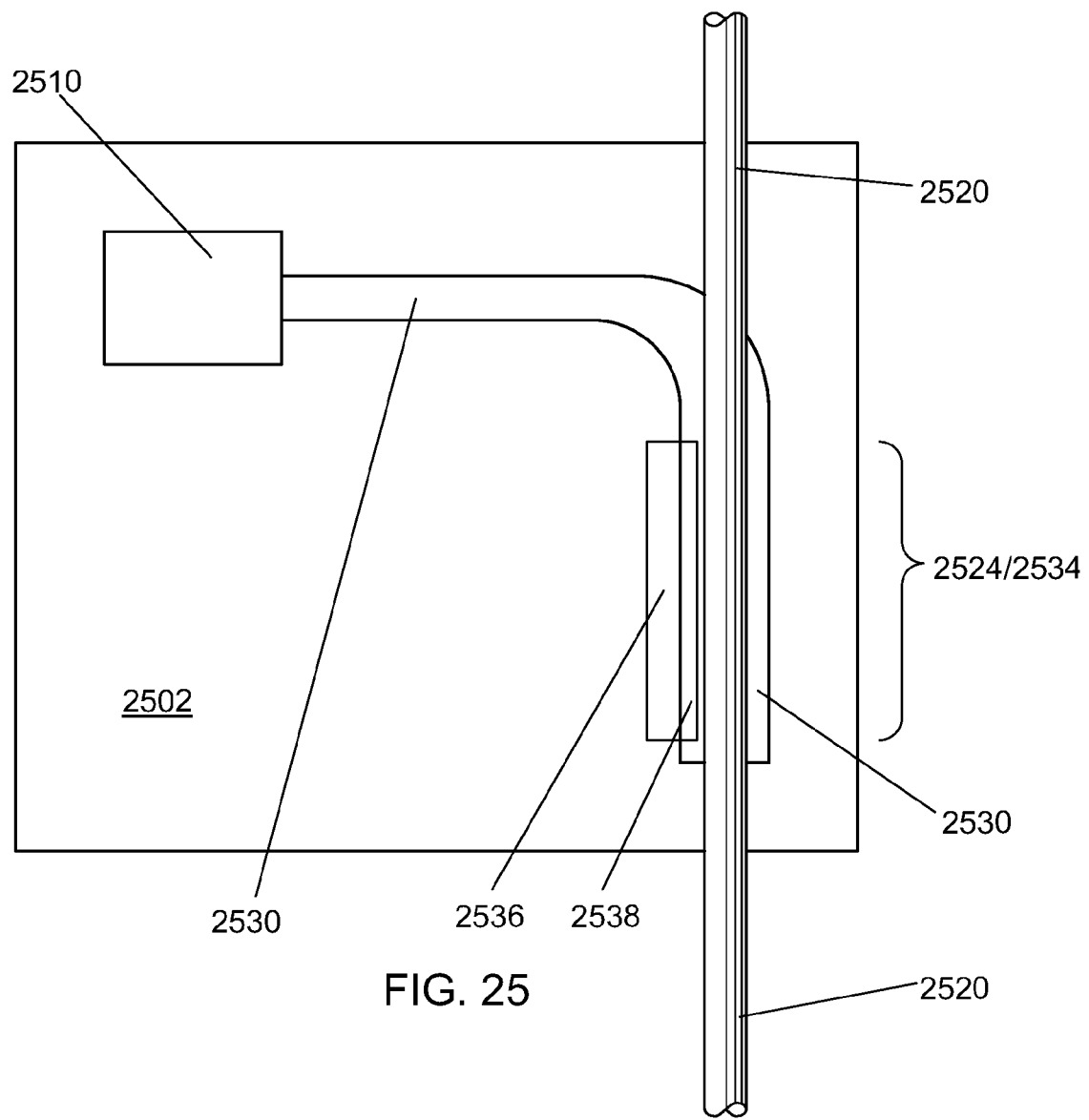
FIG. 25 is a top view of an exemplary optical device including an integrated external-transfer optical waveguide according to the present invention.

Sufficiently accurate design and fabrication of such MLR waveguides may enable passively-modal-index-matched mode-interference-coupled transverse-transfer between the transmission optical waveguide and external-transfer optical waveguide over a desired wavelength range. Alternatively, electro-optic properties of the MLR waveguide (either inherent in the materials used or specifically incorporated into one or more electro-optic material layers) may be employed to enable actively-modal-index-matched mode-interference-coupled transverse-transfer. As shown in FIG. 25, control electrodes or contacts 2536 and 2538 may be provided on the optical junction segment 2534 of the external-transfer optical waveguide 2530, and a control voltage applied to achieve modal-index-matching with the optical junction segment 2524 of fiber-optic taper 2520 over the desired wavelength range. Device 2510 and external-transfer optical waveguide 2530 may preferably be fabricated on common substrate 2502 to achieve substantially spatial-mode-matched end-coupling therebetween. Such an actively modal-index-matched implementation enables selection of a desired transverse-transfer wavelength even if the MLR waveguide cannot be sufficiently accurately designed and fabricated, or if there are manufacturing tolerances for the design wavelength of device 2510. Such active modal-index-matching also enables construction of optical devices having dynamically re-configurable wavelength-dependent properties.

Alternatively, a multi-layer dispersion-engineered optical waveguide may be employed as an external-transfer optical waveguide adapted for adiabatic optical power transverse-transfer. Optical properties of the multi-layer reflector waveguide may be varied along the length thereof in a variety of ways to achieve adiabatic transverse-transfer. Variation of refractive index, thickness, and width of one or more layers may be employed for providing an external-transfer optical waveguide adapted for adiabatic transverse-transfer according to the present invention. This multi-layer reflector implementation may enjoy the relaxed alignment tolerances typical of adiabatic transverse-transfer, while still enabling active control over optical power transverse-transfer.

MLR waveguides typically exhibit polarization-dependent modal indices for supported optical modes. This property may be most readily exploited to enable polarization-selective mode-interference-coupled transverse-transfer between the transmission optical waveguide and the external-transfer optical waveguide. Such polarization-selective transverse-transfer may be desirable in a variety of circumstances, including polarization-dependent beam combining for delivering pump laser power to doped-fiber gain media, among other examples. A variety of polarization-dependent apparatus and methods for optical power transverse-transfer are disclosed in earlier-cited application A4, along with various circumstances in which polarization-dependent transverse-transfer may be employed to advantage.

It should be noted that, in addition to being used as an external-transfer optical waveguide according to the present invention, MLR waveguides may also be used as all or part of an optical device such as a modulator, filter, N×N switch, multiplexer/demultiplexer, and so on. Optical devices thus implemented may be provided with one or more external-transfer optical waveguides according to the present invention, and these external-transfer optical waveguides may include any of the external-transfer optical waveguide types disclosed herein, including MLR waveguides. The external-transfer optical waveguides may be actively or passively modal-index-matched for mode-interference-coupled transverse-transfer to/from the transmission optical waveguide, and may or may not exhibit wavelength- and/or polarization-dependent transverse-coupling to the transmission waveguide. Alternatively, external-transfer optical waveguides may be implemented for adiabatic transverse-transfer according to the present invention. It should be noted that for optical devices according to the present invention employing a MLR waveguide for both the device portion as well as the external-transfer optical waveguide, each may comprise substantially the same type of MLR structure, or each may comprise a distinct type of MLR structure.

Examples of MLR-based optical devices with an optically integrated external-transfer optical waveguide according to the present invention are shown in FIGS. 26A/26B and 27A/27B, each of which illustrate a single port device based on a MLR waveguide and incorporating an external-transfer optical waveguide according to the present invention. In FIGS. 26A and 26B, MLR device 2610 is end-coupled to external-transfer optical waveguide 2630 (both fabricated on substrate 2602), which is in turn adapted for transverse-transfer to/from transmission optical waveguide 2620, in these examples a fiber-optic taper segment. In the example of FIG. 26A, external-transfer optical waveguide 2630 is shown surface-joined to the fiber-optic taper segment and adapted for mode-interference-coupled transverse-transfer with active modal-index-matching provided by contacts 2632/2634. In the example of FIG. 26B, external-transfer optical waveguide 2630 is shown side-joined to the fiber-optic taper segment and adapted for mode-interference-coupled transverse-transfer with passive modal-index-matching. Contacts 2612/2614 provide electronic access to device 2610 (examples: to provide drive current for a laser; to provide bias voltage and/or signal output for a detector; to provide a drive signal for a modulator; and so on). External-transfer optical waveguide 2630 may serve to transfer optical signal power between MLR device 2610 and transmission optical waveguide 2620 in either or both directions as needed.

Figure 27A:
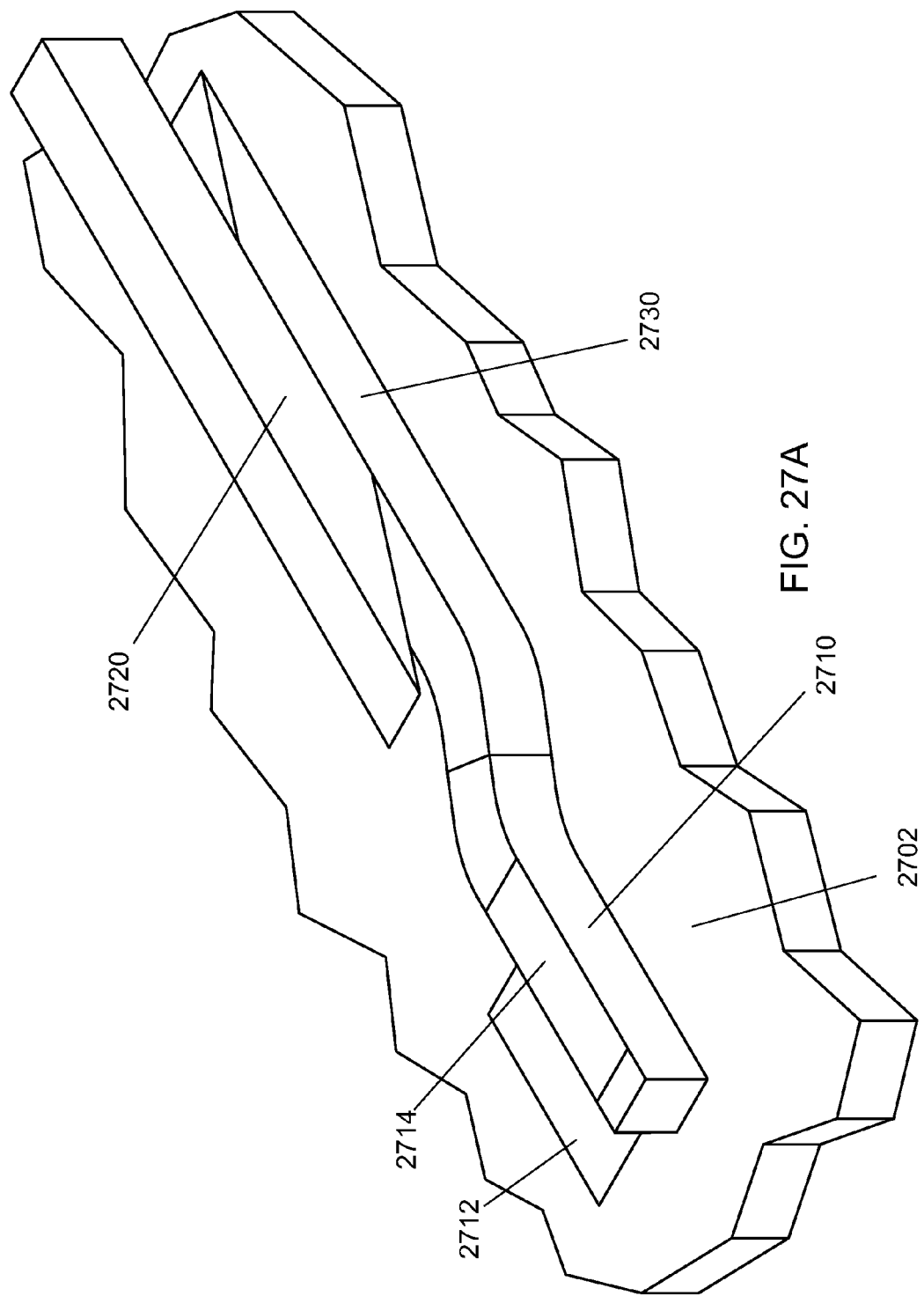
FIGS. 27A and 27B are isometric views of exemplary optical devices including integrated external-transfer optical waveguides according to the present invention.
Figure 27B:
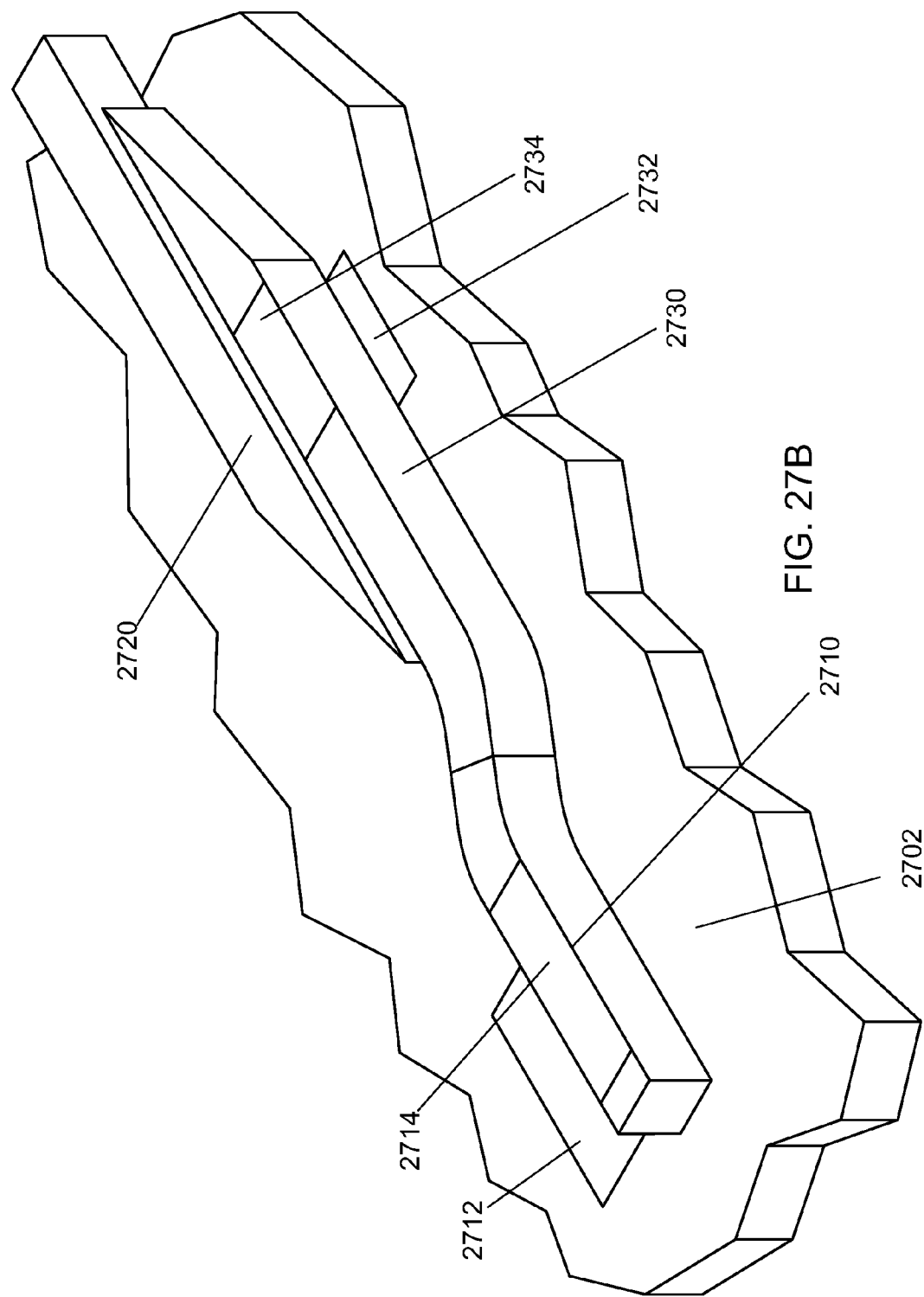

In FIGS. 27A and 27B, MLR device 2710 is end-coupled to external-transfer optical waveguide 2730 (both fabricated on substrate 2702), which is in turn adapted for transverse-transfer to/from transmission optical waveguide 2720, in these examples a planar waveguide (waveguide substrate omitted from the Figures for clarity). In the example of FIG. 27A, external-transfer optical waveguide 2730 is shown surface-joined to the planar waveguide and adapted for adiabatic transverse-transfer therebetween. In the example of FIG. 27B, external-transfer optical waveguide 2730 is shown side-joined to the planar waveguide and adapted for adiabatic transverse-transfer with active control of the adiabatic condition provided by contacts 2732/2734. Contacts 2712/2714 provide electronic access to device 2710

Figure 28A:
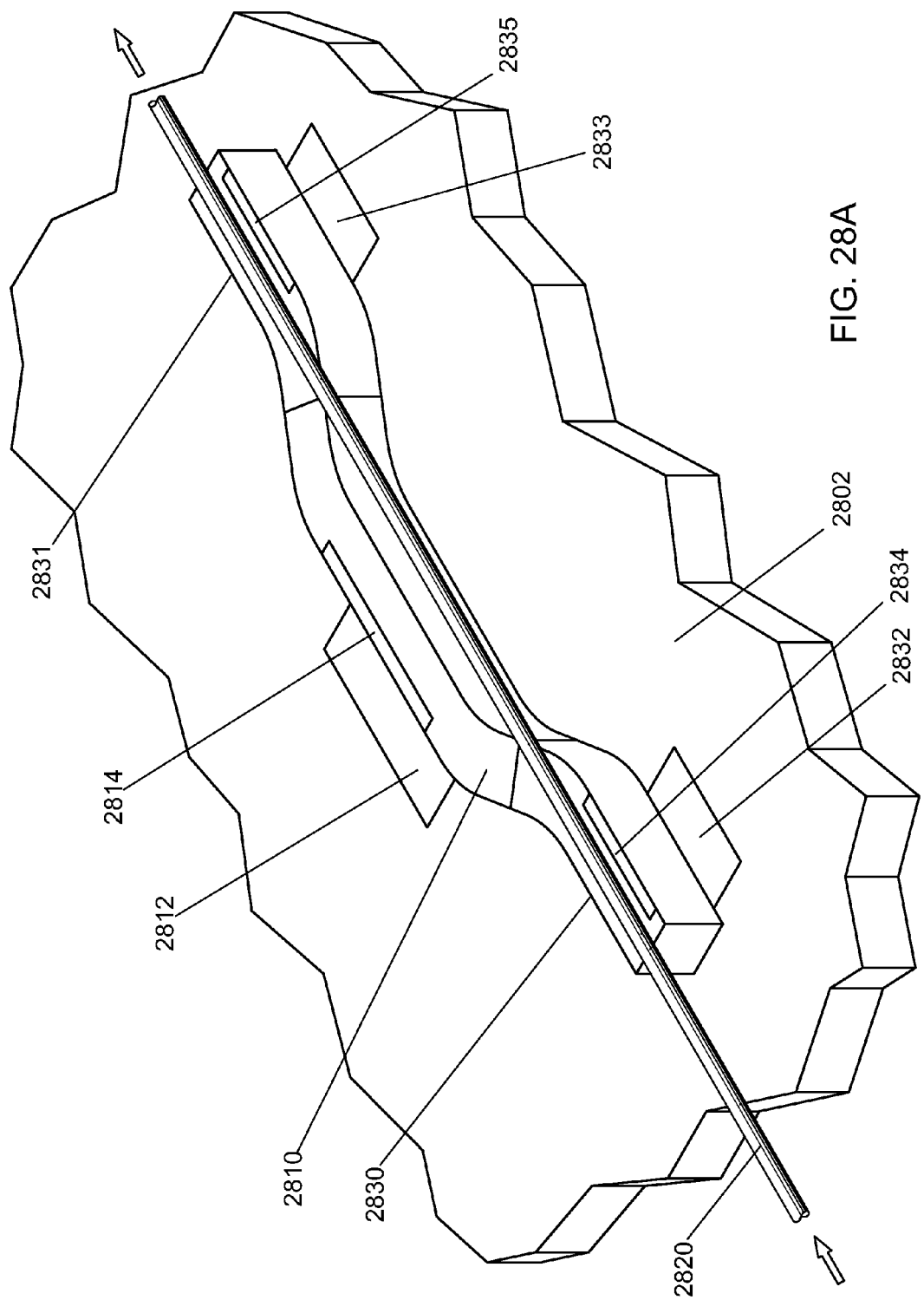
FIGS. 28A and 28B are isometric views of exemplary optical devices including integrated external-transfer optical waveguides according to the present invention.

Many other device combinations and/or configuration may be implemented while remaining within the scope of inventive concepts disclosed herein, and examples are shown in FIGS. 28A/B and subsequent Figures. The device configurations shown are exemplary and do not represent an exhaustive set of device configurations that may be implemented according to the present invention. These devices may include any suitable device type or construction (including MLR-based devices) and may employ any suitable external-transfer optical waveguide type. These devices with external-transfer waveguides may be adapted for forming optical junctions with any suitable transmission optical waveguide types, including but not limited to fiber-optic taper segments and planar waveguides. Optical power transfer between external-transfer optical waveguides and transmission optical waveguides may employ mode-interference-coupled and/or adiabatic transverse-transfer, as desired for a particular situation. An optical device with one or more optically integrated external-transfer optical waveguides may be advantageously implemented in a flip-chip geometry (as in FIGS. 15A/15B), particularly when intended to be used with planar transmission optical waveguides.

Figure 28B:
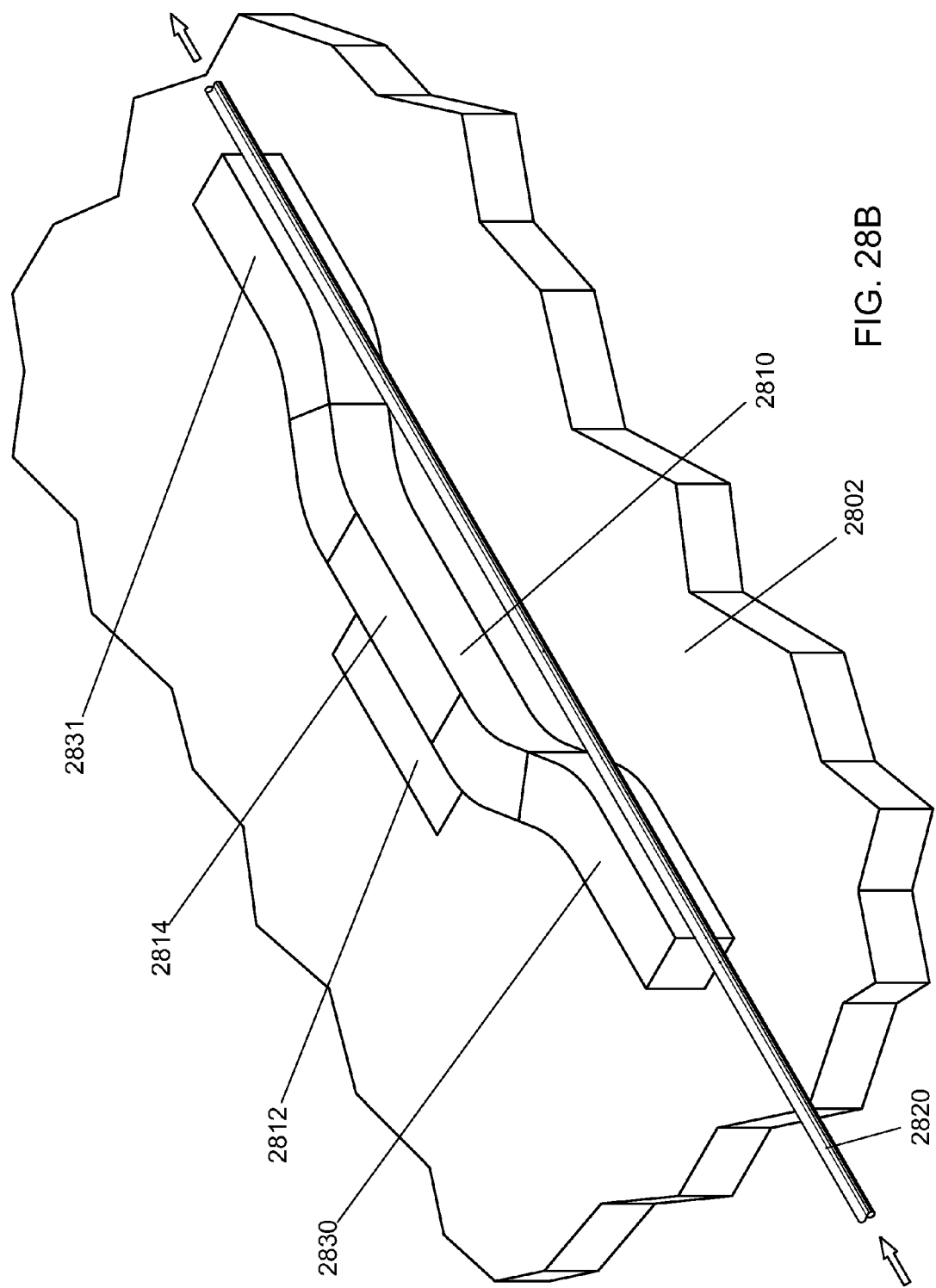

FIGS. 28A and 28B show an exemplary two-port optical device 2810 optically integrated with external-transfer optical waveguides 2830/2831 on substrate 2802 according to the present invention. The transmission optical waveguide 2820 in these examples is a fiber-optic taper segment. Electrodes or contacts 2812/2814 provide electronic access to device 2810. In the example of FIG. 28A, optical power transverse-transfer between external-transfer optical waveguides 2830/2831 and surface-joined transmission optical waveguide 2820 is active modal-index-matched mode-interference-coupled, with contacts 2832/2833/2834/2835 provided for modal-index-matching. In the example of FIG. 28B, optical power transverse-transfer between external-transfer optical waveguides 2830/2831 and side-joined transmission optical waveguide 2820 is passive modal-index-matched mode-interference-coupled. The devices of FIGS. 28A/28B may be operated with substantially complete transfer of optical power from the transmission waveguide 2820 to the device through one of the external-transfer waveguides 2830/2831 and back to the transmission waveguide through the other external-transfer waveguide after manipulation by device 2810. Alternatively, device 2810 and the segment of transmission waveguide 2820 between the two external-transfer waveguides may function as the two arms of a Mach-Zender interferometer. Device 2810 may function as a phase modulator for one arm of the interferometer thus formed, thereby enabling modulation of transmission of optical power though transmission waveguide 2820 past external-transfer waveguides 2830/2831.

Figure 29A:
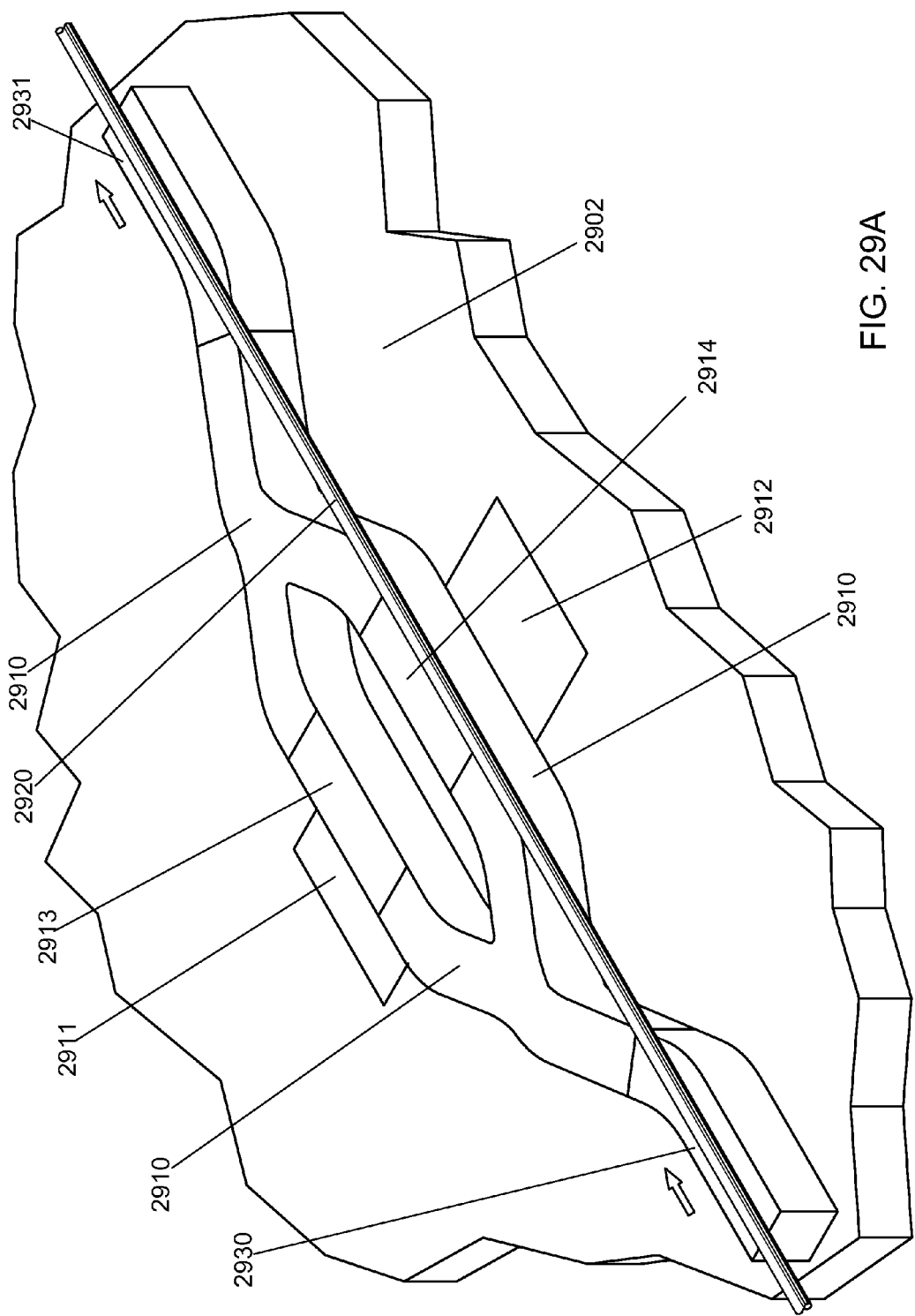
FIGS. 29A, 29B, 29C, and 29D are isometric views of exemplary optical devices including integrated external-transfer optical waveguides according to the present invention.
Figure 29B:
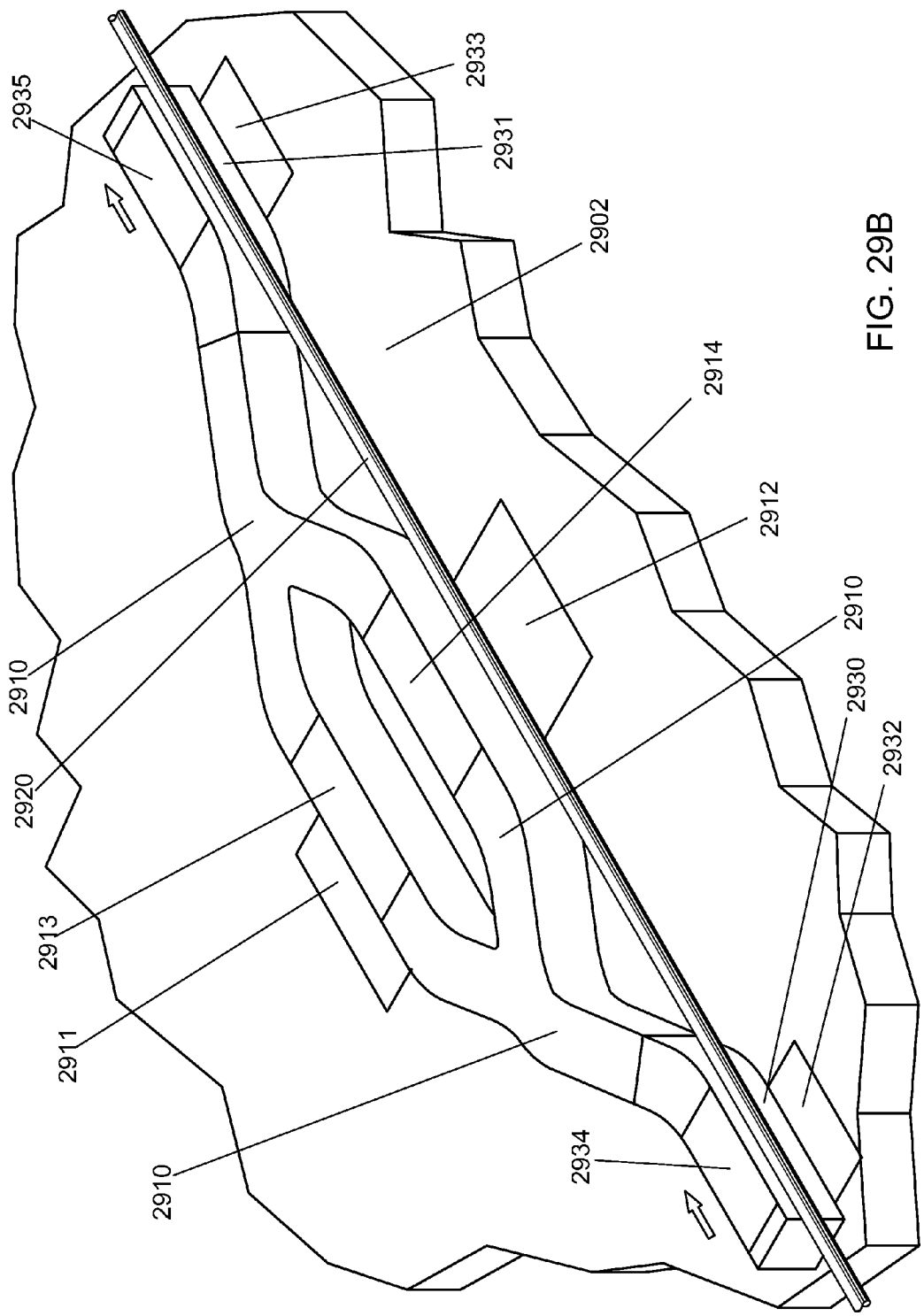
Figure 29C:
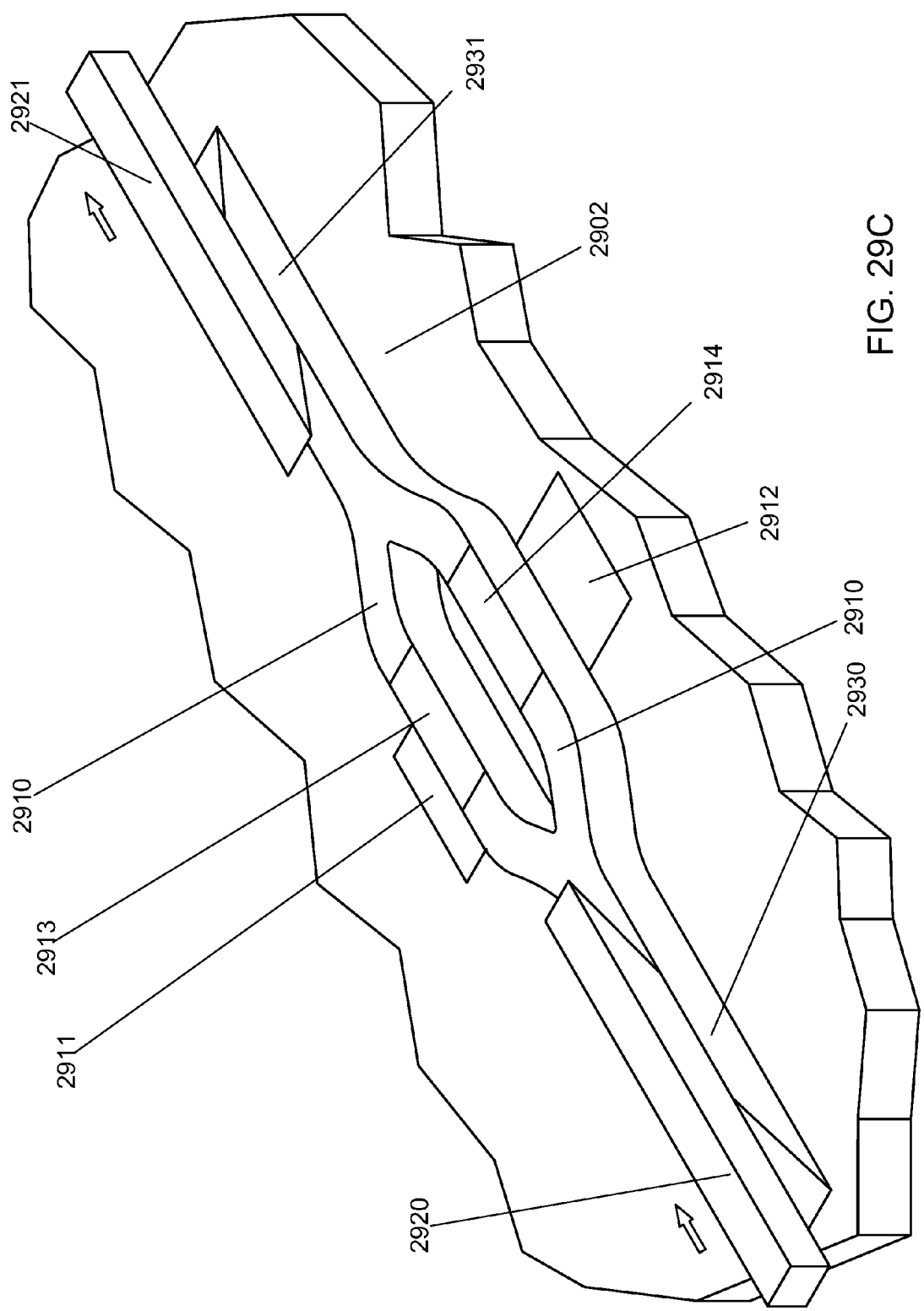
Figure 29D:
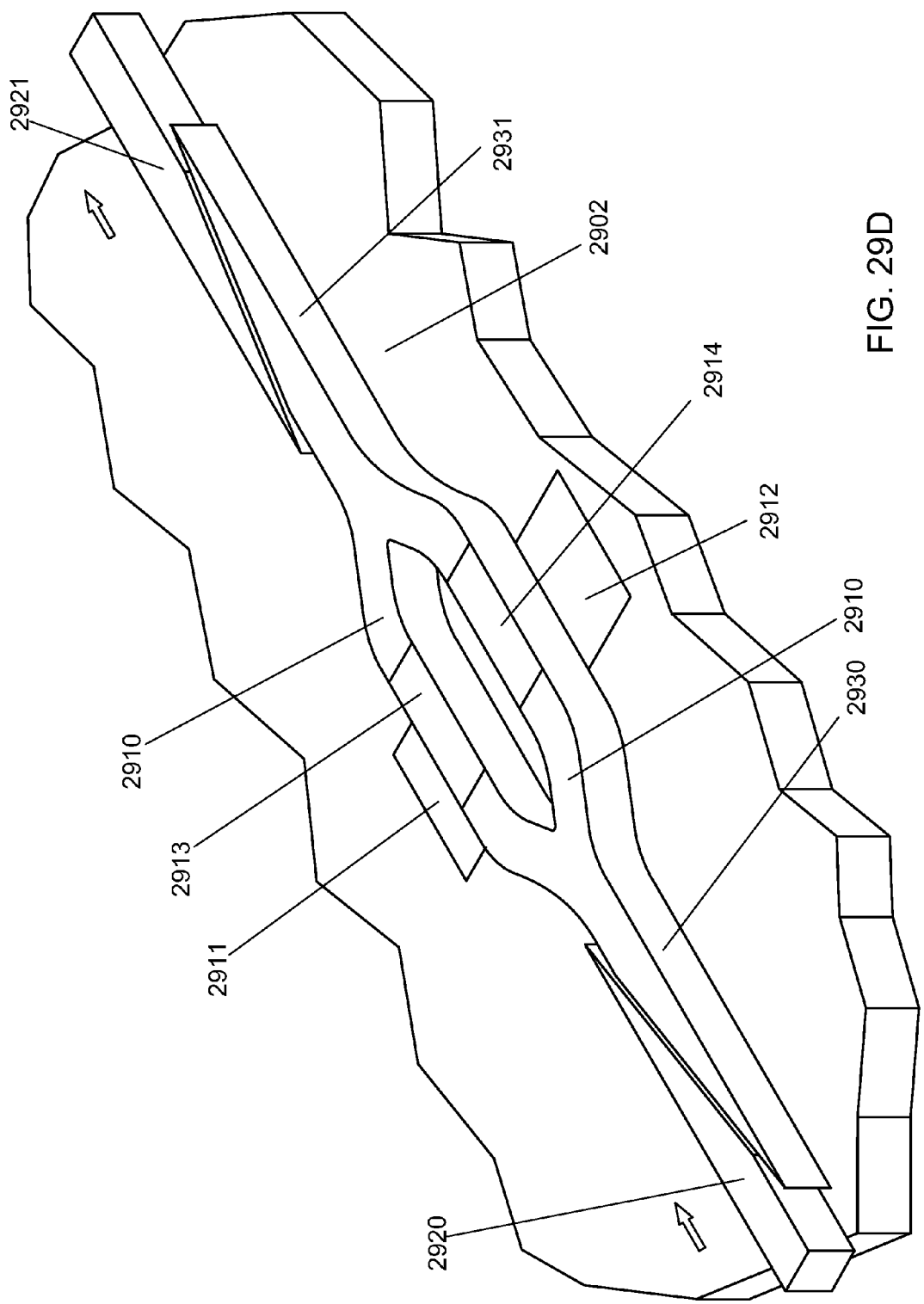

FIGS. 29A through 29D show Mach-Zender interferometer modulators 2910 fabricated on substrate 2902 along with external-transfer optical waveguides 2930/2931. Optical power may be substantially completely transferred from transmission waveguide 2920 into external-transfer waveguide 2930 and into Mach-Zender interferometer 2910. Contacts or electrodes 2911/2912/2913/2914 are employed to control transmission through interferometer 2910, and optical power transmitted therethrough is transferred into transmission waveguide 2920 through external-transfer waveguide 2931. Mach-Zender interferometer 2910 may be constructed using waveguides of any suitable type (including multi-layer waveguides) incorporating electro-active materials of any suitable type. Instead of electrodes and electro-active materials, nonlinear optical materials may be employed in Mach-Zender interferometer 2910 and optical control signals used to control transmission therethrough. FIG. 29A shows transmission waveguide 2920 as a fiber-optic taper segment surface-joined to external-transfer waveguides 2930/2931 and employing passive modal-indexmatched mode-interference-coupled transverse-transfer. FIG. 29B shows transmission waveguide 2920 as a fiber-optic taper segment side-joined to external-transfer waveguides 2930/2931 and employing active modal-index-matched mode-interference-coupled transverse-transfer controlled by electrodes 2932/2933/2934/2935. FIG. 29C shows transmission waveguides 2920/2921 as planar waveguides (waveguide substrate omitted from FIG. 29C for clarity) surface-joined to external-transfer waveguides 2930/2931 and employing adiabatic transverse-transfer. FIG. 29D shows transmission waveguides 2920/2921 as planar waveguides (waveguide substrate omitted from FIG. 29D for clarity) side-joined to external-transfer waveguides 2930/2931 and employing adiabatic transverse-transfer.

Figure 30:
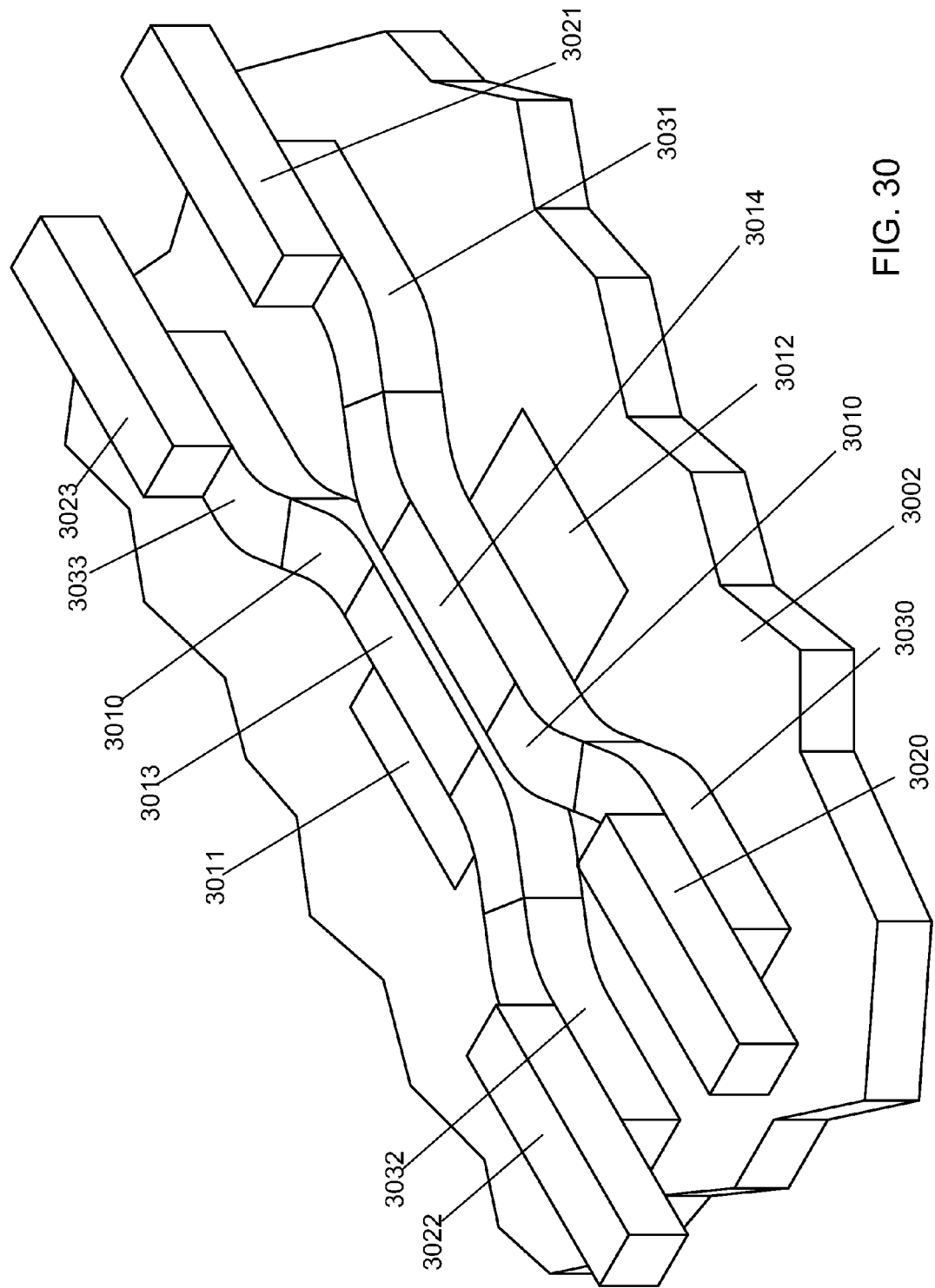
FIG. 30 is an isometric view of an exemplary optical device including integrated external-transfer optical waveguides according to the present invention.

FIG. 30 illustrates a 2×2 optical switch 3010 fabricated on substrate 3002 along with external-transfer waveguides 3030/3031/3032/3033. Corresponding transmission waveguides 3020/3021/3022/3023 are shown surface-joined to the external-transfer waveguides, and are shown as planar optical waveguides (waveguide substrate omitted from FIG. 30 for clarity). Other transmission waveguide types (including fiber-optic taper segments) may be equivalently employed, and side-joining may be equivalently employed. Transverse-transfer of optical power between each transmission waveguide and the corresponding external-transfer waveguide may be adiabatic, active-modal-index-matched mode-interference-coupled, or passive-modal-index-matched mode-interference-coupled. The nature of the transverse-transfer need not be the same for all transmission waveguide/external-transfer waveguide pairs. Control signals applied to electrodes or contacts 3011/3012/3013/3014 control optical transmission through the 2×2 switch 3010, which may be constructed using waveguides of any suitable type (including multi-layer waveguides) incorporating electro-active materials of any suitable type. Instead of electrodes and electro-active materials, nonlinear optical materials may be employed in 2×2 switch 3010 and optical control signals used to control transmission therethrough.

Figure 31:
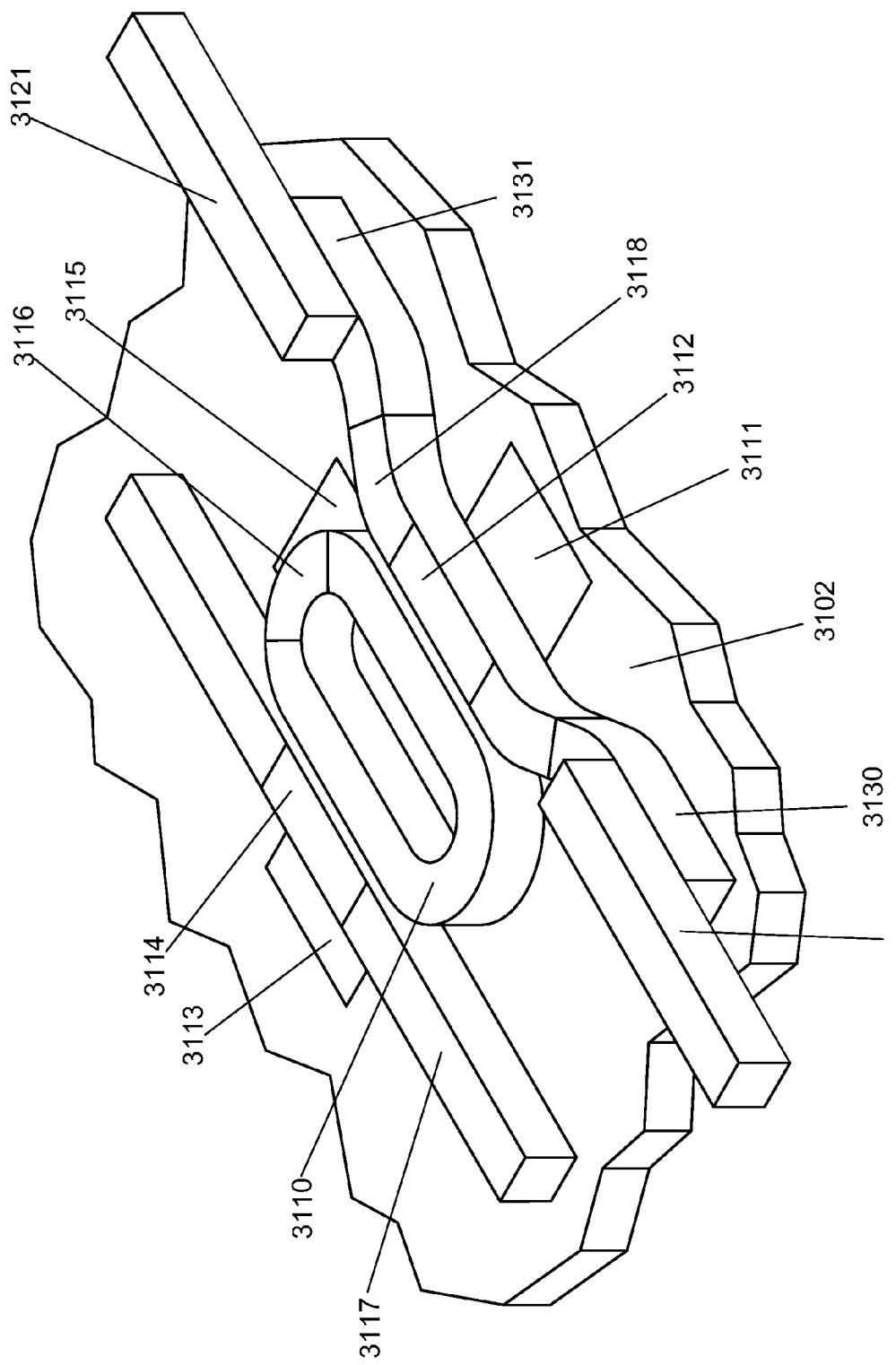
FIG. 31 is an isometric view of an exemplary optical device including integrated external-transfer optical waveguides according to the present invention.

FIG. 31 illustrates a resonant optical modulator including resonator 3110, optical loss element 3117, and waveguide 3118 all fabricated on substrate 3102 along with external-transfer waveguides 3130/3131. Corresponding transmission waveguides 3120/3121 are shown surface-joined to the external-transfer waveguides, and are shown as planar optical waveguides (waveguide substrate omitted from FIG. 31 for clarity). Other transmission waveguide types (including fiber-optic taper segments) may be equivalently employed, and side-joining may be equivalently employed. Transverse-transfer of optical power between each transmission waveguide and the corresponding external-transfer waveguide may be adiabatic, active-modal-index-matched mode-interference-coupled, or passive-modal-index-matched mode-interference-coupled. The nature of the transverse-transfer need not be the same for both transmission waveguide/external-transfer waveguide pairs. Control signals applied to electrodes or contacts 3111/3112 (waveguide/resonator coupling), 3113/3114 (resonator loss), and 3115/3116 (resonator frequency) control optical transmission through the resonant modulator, which may be constructed using waveguides of any suitable type (including multi-layer waveguides) incorporating electro-active materials of any suitable type. Instead of electrodes and electro-active materials, nonlinear optical materials may be employed in the resonant modulator and optical control signals used to control transmission therethrough. The device of FIG. 31 may be employed to modulate only a specific band of wavelengths transmitted through transmission waveguides 3120/3121 and waveguide 3118.

Figure 32:
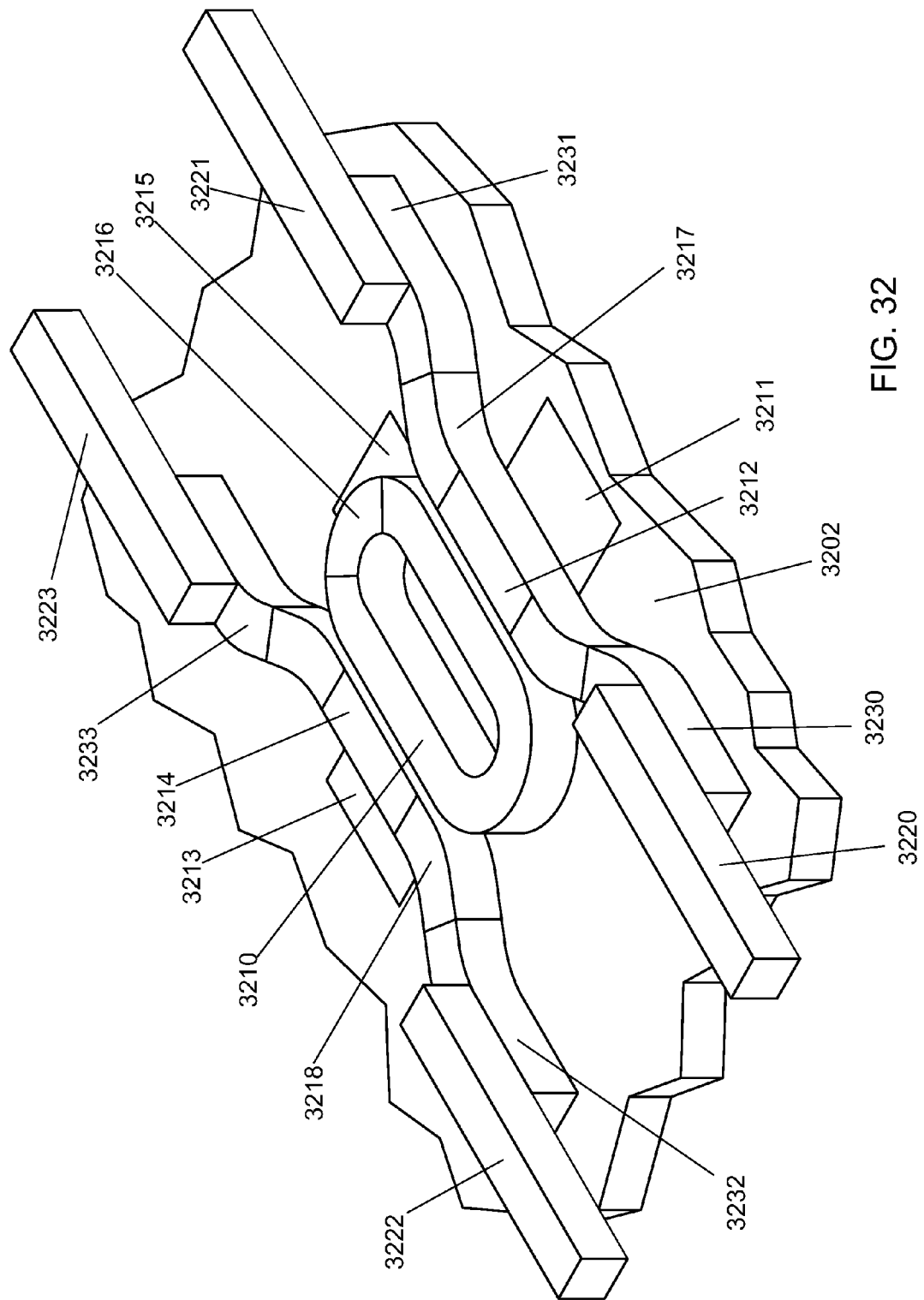
FIG. 32 is an isometric view of an exemplary optical device including integrated external-transfer optical waveguides according to the present invention.

FIG. 32 illustrates a resonant optical filter including resonator 3210 and waveguides 3217/3218 all fabricated on substrate 3202 along with external-transfer waveguides 3230/3231/3232/3233. Corresponding transmission waveguides 3220/3221/3222/3223 are shown surface-joined to the external-transfer waveguides, and are shown as planar optical waveguides (waveguide substrate omitted from FIG. 32 for clarity). Other transmission waveguide types (including fiber-optic taper segments) may be equivalently employed, and side-joining may be equivalently employed. Transverse-transfer of optical power between each transmission waveguide and the corresponding external-transfer waveguide may be adiabatic, active-modal-index-matched mode-interference-coupled, or passive-modal-index-matched mode-interference-coupled. The nature of the transverse-transfer need not be the same for both transmission waveguide/external-transfer waveguide pairs. Control signals applied to electrodes or contacts 3111/3112 (waveguide/resonator coupling), 3113/3114 (waveguide/resonator coupling), and 3115/3116 (resonator frequency) control optical power transmission through the resonant filter, which may be constructed using waveguides of any suitable type (including multi-layer waveguides) incorporating electro-active materials of any suitable type. Instead of electrodes and electro-active materials, nonlinear optical materials may be employed in the resonant modulator and optical control signals used to control transmission therethrough. The device of FIG. 32 may be employed to switch only a specific band of wavelengths between transmission waveguides 3217/3218.

Figure 33A:
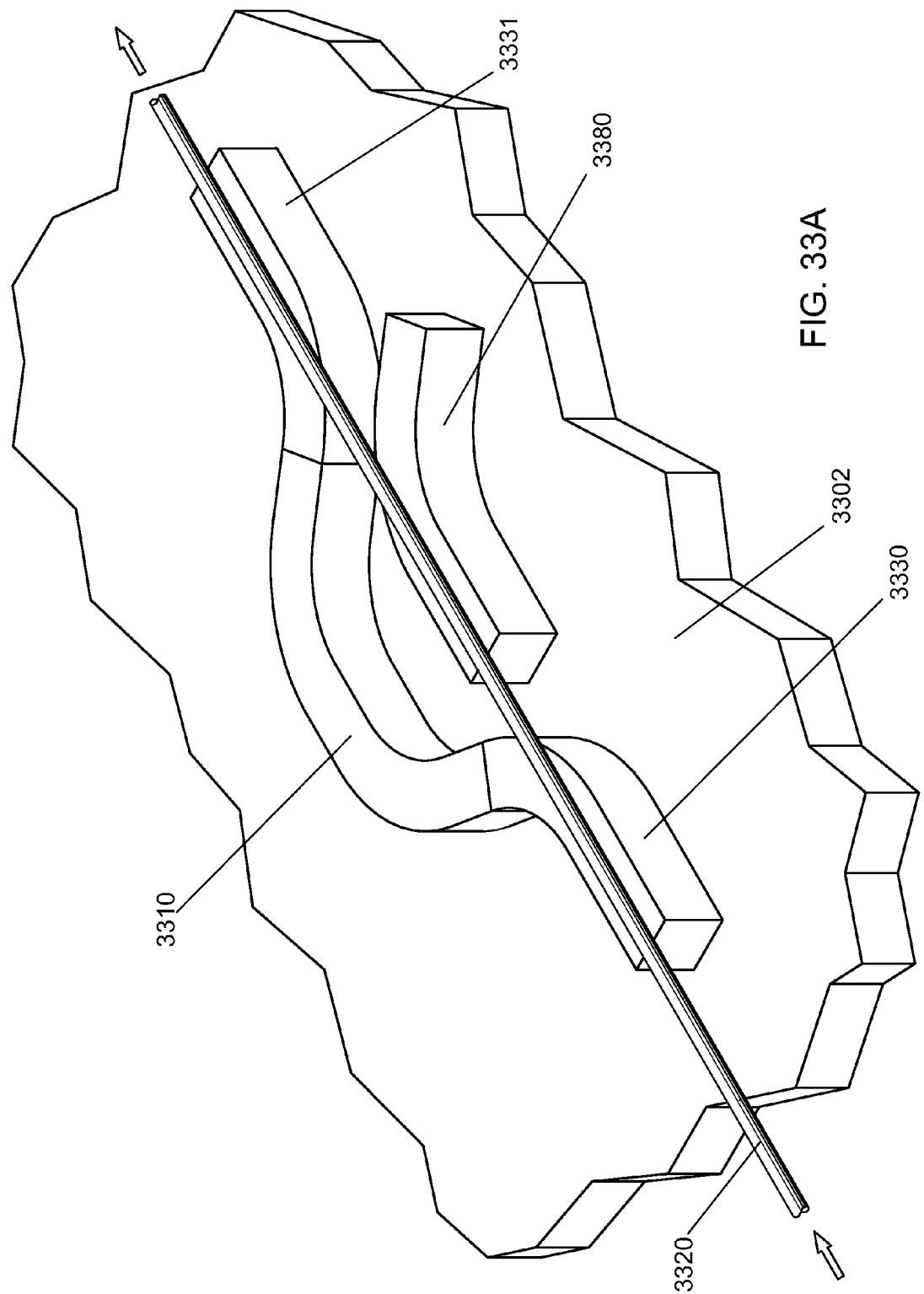
FIGS. 33A and 33B are isometric views of exemplary optical devices including integrated external-transfer optical waveguides according to the present invention.
Figure 33B:
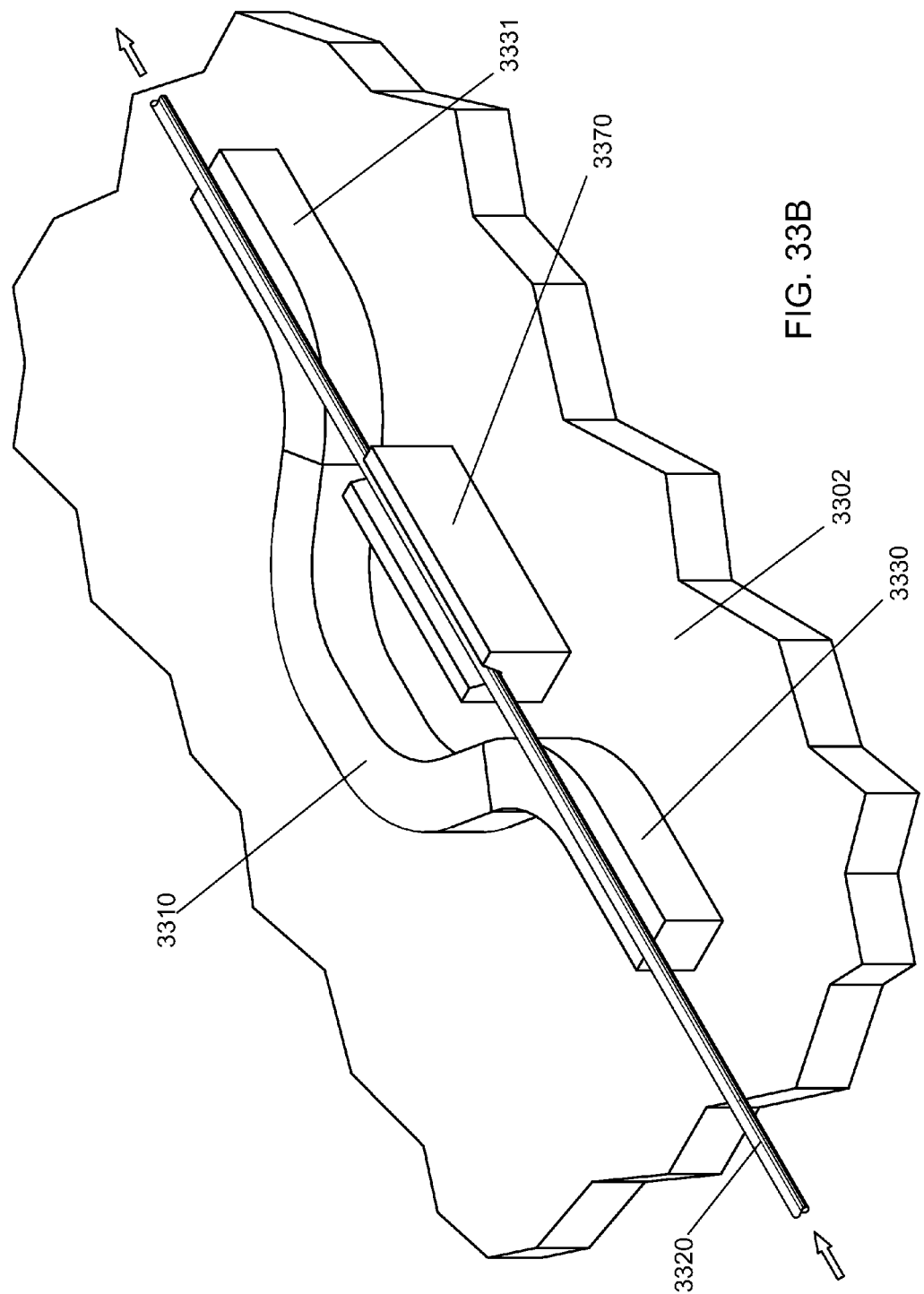

In the examples of FIGS. 28A/28B and 29A/29B, the transmission optical waveguide is shown as a single waveguide adapted and positioned for transverse-transfer to both external-transfer optical waveguides. In any device configuration wherein complete transfer of optical power from the transmission waveguide is desired for subsequent manipulation by the optical device and transfer back into the same transmission waveguide, it may be desirable to provide an optical loss mechanism on the intermediate portion of the single transmission waveguide. Such a loss mechanism may take the form of an additional optical waveguide positioned between the external-transfer waveguides and adapted for transverse-transfer, an absorbing or scattering coating, an absorbing or scattering transverse-coupled optical element, an absorbing or scattering structural element, a Bragg grating, doping, or other optical loss mechanism. In this way the two ends of the transmission waveguide would be de-coupled optically, while being mechanically coupled for facilitating device fabrication and/or assembly. FIG. 33A shows an example of a two-port device 3310 fabricated on a substrate 3302 with external-transfer optical waveguides 3330/3331 with transmission waveguide 3320 positioned and adapted for transverse-transfer with the external-transfer waveguides. An additional optical waveguide 3380 provides optical loss by transverse-transfer from transmission waveguide 3320 between the external-transfer waveguides. FIG. 33B shows similar example in which a structural transmission-waveguide-alignment member 3370 also provides optical loss between the external-transfer waveguides.

Most examples disclosed to this point have employed planar optical waveguides or fiber-optic taper segments as transmission waveguides. Side-etched fiber-optic segments as disclosed in earlier-cited application A6 may also be employed in conjunction with a suitably arranged segment of an external-transfer waveguide for transverse-transfer. Similarly, any optical waveguide that may be suitably configured for transverse-transfer adiabatic or mode-interference-coupled) may be employed for implementing the present invention.

Planar waveguides and planar waveguide circuits comprise an important class of transmission optical waveguides used to implement the present invention. A planar waveguide may often comprise a low-index core/cladding-type dielectric waveguide fabricated on a substantially planar substrate, often silica or silica-based waveguides fabricated on an oxide-coated silicon substrate. Silicon is a desirable waveguide substrate material for a variety of reasons, including but not limited to: relatively easy and well-understood material processing techniques; mature industry standards; ability to exploit economies of scale through large wafer sizes, highly planar single crystal faces obtainable; amenable to selective dry- and/or wet-etching; highly rigid; desirable thermal characteristics. The silicon substrate is often provided with a silica over-layer, with one or more planar waveguides on the silica over-layer. Silica and silica-based materials are nearly ideal and well-understood optical materials. Alternatively, planar waveguides may instead comprise one or more high-index waveguides (semiconductor waveguides, for example) formed on a quartz, silica, or other low-index or insulating substrate (or over-layer on a semiconductor substrate). Such high-index waveguides may offer the advantage of more readily achieved transverse-transfer to other high-index optical components. Silica-based planar waveguides have previously been used in end-coupled configurations with optical devices and/or optical fibers, but typically exhibit high insertion losses due to poor spatial-mode-matching, particularly with semiconductor-based optical devices. External-transfer waveguides implemented according to the present invention may offer significant reduction in insertion losses for such optical devices by enabling transverse-transfer to/from the planar waveguide. An example has already been shown in FIGS. 13A/13B, 14A/14B, and 15A/15B adapted for adiabatic transverse-transfer between planar transmission waveguides and external-transfer waveguides optically integrated with a two-port optical device.

Figure 34A:
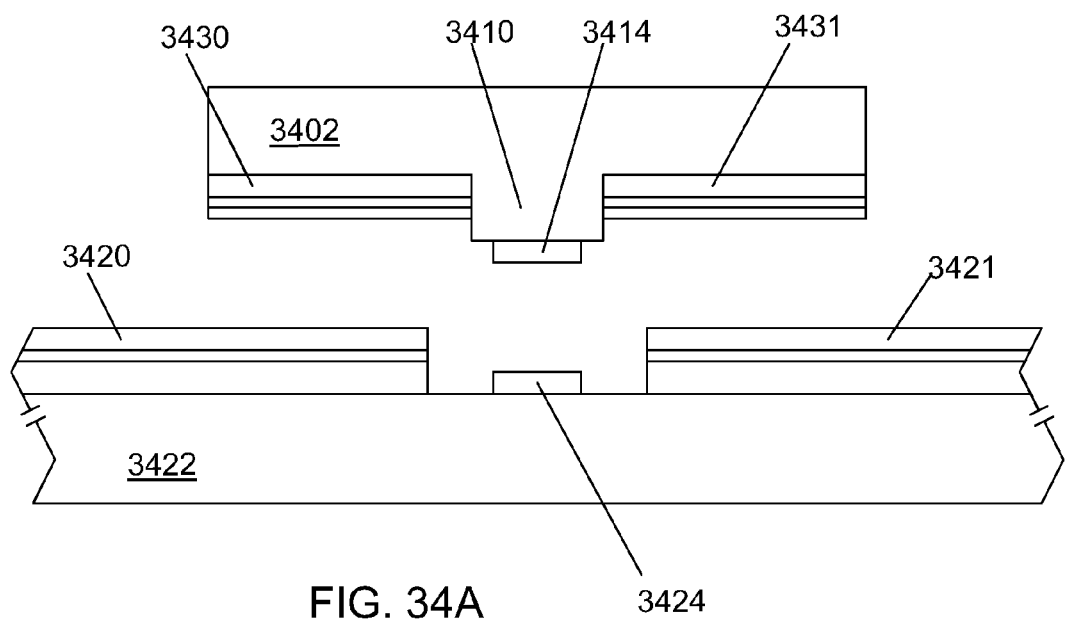
FIGS. 34A and 34B are side views of an optical device including integrated external-transfer optical waveguides according to the present invention.
Figure 34B:
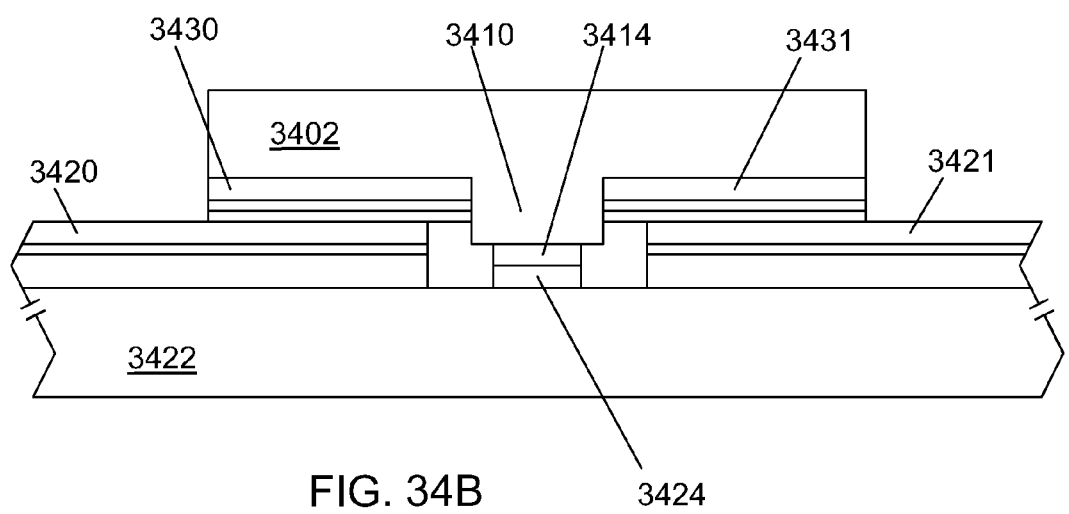

Another example is shown in FIGS. 34A and 34B including a two-port optical devices 3410 (an electro-absorption modulator, for example) with optically integrated input and output external-transfer waveguides 3430/3431. The external-transfer waveguides may be of any type suitable for spatial-mode-matched end-coupling to an optical mode defined by the optical device and for transverse-transfer to the planar transmission waveguides 3420/3421. The transverse-transfer may be: adiabatic, active-modal-index-matched mode-interference-coupled, or passive-modal-index-matched mode-interference-coupled. As with fiber-optic-taper-based transmission waveguides, the degree of alignment precision required for achieving efficient transverse-transfer between the planar transmission waveguides and the external-transfer waveguides may be as much as an order-of-magnitude less than the precision required for end-transfer between spatial-mode-matched planar transmission waveguide and optical device, thereby enabling passive alignment techniques for positioning the optical device relative to the planar transmission waveguide. In the exemplary embodiment of FIGS. 34A/34B, optical device 3410 and external-transfer waveguides 3430/3431 are fabricated on a common substrate 3402. Planar transmission waveguides 3430/3421 are fabricated on substrate 3422. The two components are assembled in a so-called "flip-chip" geometry in order to establish transverse-transfer between external-transfer waveguides 3430/3431 and planar transmission waveguides 3420/3421, and electronic coupling between electrode 3414 and contact 3424. An optical signal to be manipulated may be received from an optical system through a planar transmission waveguide 3420, transferred by transverse-transfer into external-transfer waveguide 3430, transferred by end-transfer into device 3410, manipulated as it propagates through the device 3410, transferred by end-transfer into the other external-transfer waveguide 3431, transferred by transverse-transfer into the other planar transmission waveguide 3421, and transmitted to the optical system. High efficiency for each transfer of optical power yields a device having low insertion loss. This type of planar waveguide implementation may be applied with any suitable optical device.

Planar waveguide implementations of the present invention offer the possibility of high levels of integration of multiple optical components to form hybrid or composite optical devices. Multiple planar transmission waveguides forming an optical network of any desired topology may be fabricated on a substrate with a gap at each point where an optical component might be located. The transmission planar waveguides may be adapted near each potential device location for optical power transverse-transfer (adiabatic and/or mode-interference-coupled; both types may be mixed on a single planar waveguide substrate). Each optical component may be an optical device with one or more optically integrated external-transfer waveguides according to the present invention, each positioned relative to the component device for efficient end- or transverse-transfer to/from the optical device. Each external-transfer waveguide may be positioned and adapted so as to enable transverse-transfer to/from a corresponding planar transmission waveguide when the component is positioned on the planar waveguide substrate. A so-called "flip chip" geometry may be employed to establish transverse-transfer between each external-transfer waveguide and its corresponding planar waveguide(s) on the substrate. Mating alignment structures may be provided on the component and/or on the planar waveguide substrate for establishing suitably precise relative positioning of the external-transfer waveguides and the respective planar transmission waveguides.

Figure 35A:
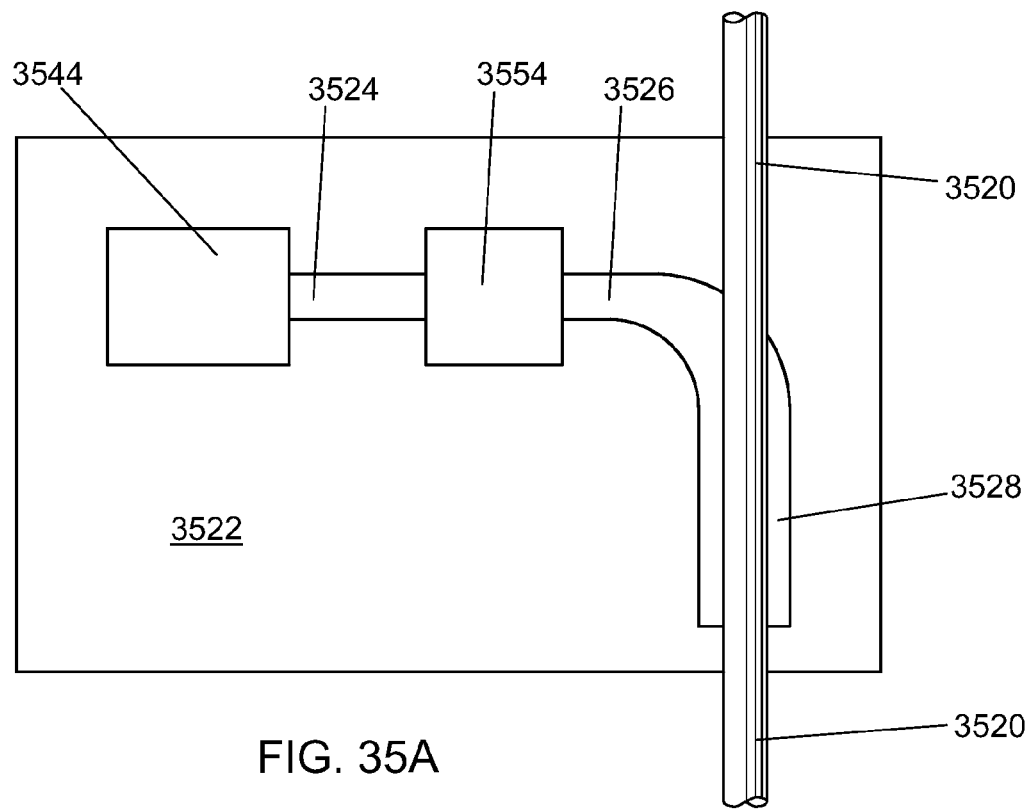
FIGS. 35A and 35B are top views of exemplary optical devices including integrated external-transfer optical waveguide according to the present invention.
Figure 37A:
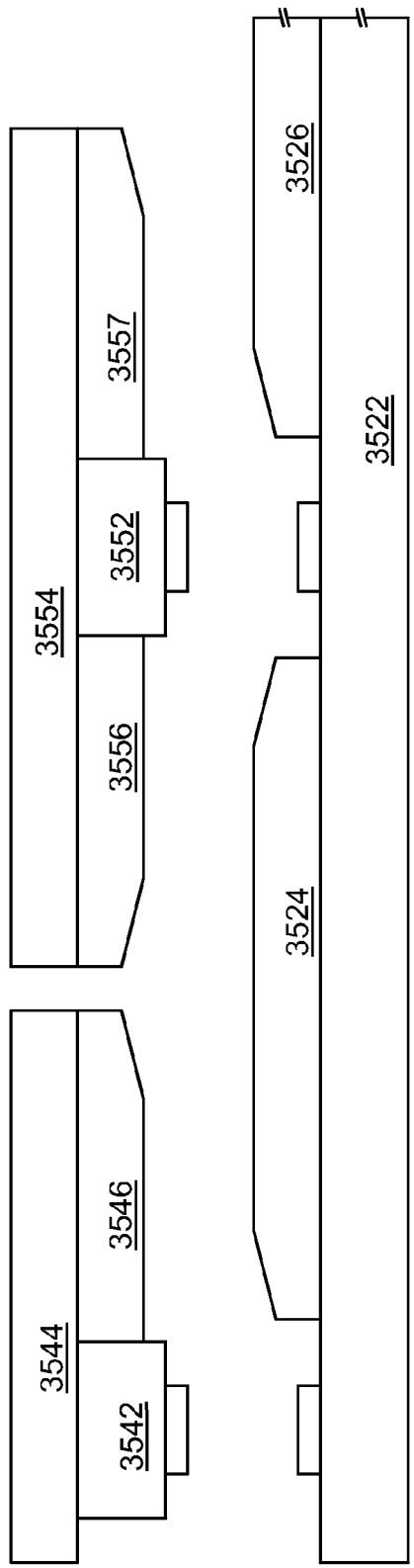
FIGS. 37A and 37B are side views of an optical device including integrated external-transfer optical waveguides according to the present invention.
Figure 37B:
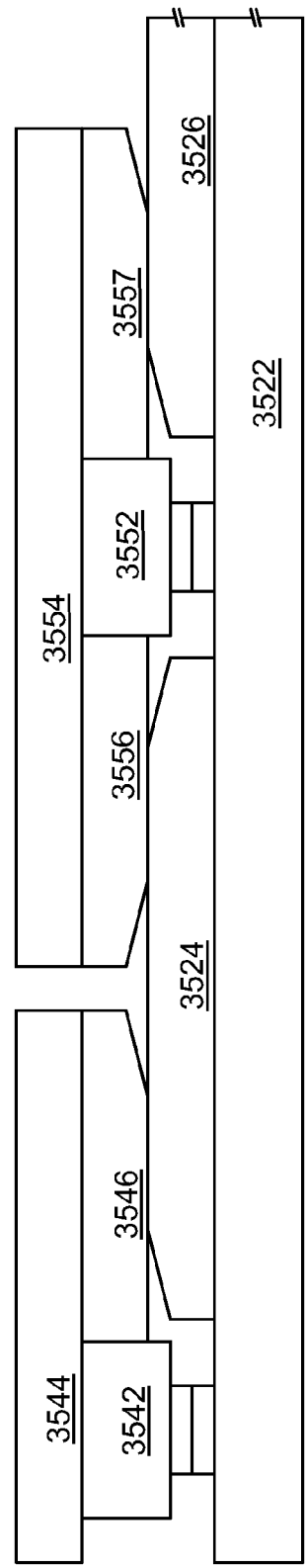

Examples of an optical device with multiple transverse-coupled sub-components are shown in FIGS. 35A/35B, 36A/36B, and 37A/37B, in which a laser/waveguide hybrid component and a modulator/waveguide hybrid component, each having one or more optically integrated external-transfer waveguides, are flip-chip mounted onto a planar waveguide substrate 3522. One planar transmission waveguide 3524 transmits optical power from the laser 3542 to the modulator 3552, while a second planar transmission waveguide 3526 may terminate in a transverse-transfer segment 3528 for transverse-transfer of modulated optical power to a fiber-optic taper 3520 (FIG. 35A). Optical power from the laser 3542 is: transferred by end-transfer into an external-transfer waveguide 3546 (optically integrated with laser 3542 on substrate 3544); transferred by transverse-transfer to the first planar transmission waveguide 3524; transferred by transverse-transfer to an input external-transfer waveguide 3556 (optically integrated with modulator 3552 on substrate 3554); transferred by end-transfer to the modulator 3552; modulated as it propagates through the modulator 3552; transferred by end-transfer to an output external-transfer waveguide 3557 (optically integrated with modulator 3552 on substrate 3554); transferred by transverse-transfer to the second planar transmission waveguide 3526; transferred by transverse-transfer to the fiber-taper-segment 3520 of the optical fiber (FIG. 35A). The transverse-transfer steps may be adiabatic (FIGS. 36A/36B) or mode-interference-coupled (active or passive; FIGS. 37A/37B), and need not be of the same type for each transverse-transfer optical junction in the assembly.

Figure 35B:
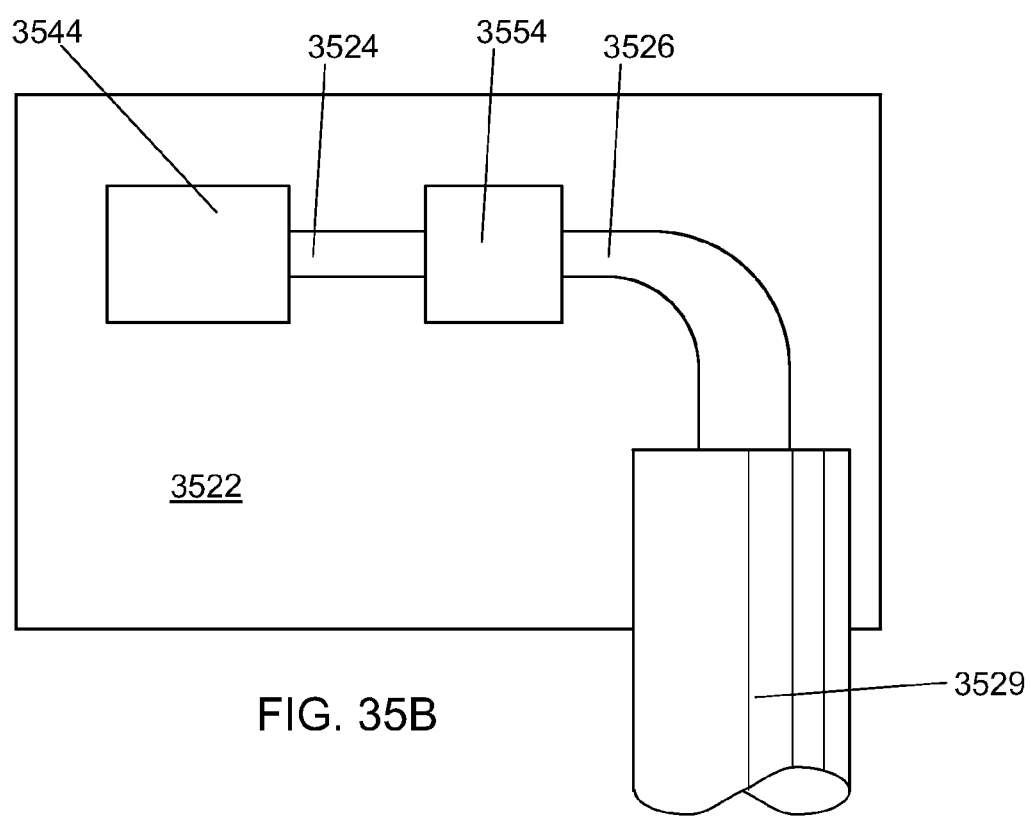

Instead of transverse-transfer to a fiber-optic taper, transmission waveguide 3526 may instead be adapted to serve as a spatial-mode expander for end-transfer to an optical fiber 3529 (FIG. 35B; see discussion below) or other large-mode optical waveguide. High overall optical power throughput (i.e., low insertion loss) may be achieved for the hybrid device. In a manner similar to that shown in FIG. 35A, the wavelength multiplexed example of FIG. 24 may be constructed using planar transmission waveguides on a substrate for optical power transmission to a fiber-optic taper, while each laser source comprises a flip-chip mounted laser having an integrated external-transfer waveguide for transverse-transfer to the planar transmission waveguides. Any optical device may be coupled to one or more planar transmission waveguides as described hereinabove using one or more external-transfer waveguides according to the present invention. While a fiber-optic taper segment 3520 is shown in FIG. 35A for transferring optical power to/from the planar waveguide substrate by transverse-transfer from/to planar transmission waveguide 3528, other methods and/or configurations may be equivalently employed. Planar transmission optical waveguide 3526 may include a spatial-mode expander segment so that the propagating optical power is end-transferred to an optical fiber 3529. The spatial-mode expansion should preferably be substantially adiabatic to minimize undesirable optical loss.

Apparatus and methods according to the present invention may be further applied to enable an optical "breadboard" approach for assembling complex optical devices. A substrate may be provided with a plurality of locations provided for flip-chip mounting of modular optical devices, each of the devices incorporating one or more external-transfer waveguides according to the present invention. These flip-chip mounting locations may be provided on the substrate in an array pattern (square, rectangular, trigonal/hexagonal, or other) and a plurality of planar transmission waveguides may be provided on the substrate connecting each flip-chip mounting location to one or more of its neighbors. Individual modular optical devices of any desired type may be provided with external-transfer waveguide(s) positioned so as to establish transverse-transfer to/from corresponding planar transmission waveguide(s) when the device is flip-chip mounted at a mounting location on the substrate. Additional flip-chip components may be provided having only an external-transfer waveguide thereon (with no additional device) for optically "bridging" an otherwise vacant flip-chip mounting location (a single external-transfer waveguide would establish transverse-transfer with two of the planar transmission waveguides). Any desired combination of these modular optical devices may then be optically coupled in virtually any combination and in virtually any topology to construct complex hybrid optical devices. The optical breadboard may be further provided with planar waveguides adapted for transverse-transfer to fiber-optic-taper segments or other waveguides, or end-transfer to an optical fiber or other waveguide, thereby enabling transfer of optical power to and/or from the breadboard device. Such a modular breadboard approach may be useful for device prototyping and/or for flexible device manufacture.

Alternatively, methods and apparatus according to the present invention may be employed for even higher degrees of optical device integration. A single planar waveguide substrate with multiple planar waveguides, multiple optical junction segments, and multiple device locations may be fabricated in any desired planar waveguide circuit topology. Multiple devices with multiple corresponding external-transfer waveguides may be fabricated on a single device substrate. The multiple devices and external-transfer optical waveguides may be positioned on the device substrate in positions corresponding to the arrangement of the device locations on the waveguide substrate. Similarly, the optical junction regions of the multiple external-transfer waveguides may be positioned to correspond to the optical junction regions of the planar waveguides. A single assembly step, assembling the waveguide substrate and the device substrate, may then serve to simultaneously establish optical junctions between the multiple planar waveguides and the multiple external-transfer waveguides to form a composite optical device of any desired degree of complexity. A majority of the precise alignment required may be accomplished during fabrication of the substrates and structures thereon using precision, highly parallel material processing techniques.

Figure 38:
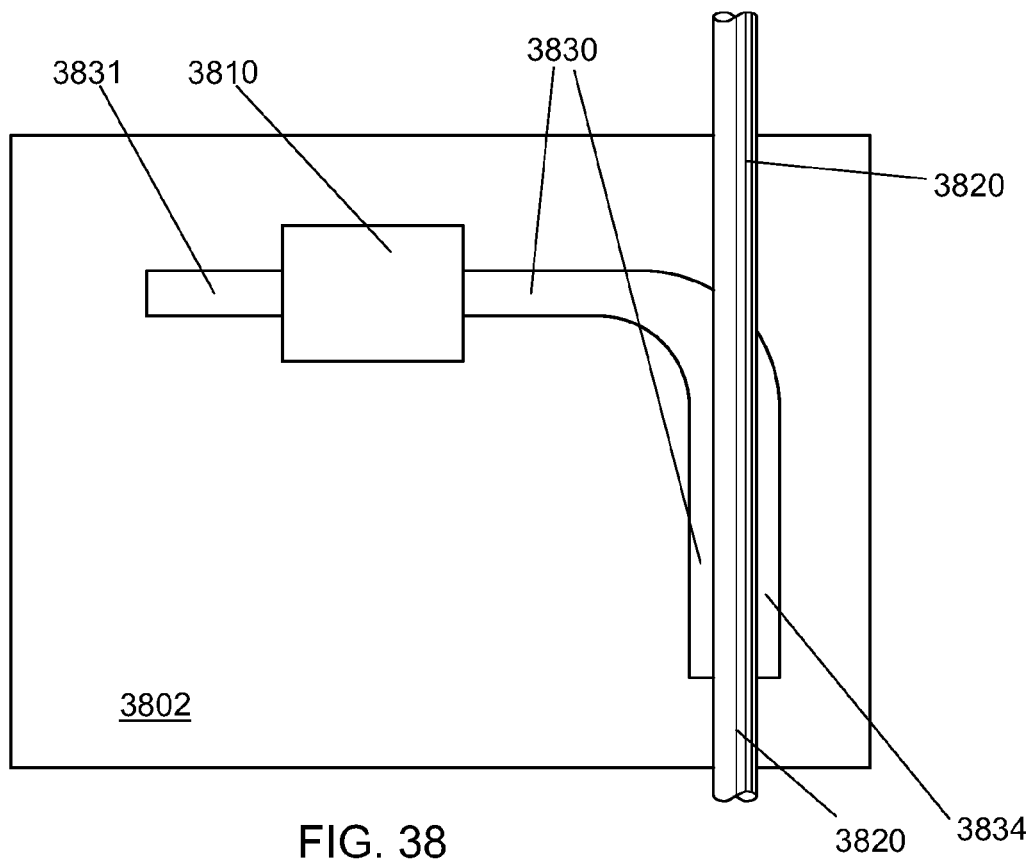
FIG. 38 is a top view of an exemplary optical device including integrated external-transfer optical waveguides according to the present invention.

Optical devices and optically integrated external-transfer waveguides may be fabricated on a common substrate for modifying and/or controlling device performance or characteristics or otherwise providing device functionality. In the example of FIG. 38, a laser 3810 is fabricated on a substrate 3802 along with optically integrated external-transfer waveguides 3830 and 3831. Waveguide 3830 may provide optical power transfer between laser 3810 and transmission waveguide 3820. Waveguide 3831 may serve to alter the optical properties and/or performance of laser 3810. For example, a grating structure in waveguide 3831 may serve to define a lasing wavelength for laser 3810. Alternatively, spatial optical modes supported by waveguide 3831 may define transverse spatial mode characteristics of the laser output. External-transfer waveguides of varying structure and characteristics may be employed according to the present invention for providing various optical device functionalities for a variety of optical devices, including but not limited to: wavelength selectivity, spatial mode selectivity, optical filtering, polarization selectivity, thermal compensation, power monitoring, reflectivity, modulation, and so on. Selectivity may refer to tuning, stabilization, and/or modulation of the relevant optical property. The external-transfer optical waveguide may include a grating structure, a thermo-optic element, or other suitable functional component. End facets of devices may be manipulated during fabrication and/or processing to alter optical characteristics of devices implemented according to the present invention. For example, the end facets may be coated for wavelength specificity, polarization specificity, and so on. A device end facet may be fabricated with a curvature so as to act as a lens, thereby altering the propagation characteristics of optical input to and/or output from the device. A canted or beveled end facet may serve to direct optical power transversely out of the external-transfer waveguide (acting as a turning mirror) for device monitoring or to reduce optical feedback.

Figure 39:
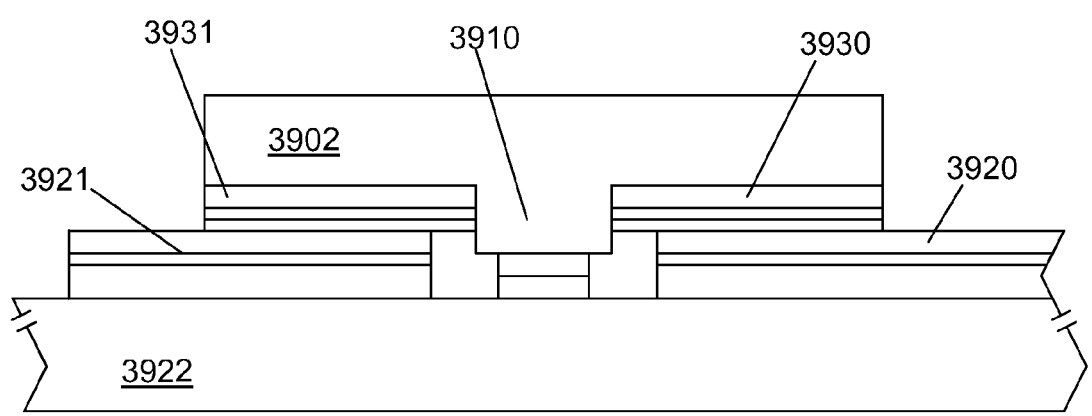
FIG. 39 is a side view of an exemplary optical device including integrated external-transfer optical waveguides according to the present invention.

An alternative embodiment is shown in FIG. 39 wherein a portion of the optical device functionality is provided in a transmission optical waveguide, and/or the optical device is not fully functional until transfer of optical power between the device and transmission waveguide is enabled (through an external-transfer optical waveguide). A planar waveguide substrate 3922 is shown with planar transmission waveguides 3920 and 3921. Laser diode 3910 is provided on substrate 3902 with integral external-transfer optical waveguides 3930 and 3931. Transverse-transfer between external-transfer waveguide 3930 and transmission waveguide 3920 provides an output optical path for the output of laser 3910. Transfer of optical power between laser 3910 and transmission waveguide 3921 (through external-transfer waveguide 3931) may enable control, modification, and/or manipulation of the output of laser 3910 by making transmission waveguide 3921 in effect part of the laser cavity. Control or manipulation of optical/spectral characteristics of transmission waveguide 3921 would have a corresponding effect on the output of laser 3910. For example, a grating structure may be provided in transmission waveguide 3921 to stabilize the wavelength of laser 3910, or the spatial-mode characteristics of transmission waveguide 3921 may control the spatial-mode characteristic of the output of laser 3910. Other devices and schemes may be readily devised while remaining within the scope of the present invention. It may be the case that a device may not become functional until optical power transfer is established between the device and a transmission optical waveguide providing a portion of the device functionality. Transmission waveguides of varying structure and characteristics may be employed according to the present invention for providing various optical device functionalities for a variety of optical devices, including but not limited to: wavelength selectivity, spatial mode selectivity, optical filtering, polarization selectivity, thermal compensation, power monitoring, reflectivity, modulation, and so on.

The transmission optical waveguide may include a grating structure, a thermo-optic element, or other suitable functional component. In some examples the transmission waveguide may only modify the operation of the optical device, while in other examples the transmission waveguide may be required for the device to function at all.

In light of the discussion of the preceding two paragraphs, the term "optical device" may require some clarification. As used herein, "optical device" may denote an independently functioning component, such as a laser, modulator, filter, switch, and so forth. Alternatively, "optical device" may also denote a component that may not operate independently, but must be used in conjunction with another component to function. An example may comprise an semiconductor gain medium with an anti-reflection coated end facet and an external-transfer waveguide. Alone such a component may not function as a laser source. If a reflector were provided in the external-transfer waveguide, or in a transmission waveguide forming an optical junction with the external-transfer waveguide, then the reflector and semiconductor might together form a functioning laser. Many other similar examples may fall within the scope of inventive concepts disclosed and/or claimed herein.

Figure 40:
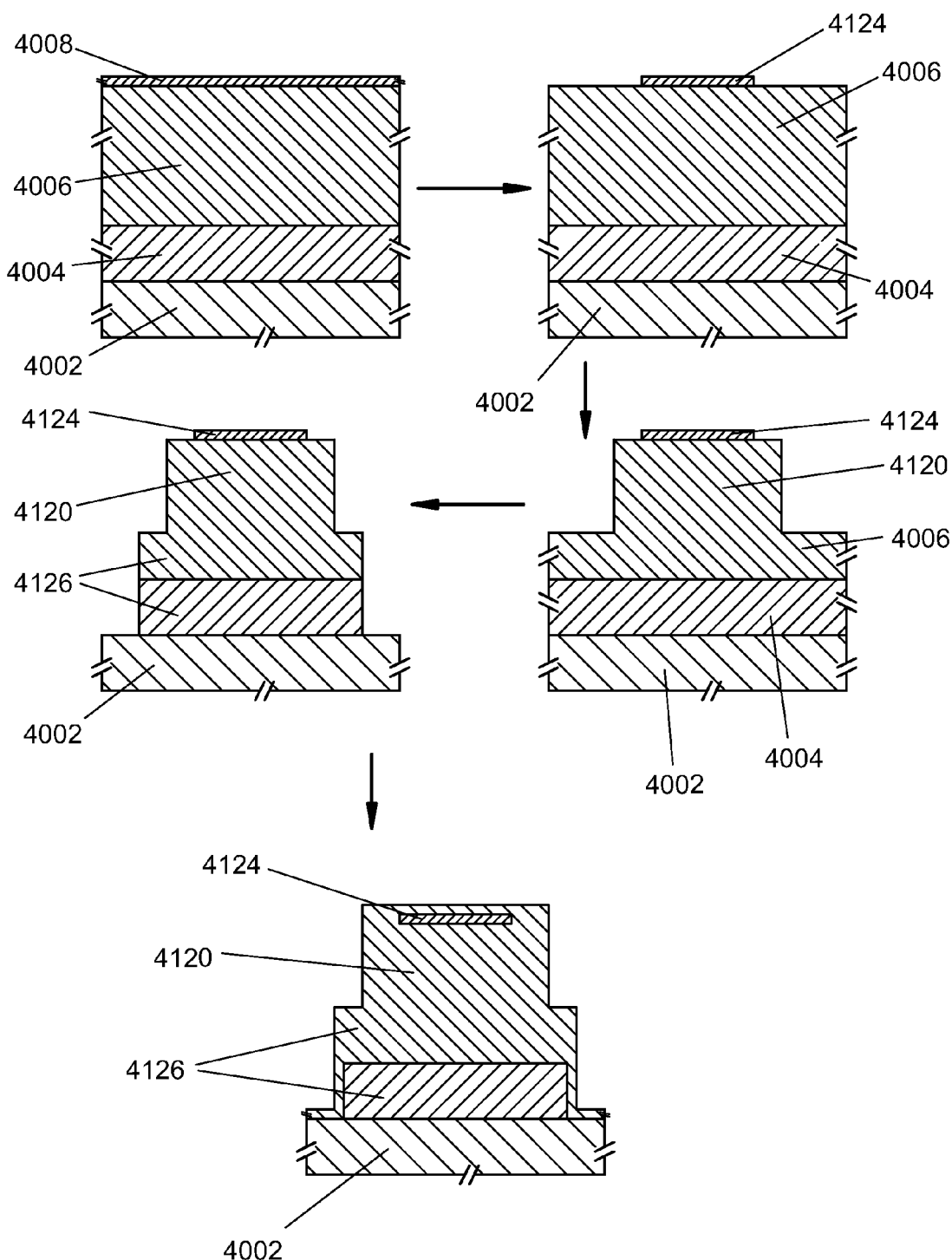
FIG. 40 is a process diagram (cross-section) illustrating fabrication of an external-transfer optical waveguide or a planar transmission optical waveguide according to the present invention.
Figure 41:
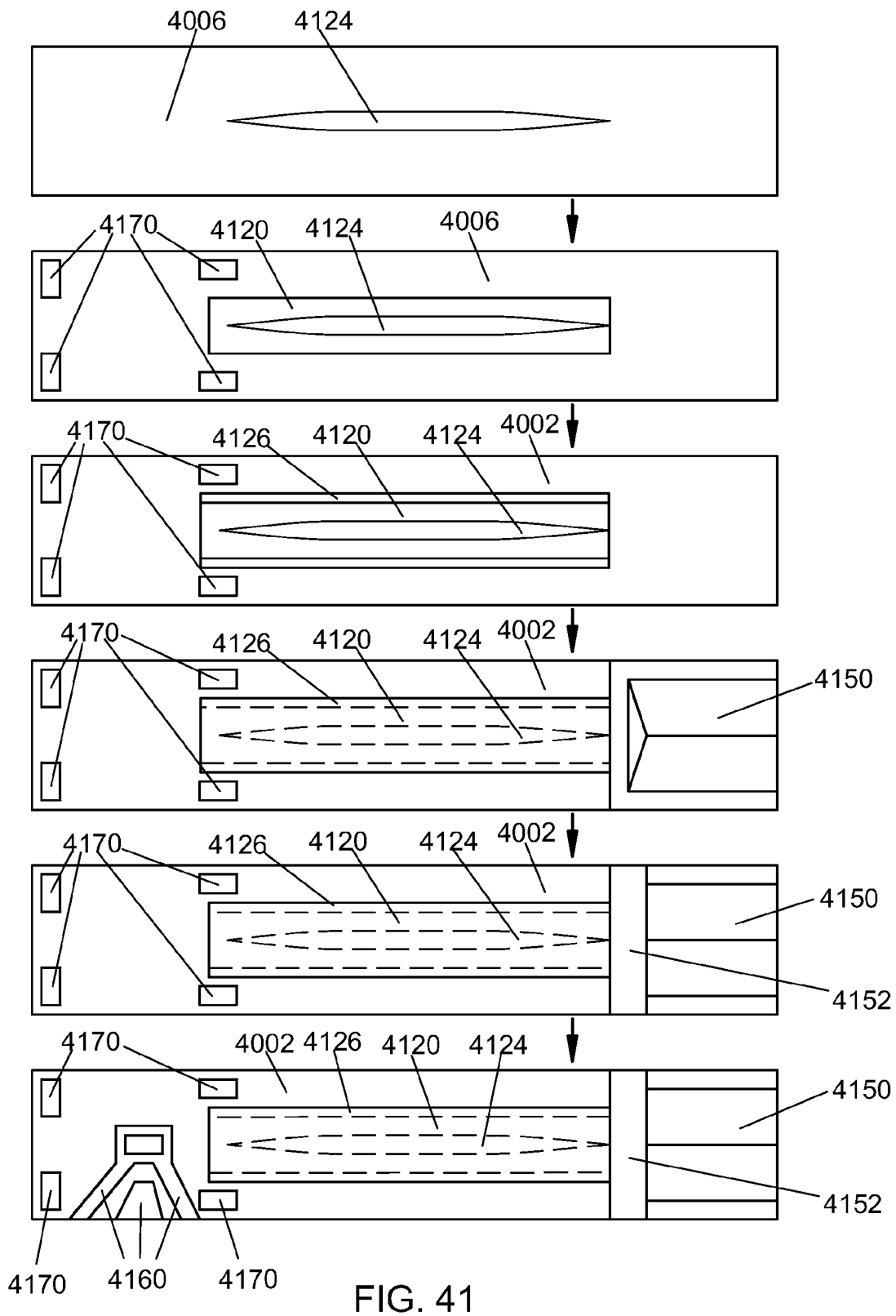
FIG. 41 is a process diagram (plan) illustrating fabrication on a planar waveguide substrate including planar transmission optical waveguides according to the present invention.

FIGS. 40 and 41 are process flow diagrams (transverse cross section and plan views, respectively) showing fabrication of a preferred planar transmission waveguide according to the present invention. Dimensions and material compositions are exemplary and may be altered while remaining within the scope of the present invention. A silicon substrate 4002 is prepared with a 5 µm thick buffer layer of silica 4004, a 10 µm thick layer of germanosilica 4006, and a 70 nm thick layer of silicon nitride 4008 ($Si_xN_y$). The silicon nitride is patterned and etched to form a waveguide core 4124 about 6 µm wide and of the desired geometry, shown in FIG. 41 laterally tapered at each end. The germanosilica layer is then etched to form a ridge waveguide 4120 about 10 µm wide and about 6 µm high, as well as the top portions of alignment/support structures 4170. Then both the remaining germanosilica 4006 and the silica buffer 4004 are patterned and removed, leaving ridge waveguide 4120 supported by a somewhat wider buffer ridge 4126 comprising the germano-silica layer (about 4 µm remaining thickness) and the silica layer. The lower portions of alignment/support structures 4170 are also formed by these steps. Ridges 4120 and 4126 are then covered with a 0.5 µm thick deposited overlayer of germanosilica. The underlying silicon is patterned and etched to form a v-groove 4150 for eventually receiving the end of a single-mode optical fiber. A groove 4152 is provided (by saw-cut or any other suitable method) to terminate the v-groove and allow an optical fiber to reach the end of waveguide 4120. Contacts/electrodes 4160 and other desired elements may then be provided using suitable spatially selective material processing techniques. While patterning/etching is recited for various processing steps herein, any suitable spatially selective material processing technique(s) may be equivalently employed. Similar processing sequences may be employed to produce various configurations, such as the exemplary embodiments shown in FIGS. 42A/42B, 43A/43B, and 44A/44B.

These planar waveguide components (equivalently, PLC-like components) may then receive an optical device with one or more integral external-transfer waveguides according to the present invention, preferably in a flip-chip geometry or in any suitable assembly geometry. One tapered end of the silicon nitride core of the ridge waveguide 4120 is adapted for adiabatic optical power transverse-transfer with an external-transfer optical waveguide of the optical device, with the ridge waveguide 4120 serving as the transmission optical waveguide. Alternatively, the ridge waveguide 4120 may be configured with the external-transfer optical waveguide for mode-interference-coupled optical power transverse-transfer. The other tapered end of the silicon nitride core of ridge waveguide 4120 serves as a mode expander for enabling end-transfer of optical power between the ridge waveguide 4120 and an optical fiber positioned in v-groove 4150 (fiber not shown). As the width of core 4122 decreases, the optical mode supported by core/waveguide 4122/4120 expands into waveguide 4120. Preferably, tapering of core 4122 should be sufficiently gradual so that the mode expansion satisfies the adiabatic condition (as defined earlier herein). By selecting the appropriate transverse dimension for ridge waveguide 4120, a desired degree of spatial-mode matching between waveguide 4120 and the optical fiber may be attained for enabling optical power end-transfer between waveguide 4120 and the optical fiber.

In FIGS. 42A and 42B, a planar waveguide substrate 4222 is shown with a planar transmission waveguide 4220 thereon adapted at a first end for adiabatic optical power transverse-transfer with an external-transfer optical waveguide of a diode laser. The diode laser and external-transfer waveguide are optically integrated on laser substrate 4202, shown flip-chip mounted onto substrate 4222 in FIG. 42B. A v-groove 4250 in substrate 4222 serves to position an optical fiber 4290 (shown in FIG. 42B) for end-transfer with waveguide 4220. Waveguide 4220 may be adapted at a second end for mode expansion and a degree of spatial-mode matching with the fiber 4290. Substrate 4222 may be provided with an auxiliary waveguide 4240 positioned and adapted at a first end thereof for transfer of a fraction of the optical output power of the diode laser from waveguide 4220. A second end of waveguide 4240 may be adapted for delivering optical power to a monitor photodiode. Contacts/electrodes 4224/4244 are provided for electronic access to the diode laser and the photodiode, respectively. Alignment/support members 4270/4272 are provided for alignment and support of the flip-chip mounted diode laser and photodiode, respectively.

The monitor photodiode may be integrated onto planar waveguide substrate 4222, or may preferably be provided as a separate component on a photodiode substrate 4242, shown flip-chip mounted onto planar waveguide substrate 4222 in FIG. 42B. The first end of waveguide 4240 may preferably be adapted for transverse-transfer of optical power from waveguide 4220 (as shown in FIGS. 42A/42B), or may alternatively be adapted in any other suitable way for optical power transfer from waveguide 4220. The second end of waveguide 4240 may preferably be adapted to function as a turning mirror for directing optical power upward and away from substrate 4222 and onto the monitor photodiode. This may be accomplished during processing of substrate 4222 by providing a beveled end-facet at the second end of waveguide 4222. Alternatively, any suitable means may be employed for delivering optical signal power from waveguide 4240 to the monitor photodiode. For example, the second end of waveguide 4240 may be provided with an optical scatterer, with a portion of the scattered optical power detected by the photodiode. In another example, the photodiode may be provided with an external-transfer optical waveguide according to the present invention adapted for transverse-transfer (adiabatic or mode-interference-coupled) of optical power from waveguide 4240 and delivery of the optical power to the photodiode. Other means may be equivalently employed.

FIGS. 43A/43B show a planar waveguide substrate 4322 with planar transmission optical waveguides 4320 and 4321 thereon. A diode laser may be provided with an external-transfer optical waveguide on laser substrate 4302, shown flip-chip mounted onto substrate 4322 in FIG. 43B. An optical modulator may be provided with two external-transfer optical waveguides on modulator substrate 4303, shown flip-chip mounted onto substrate 4322 in FIG. 43B. Waveguide 4320 may be adapted at a first end for transverse-transfer of optical power (adiabatic or mode-interference-coupled) with the external-transfer waveguide of the diode laser, and may be adapted at a second end for transverse-transfer of optical power (adiabatic or mode-interference-coupled) with a first of the external-transfer waveguides of the modulator. Waveguide 4321 may be adapted at a first end for transverse-transfer of optical power with a second of the external-transfer waveguides of the modulator (adiabatic or mode-interference-coupled), and adapted at a second end for mode-expansion and end-transfer with an optical fiber 4390, shown positioned in v-groove 4350 in FIG. 43B. Auxiliary waveguides 4340 and 4341 are provided on substrate 4322 positioned and adapted at the first ends thereof for transfer of a fraction of the optical power from waveguides 4320 and 4321, respectively. The fractions diverted are directed to photodiodes, preferably provided on separate photodiode substrates 4344/4345 and shown in FIG. 43B flip-chip mounted onto substrate 4322. Waveguides 4340/4341 and the photodiodes may be adapted as described in the preceding paragraphs. Contacts/electrodes 4370/4371/4372/4373 are provided for electronic access to the diode laser, modulator, and photodiodes. Alignment/support members 4380/4381/4382/4383 may be provided on substrate 4322 for alignment on support of the diode laser, modulator, and photodiodes. The foregoing embodiments are exemplary. Many other configurations of optical devices (with external-transfer waveguides) and transmission waveguides may fall within the scope of the present invention as disclosed and/or claimed herein.

In FIGS. 44A and 44B, a planar waveguide substrate 4422 is shown with a planar transmission waveguide 4420 thereon adapted at a first end for adiabatic optical power transverse-transfer with an external-transfer optical waveguide of a diode laser. The diode laser and external-transfer waveguide are optically integrated on laser substrate 4402, shown flip-chip mounted onto substrate 4422 in FIG. 44B. A v-groove 4450 in substrate 4422 serves to position an optical fiber 4490 (shown in FIG. 44B) for end-transfer with waveguide 4420. Waveguide 4420 may be adapted at a second end for mode expansion and a degree of spatial-mode matching with the fiber 4290 in conjunction with ball lens 4494, shown received in a recessed portion of substrate 4422. Substrate 4422 may have an additional recessed portion for receiving an optical isolator 4496 inserted between ball lens 4494 and optical fiber 4490. Substrate 4422 may be provided with an auxiliary waveguide 4440 positioned and adapted at a first end thereof for transfer of a fraction of the optical output power of the diode laser from waveguide 4420. A second end of waveguide 4440 may be adapted for delivering optical power to a monitor photodiode provided on flip-chip mounted substrate 4444. Contacts/electrodes 4470/4472 are provided for electronic access to the diode laser and the photodiode, respectively. Alignment/support members 4480/4482 are provided for alignment and support of the flip-chip mounted diode laser and photodiode, respectively.

Various of the exemplary embodiments shown herein include support/alignment members for accurately positioning and supporting an optical device (on a substrate with an external-transfer waveguide) on a planar waveguide substrate. It may be desirable to provide support and/or alignment structures on the device substrate as well. Such support structures may serve to protect the external-transfer optical waveguide (often a protruding structure) from damage during assembly of the device and the waveguide substrate. Exemplary support members are shown in FIGS. 45A and 45B. An optical device (not shown) and external-transfer optical waveguide 4530 are optically integrated on device substrate 4502, along with support members 4560 (in the form of elongated protruding ridges substantially parallel to waveguide 4530 in the example; other configurations may be implemented). Upon assembly of the device with a planar transmission waveguide 4520 on waveguide substrate 4522 (omitted from FIG. 45A for clarity), the ridges 4560 engage the surface of the waveguide substrate to provide mechanical support and protection for external-transfer waveguide 4530.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:
1. A method comprising:
forming an optical device on a device substrate;
forming a first optical waveguide on the device substrate or on the optical device and arranging the first optical waveguide for transferring an optical signal between the optical device and the first optical waveguide;
forming a second, structurally discrete optical waveguide on a structurally discrete waveguide substrate;
assembling the waveguide substrate or second optical waveguide with the device substrate, optical device, or first optical waveguide so that the first and second optical waveguides are positioned between the device and waveguide substrates and are relatively positioned for transferring the optical signal therebetween via optical transverse coupling; and arranging the first or second optical waveguide for transferring the optical signal therebetween via substantially adiabatic optical transverse coupling with the first and second waveguides so positioned.

2. The method of claim 1 further comprising arranging the first or second optical waveguide for maintaining transverse-offset optical power transfer loss therebetween less than about 0.5 dB for relative transverse offsets of the optical waveguides less than about ±1.0 times a corresponding transverse optical mode size characteristic of the optical waveguides.

3. The method of claim 1 further comprising arranging the first or second optical waveguide for maintaining transverse-offset optical power transfer loss therebetween within about ±0.5 dB of a nominal optical power transfer loss level for relative transverse offsets of the optical waveguides less than about ±1.0 times a corresponding transverse optical mode size characteristic of the optical waveguides.

4. The method of claim 1 wherein the optical device and the first optical waveguide are arranged and positioned for enabling optical end coupling between the optical device and the first optical waveguide.

5. The method of claim 1 wherein the optical device and the first optical waveguide are arranged and positioned for enabling optical transverse coupling between the optical device and the first optical waveguide.

6. The method of claim 1 wherein the first optical waveguide comprises a low-modal-index optical waveguide.

7. The method of claim 6 wherein the optical device comprises a high-index semiconductor device.

8. The method of claim 1 wherein the second optical waveguide comprises a low-modal-index optical waveguide.

9. The method of claim 1 further comprising structurally arranging the device substrate or the waveguide substrate for positioning the first and second optical waveguides for establishing optical transverse coupling therebetween.

10. The method of claim 1 further comprising arranging the second optical waveguide at a distal end thereof for enabling optical end coupling between the second optical waveguide and an optical fiber mounted on the waveguide substrate.

11. The method of claim 1 wherein at least a portion of the first or second optical waveguide comprises a core and lower-index cladding, and at least one transverse dimension of the core or the cladding varies longitudinally along at least a portion of the optical junction region.

12. The method of claim 1 wherein:
the first or second optical waveguide comprises a core and lower-index cladding;
the core comprises silicon nitride, silicon oxynitride, or doped silica; and
the cladding comprises silica or doped silica.

13. The method of claim 1 further comprising securing together with a joining element the discrete, assembled device substrate, waveguide substrate, and first and second waveguides.

14. The method of claim 13 wherein the joining element comprises a retainer, a clamp, a fastener, an adhesive, solder, potting or embedding material, a clip, a tab and slot, or a spring or micro-spring.

15. The method of claim 1 wherein assembling the waveguide substrate or second optical waveguide with the device substrate, optical device, or first optical waveguide includes arranging the first and second waveguides to be relatively positioned within a transverse offset tolerance range.

16. A method comprising:
forming an optical device on a first substrate;
forming a first optical waveguide on the first substrate or on the optical device, the first optical waveguide including a first optical junction region and being optically coupled to the optical device for transfer of an optical signal therebetween;
forming a second optical waveguide on a second substrate, wherein the second optical waveguide includes a second optical junction region, and the second substrate and the second optical waveguide are structurally discrete from the first substrate and the first optical waveguide; and
arranging the first and second substrates with the first and second optical junction regions disposed therebetween, wherein the first and second optical junction regions have a relative position which enables substantially adiabatic optical transverse coupling of the optical signal therebetween.

17. The method of claim 16 wherein the relative position maintains a transverse-offset optical power transfer loss between the optical waveguides of less than about 0.5 dB for relative transverse offsets of the optical waveguides less than about ±1.0 times a corresponding transverse optical mode size characteristic of the optical waveguides.

18. The method of claim 16 wherein the relative position maintains a transverse-offset optical power transfer loss between the optical waveguides within about ±0.5 dB of a nominal optical power transfer loss level for relative transverse offsets of the optical waveguides less than about ±1.0 times a corresponding transverse optical mode size characteristic of the optical waveguides.

19. The method of claim 16 wherein forming the first optical waveguide on the first substrate includes forming the first optical waveguide to enable optical end coupling between the optical device and the first optical waveguide.

20. The method of claim 16 wherein forming the first optical waveguide on the first substrate includes forming the first optical waveguide to enable optical transverse coupling between the optical device and the first optical waveguide.

21. The method of claim 16 wherein the first optical waveguide comprises a low-modal-index optical waveguide.

22. The method of claim 21 wherein the optical device comprises a high-index semiconductor device.

23. The method of claim 16 wherein the second optical waveguide comprises a low-modal-index optical waveguide.

24. The method of claim 16 further comprising mounting an optical fiber on the second substrate, the optical fiber being end coupled with the second optical waveguide.

25. The method of claim 16 wherein at least a portion of the first or second optical waveguide comprises a core and lower-index cladding, and at least one transverse dimension of the core or the cladding varies longitudinally along at least a portion of the respective optical junction region.

26. The method of claim 16 wherein:
the first or second optical waveguide comprises a core and lower-index cladding;
the core comprises silicon nitride, silicon oxynitride, or doped silica; and
the cladding comprises silica or doped silica.

27. The method of claim 16 further comprising securing the first and second substrates together using a joining element, with the first and second optical junction regions relatively positioned to enable substantially adiabatic optical transverse coupling.

28. The method of claim 27 wherein the joining element comprises a retainer, a clamp, a fastener, an adhesive, solder, potting or embedding material, a clip, a tab and slot, or a spring or micro-spring.

29. The method of claim 16 wherein arranging the first and second substrates includes arranging the first and second substrates such that the first and second optical junction regions are relatively positioned within a transverse offset tolerance range.

30. A method comprising:
forming an optical device on a first substrate;
forming a first optical waveguide on the first substrate, the first substrate, the optical device, and the first optical waveguide forming a first device subunit, wherein the first optical waveguide is optically coupled to the optical device for transfer of an optical signal therebetween, and the first optical waveguide includes a first optical junction region;
forming a second optical waveguide on a second substrate to form a second device subunit, wherein the second optical waveguide includes a second optical junction region, and the second device subunit is structurally discrete from the first device subunit;
assembling the first device subunit and the second device subunit into an optical transfer configuration, in which the first and second optical junction regions are positioned facing each other between the first and second device substrates, wherein the optical transfer configuration enables substantially adiabatic transverse-transfer of optical power between the first and second optical waveguides and includes a transverse offset tolerance range between respective positions of the first and second optical junction regions.

31. The method of claim 30 wherein the transverse offset tolerance range is characterized by maintaining transverse-offset optical power transfer loss between the first and second optical waveguides of less than about 0.5 dB for relative transverse offsets of the optical waveguides less than about ±1.0 times a corresponding transverse optical mode size characteristic of the optical waveguides.

32. The method of claim 30 wherein the transverse offset tolerance range is characterized by maintaining transverse-offset optical power transfer loss between the first and second optical waveguides of less than about ±0.5 dB for nominal optical power transfer loss for relative transverse offsets of the optical waveguides less than about ±1.0 times a corresponding transverse optical mode size characteristic of the optical waveguides.

33. The method of claim 30 wherein the first optical waveguide or the second optical waveguide comprises a low-modal index optical waveguide.

34. The method of claim 33 wherein the optical device comprises a high-index semiconductor device.

35. The method of claim 30 wherein the first optical waveguide or the second optical waveguide comprises a silica-based optical waveguide.

36. The method of claim 30 wherein:
the first optical waveguide comprises a core and lower-index cladding;
the core comprises silicon nitride, silicon oxynitride, or doped silica; and
the cladding comprises silica or doped silica.

37. The method of claim 30 wherein at least a portion of the first optical waveguide comprises a core and lower-index cladding, and at least one transverse dimension of the core or the cladding varies longitudinally along at least a portion of the first optical junction region.

38. The method of claim 30 wherein the first optical waveguide is adapted at a distal end thereof for enabling end-transfer of optical power to an optical fiber.

39. The method of claim 30 further comprising securing the first and second device subunits together using a joining element in the optical transfer configuration.

40. The method of claim 39 wherein the joining element comprises a retainer, a clamp, a fastener, an adhesive, solder, potting or embedding material, a clip, a tab and slot, or a spring or micro-spring.

* * * * *